United States Patent
Babaei

(10) Patent No.: US 12,200,604 B2
(45) Date of Patent: Jan. 14, 2025

(54) UE CAPABILITY FOR FAST SCELL ACTIVATION

(71) Applicant: PanPsy Technologies, LLC, Fairfax, VA (US)

(72) Inventor: Alireza Babaei, Fairfax, VA (US)

(73) Assignee: PanPsy Technologies, LLC, Fairfax, VA (US)

(*) Notice: Subject to any disclaimer, the term of this patent is extended or adjusted under 35 U.S.C. 154(b) by 0 days.

(21) Appl. No.: 18/116,373

(22) Filed: Mar. 2, 2023

(65) Prior Publication Data

US 2023/0209445 A1 Jun. 29, 2023

Related U.S. Application Data

(63) Continuation of application No. 17/849,778, filed on Jun. 27, 2022, now Pat. No. 11,632,709, which is a continuation of application No. 17/574,711, filed on Jan. 13, 2022, now Pat. No. 11,419,042.

(60) Provisional application No. 63/136,978, filed on Jan. 13, 2021.

(51) Int. Cl.
*H04W 48/12* (2009.01)
*H04W 48/16* (2009.01)
*H04W 72/23* (2023.01)
*H04W 76/15* (2018.01)

(52) U.S. Cl.
CPC .......... *H04W 48/12* (2013.01); *H04W 48/16* (2013.01); *H04W 72/23* (2023.01); *H04W 76/15* (2018.02)

(58) Field of Classification Search
CPC ..... H04W 48/12; H04W 48/16; H04W 76/15; H04W 72/042
See application file for complete search history.

(56) References Cited

U.S. PATENT DOCUMENTS

| | | |
|---|---|---|
| 2015/0296522 A1 | 10/2015 | Bergstrom et al. |
| 2016/0128003 A1 | 5/2016 | Callender et al. |
| 2019/0116585 A1* | 4/2019 | Chakraborty ......... H04L 5/0098 |
| 2019/0297529 A1 | 9/2019 | Hampel et al. |
| 2019/0356444 A1 | 11/2019 | Noh et al. |
| 2020/0351643 A1* | 11/2020 | Dhanapal ............. H04B 7/0413 |
| 2020/0351982 A1* | 11/2020 | Kim ....................... H04W 12/03 |
| 2021/0037403 A1 | 2/2021 | Kim et al. |
| 2021/0045177 A1* | 2/2021 | Lee ....................... H04W 76/18 |
| 2021/0068129 A1 | 3/2021 | Ryu et al. |
| 2021/0105722 A1 | 4/2021 | Tsai et al. |
| 2021/0111851 A1 | 4/2021 | Lin |
| 2021/0243590 A1* | 8/2021 | Jin ........................... H04W 8/24 |
| 2021/0251040 A1 | 8/2021 | Tang et al. |
| 2021/0274535 A1 | 9/2021 | Yi et al. |

(Continued)

OTHER PUBLICATIONS

3GPP TS 38.211 V16.4.0 (Dec. 2020); Technical Specification; 3rd Generation Partnership Project; Technical Specification Group Radio Access Network; NR; Physical channels and modulation; (Release 16).

(Continued)

*Primary Examiner* — Chi Ho A Lee
(74) *Attorney, Agent, or Firm* — Alireza Babaei

(57) ABSTRACT

A wireless device may transmit capability IE(s) indicating that the wireless device supports fast SCell activation. The wireless device may receive a command indicating activation of a reference signal for fast activation of a SCell. The wireless device may activate the SCell based on the command.

20 Claims, 43 Drawing Sheets

(56) References Cited

U.S. PATENT DOCUMENTS

| | | | |
|---|---|---|---|
| 2021/0367724 A1* | 11/2021 | Zhang | H04B 7/0413 |
| 2022/0022067 A1 | 1/2022 | Kim et al. | |
| 2022/0039163 A1 | 2/2022 | Park et al. | |
| 2022/0052829 A1 | 2/2022 | Kim et al. | |
| 2022/0053568 A1 | 2/2022 | Xing et al. | |
| 2022/0070853 A1 | 3/2022 | Guo | |
| 2022/0086676 A1 | 3/2022 | Ai et al. | |
| 2022/0095125 A1 | 3/2022 | Xiao et al. | |
| 2022/0131669 A1 | 4/2022 | Takeda et al. | |
| 2022/0200763 A1 | 6/2022 | You et al. | |
| 2022/0217559 A1 | 7/2022 | Nory et al. | |
| 2022/0217707 A1* | 7/2022 | Zhou | H04W 72/21 |
| 2022/0225251 A1* | 7/2022 | Yang | H04L 5/0051 |
| 2023/0164818 A1* | 5/2023 | Nimbalker | H04L 5/0053 370/329 |
| 2023/0232341 A1* | 7/2023 | Zhang | H04W 52/365 455/522 |
| 2023/0247501 A1* | 8/2023 | Kim | H04W 36/06 370/331 |

OTHER PUBLICATIONS

3GPP TS 38.212 V16.4.0 (Dec. 2020); Technical Specification; 3rd Generation Partnership Project; Technical Specification Group Radio Access Network; NR; Multiplexing and channel coding; (Release 16).
3GPP TS 38.213 V16.4.0 (Dec. 2020); Technical Specification; 3rd Generation Partnership Project; Technical Specification Group Radio Access Network; NR; Physical layer procedures for control; (Release 16).
3GPP TS 38.214 V16.4.0 (Dec. 2020); Technical Specification; 3rd Generation Partnership Project; Technical Specification Group Radio Access Network; NR; Physical layer procedures for data; (Release 16).
3GPP TS 38.300 V16.4.0 (Dec. 2020); Technical Specification; 3rd Generation Partnership Project; Technical Specification Group Radio Access Network; NR; NR and NG-RAN Overall Description; Stage 2; (Release 16).
3GPP TS 38.321 V16.3.0 (Dec. 2020); Technical Specification; 3rd Generation Partnership Project; Technical Specification Group Radio Access Network; NR; Medium Access Control (MAC) protocol specification; (Release 16).
3GPP TS 38.331 V16.3.1 (Jan. 2021); Technical Specification; 3rd Generation Partnership Project; Technical Specification Group Radio Access Network; NR; Radio Resource Control (RRC); Protocol specification; (Release 16).
3GPP TSG-RAN WG1 Meeting #102-e; R1-2005411; e-Meeting, Aug. 17-28, 2020; Source: vivo; Title: Discussion on efficient activation/de-activation mechanism for Scells; Agenda Item: 8.13.3; Document for: Discussion and Decision.
3GPP TSG RAN WG1 Meeting #102-e; R1-2005442; e-Meeting, Aug. 17-28, 2020 ; Source: ZTE; Title: Discussion on Supporting Efficient Activation/De-activation Mechanism for SCells in NR CA; Agenda item: 8.13.3; Document for: Discussion/Decision.
3GPP TSG RAN WG1 Meeting #102-e; R1-2005629;e-Meeting, Aug. 17-Aug. 28, 2020; Agenda Item: 8.13.3; Source: MediaTek Inc.; Title: On supporting efficient activation mechanism for SCells in NR CA; Document for: Discussion and decision.
3GPP TSG RAN WG1 Meeting #102-e; R1-2005698; e-Meeting, Aug. 17-28, 2020; Source: CATT; Title: Discussion on efficient activation and de-activation mechanism for SCell in NR CA; Agenda Item: 8.13.3; Document for: Discussion and Decision.
3GPP TSG RAN WG1 #102; R1-205908; e-Meeting, Aug. 17-28, 2020; Agenda item: 8.13.3; Source: Nokia, Nokia Shanghai Bell; Title: On low latency Scell activation; Document for: Discussion and Decision.
3GPP TSG RAN WG1 #102-e; R1-2006178; e-Meeting, Aug. 17-28, 2020; Agenda Item: 8.13.3; Source: Samsung; Title: Efficient activation/deactivation mechanism for SCells; Document for: Discussion/Decision.

3GPP TSG RAN WG1 #102-e; R1-2006283; e-Meeting, Aug. 17-28, 2020; Agenda item: 8.13.3; Source: Spreadtrum Communications; Title: Discussion on efficient activationde-activation mechanism for SCells in NR CA; Document for: Discussion and decision.
3GPP TSG RAN WG1 #102-e; R1-2006511; e-Meeting, Aug. 17-28, 2020; Agenda Item: 8.13.3; Source: Apple Inc.; Title: Support efficient activation/de-activation mechanism for SCells in NR; Document for: Discussion/Decision.
3GPP TSG-RAN WG1 #102-e; R1-2006673; eMeeting, Aug. 17-28, 2020; Source: Ericsson; Title: Reduced Latency SCell Activation; Agenda Item: 8.13.3; Document for: Discussion and Decision.
3GPP TSG RAN WG1 #102-e; R1-2006751; e-Meeting, Aug. 17-28, 2020; Source: NTT Docomo, Inc.; Title: Discussion on efficient activation/deactivation mechanism for SCells; Agenda Item: 8.13.3; Document for: Discussion and Decision.
3GPP TSG RAN WG1 #102-e; R1-2006754; e-Meeting, Aug. 17-28, 2020; Agenda Item: 8.13.3; Source: ASUSTek; Title: Efficient activation/deactivation of SCell; Document for: Discussion and Decision.
3GPP TSG-RAN WG1 #102-e; R1-2006835; e-Meeting, Aug. 17-28, 2020; Agenda item: 8.13.3; Source: Qualcomm Incorporated; Title: Views on efficient activation/de-activation mechanism for SCells in NR CA; Document for: Discussion/Decision.
3GPP TSG RAN WG1 Meeting #102-e; R1-2006927; E-meeting, Aug. 17-28, 2020; Agenda Item: 8.13.3; Source: Huawei, HiSilicon; Title: Discussion on efficient activation/de-activation mechanism for SCells; Document for: Discussion and Decision.
3GPP TSG RAN WG1 #103-e; R1-2007548; e-Meeting, Oct. 26-Nov. 13, 2020; Agenda Item: 8.13.3; Source: Futurewei; Title: Support efficient activation/de-activation mechanism for SCells; Document for: Discussion/Decision.
3GPP TSG-RAN WG1 Meeting #103-e; R1-2007697; e-Meeting, Oct. 26-Nov. 13, 2020; Source: vivo; Title: Discussion on efficient activation/de-activation mechanism for Scells; Agenda Item: 8.13.3; Document for: Discussion and Decision.
3GPP TSG RAN WG1 #103-e; R1-2007841; e-Meeting, Oct. 26-Nov. 13, 2020; Source: CATT; Title: Discussion on efficient activation and de-activation mechanism for SCell in NR CA; Agenda Item: 8.13.3; Document for: Discussion and Decision.
3GPP TSG RAN WG1 #103-e; R1-2008112; e-Meeting, Oct. 26-Nov. 13, 2020; Agenda item: 8.13.3; Source: Spreadtrum Communications; Title: Discussion on efficient activationde-activation mechanism for SCells in NR CA; Document for: Discussion and decision.
3GPP TSG RAN WG1 #102-e; R1-2008197; e-Meeting, Oct. 26-Nov. 13, 2020; Agenda Item: 8.13.3; Source: Samsung; Title: On efficient activation/deactivation mechanism for SCells; Document for: Discussion/Decision.
3GPP TSG RAN WG1 #103-e; R1-2008286; e-Meeting, Oct. 26-Nov. 13, 2020; Source: OPPO; Title: Discussion on efficient activation/de-activation for Scell; Agenda Item: 8.13.3; Document for: Discussion and Decision.
3GPP TSG RAN WG1 Meeting #103-e; R1-2008322; E-meeting, Oct. 26-Nov. 13, 2020; Agenda Item: 8.13.3; Source: Huawei, HiSilicon; Title: Discussion on efficient activation/de-activation mechanism for SCells; Document for: Discussion and Decision.
3GPP TSG-RAN WG1 #103-e; R1-2008453; e-Meeting, Oct. 26-Nov. 13, 2020; Source: Apple Inc.; Title: On efficient SCell Activation/Deactivation; Agenda item: 8.13.3; Document for: Discussion and Decision.
3GPP TSG RAN WG1 #103-e; R1-2008713; e-Meeting, Oct. 26-Nov. 13, 2020; Agenda Item: 8.13.3; Source: ASUSTek; Title: Efficient activation/deactivation of SCell; Document for: Discussion and Decision.
3GPP TSG RAN WG1 Meeting #103e; R1-2008832; e-Meeting, Oct. 26-Nov. 13, 2020 ; Source: ZTE; Title: Discussion on Supporting Efficient Activation/De-activation Mechanism for SCells in NR CA; Agenda item: 8.13.3; Document for: Discussion/Decision.
3GPP TSG RAN WG1 #103-e; R1-2008849; e-Meeting, Oct. 26-Nov. 13, 2020; Agenda Item: 8.13.3; Source: NEC; Title: Discussion on efficient activation mechanism for SCells; Document for: Discussion.
3GPP TSG RAN WG1 Meeting #103-e; R1-2008968; e-Meeting, Oct. 26-Nov. 13, 2020; Agenda Item: 8.13.3; Source: MediaTek

(56) References Cited

OTHER PUBLICATIONS

Inc.; Title: On supporting efficient activation mechanism for SCells in NR CA; Document for: Discussion and decision.
3GPP TSG RAN WG1 Meeting #103_e; R1-2009005; e-Meeting, Oct. 26-Nov. 13, 2020; Agenda Item: 8.13.3; Source: Intel Corporation; Title: On efficient activation/de-activation for SCells; Document for: Discussion/Decision.
3GPP TSG RAN WG1 #103; R1-2009048; e-Meeting, Oct. 26-Nov. 13, 2020; Agenda item: 8.13.3; Source: Nokia, Nokia Shanghai Bell; Title: On low latency Scell activation; Document for: Discussion and Decision.
3GPP TSG RAN WG1 #103-e; R1-2009197; e-Meeting, Oct. 26-Nov. 13, 2020; Source: NTT Docomo, Inc.; Title: Discussion on efficient activation/deactivation mechanism for SCells; Agenda Item: 8.13.3; Document for: Discussion and Decision.
3GPP TSG-RAN WG1 #103-e; R1-2009208; eMeeting, Oct. 26-Nov. 13, 2020; Source: Ericsson; Title: Reduced Latency SCell Activation; Agenda Item: 8.13.3; Document for: Discussion and Decision.
3GPP TSG RAN WG1 Meeting #103-e; R1-2009279; E-meeting, Oct. 26-Nov. 6, 2020; Source: Qualcomm Incorporated; Title: Views on efficient activation/de-activation mechanism for SCells in NR CA; Agenda Item: 8.13.3; Document for: Discussion and Decision.

\* cited by examiner

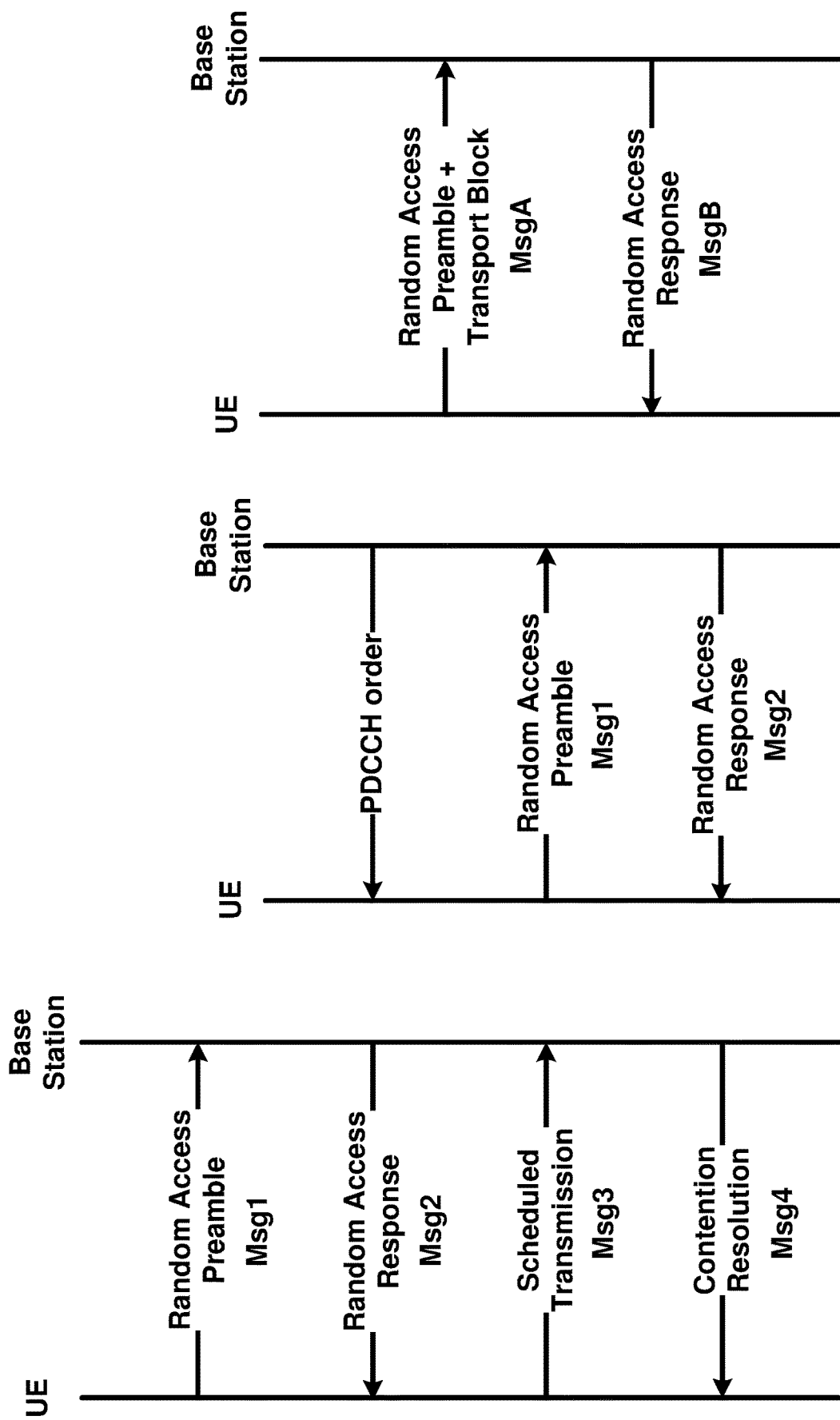

UE CAPABILITY FOR FAST SCELL ACTIVATION

CROSS-REFERENCE TO RELATED APPLICATIONS

This application is a continuation of U.S. application Ser. No. 17/849,778, filed Jun. 27, 2022, which is a continuation of U.S. application Ser. No. 17/574,711, filed Jan. 13, 2022, which claims the benefit of U.S. Provisional Application No. 63/136,978, filed Jan. 13, 2021, which is hereby incorporated by reference in its entirety.

BRIEF DESCRIPTION OF THE DRAWINGS

FIG. 12A, FIG. 12B and FIG. 12C show example random access processes in accordance with several of various embodiments of the present disclosure.

DETAILED DESCRIPTION

The exemplary embodiments of the disclosed technology enable processes for a wireless device and/or one or more base stations for secondary cell activation enhancement. The exemplary disclosed embodiments may be implemented in the technical field of wireless communication systems. More particularly, the embodiments of the disclosed technology may enhance signaling and processes for secondary cell activation and/or enable secondary cell activation based on triggering reference signals that are used in secondary cell activation.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
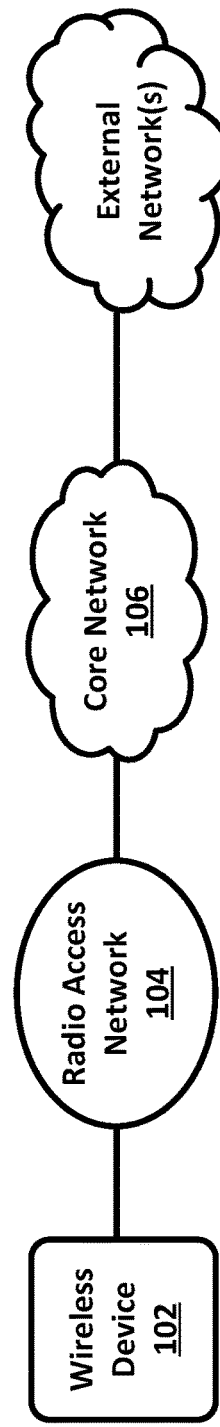
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
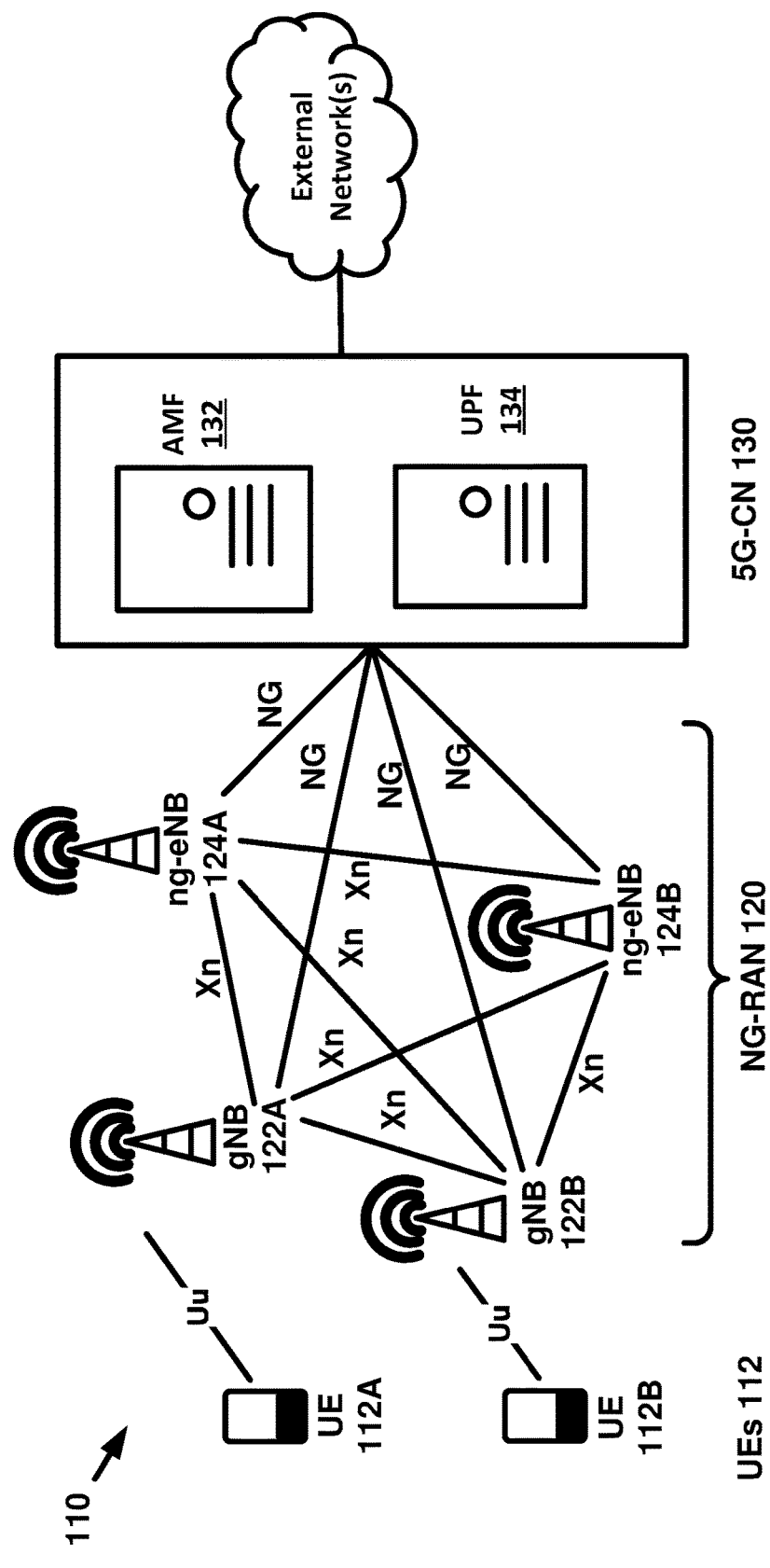

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNB s 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
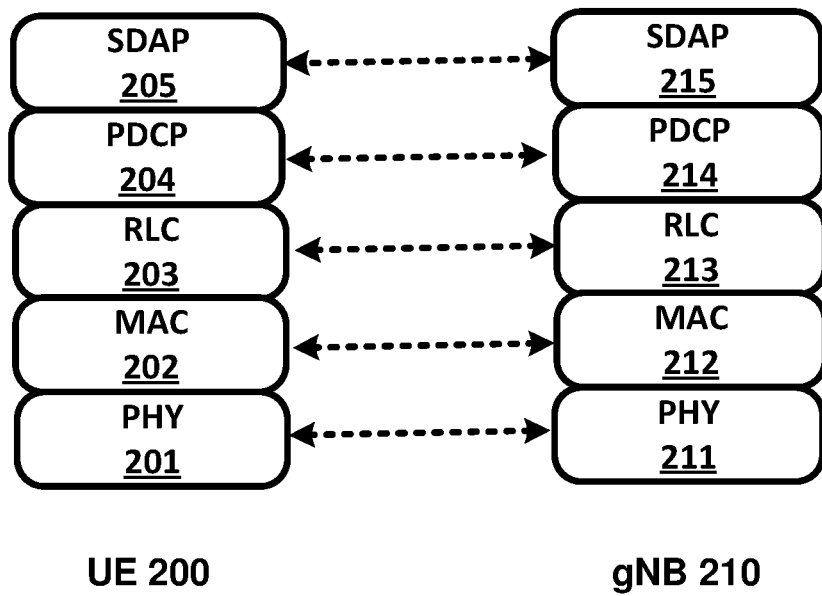
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
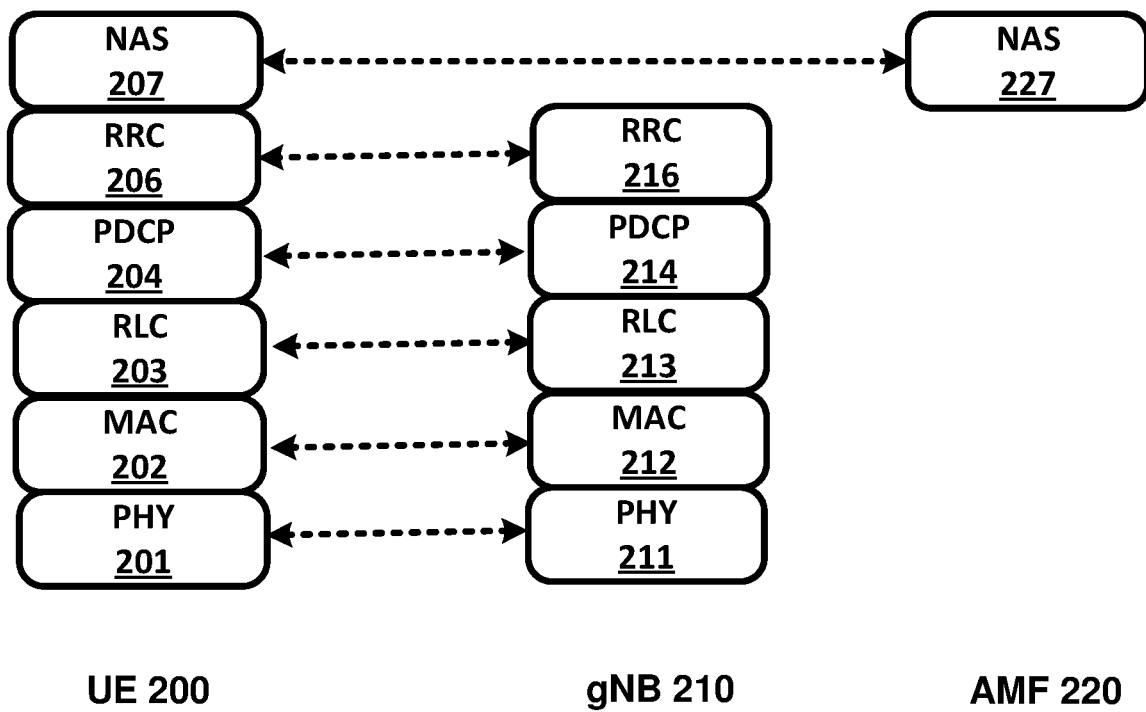

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
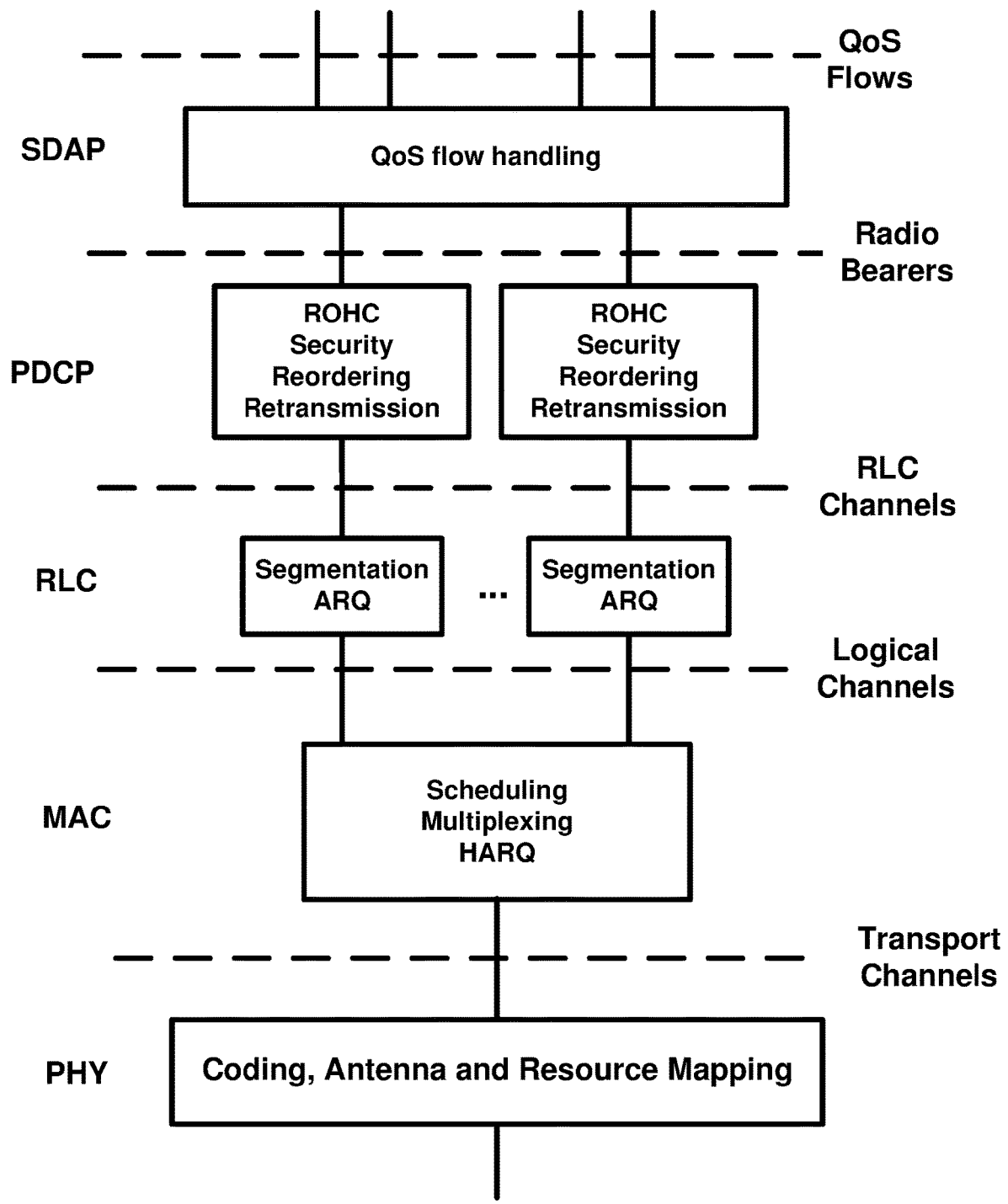
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
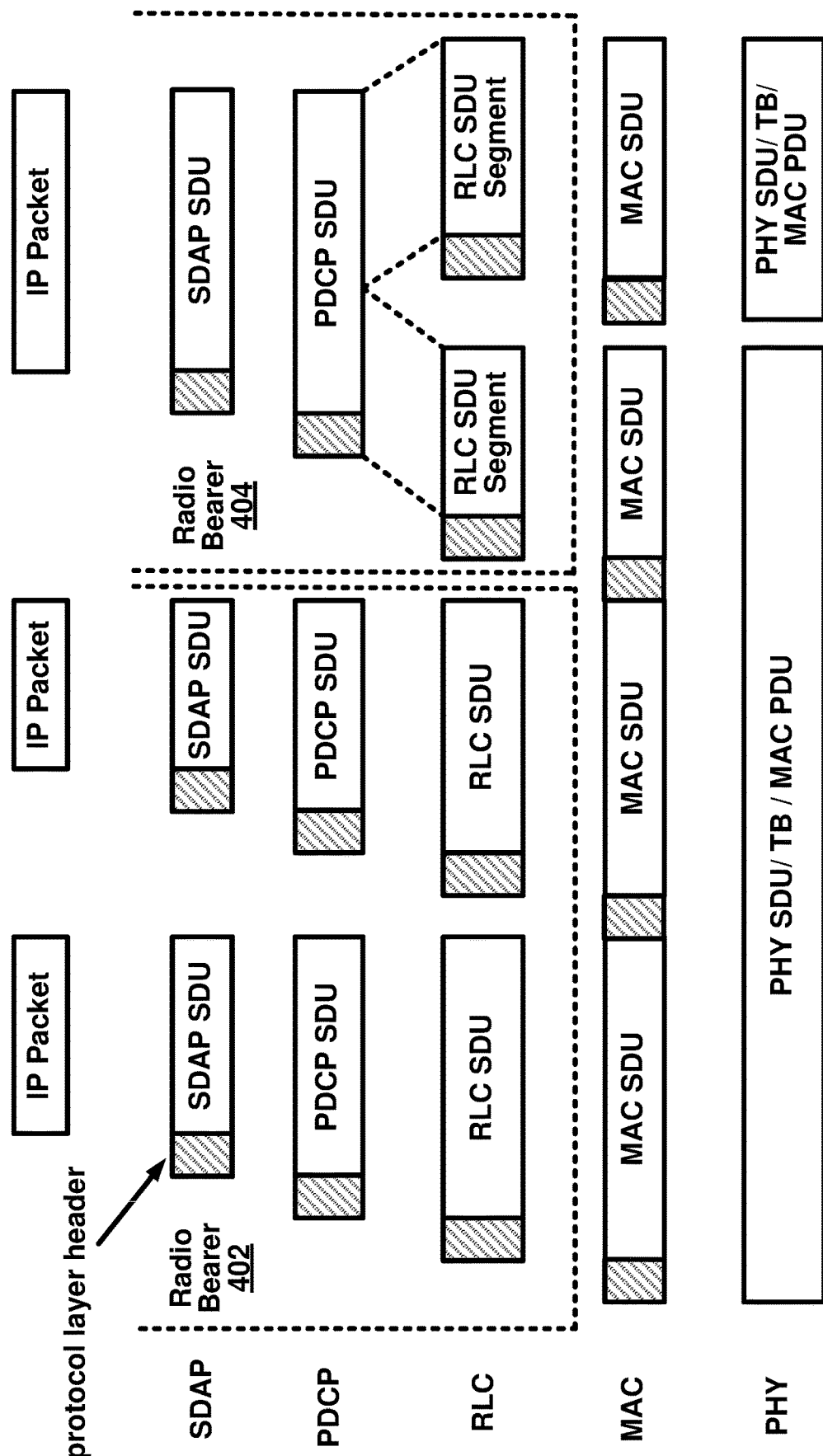
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
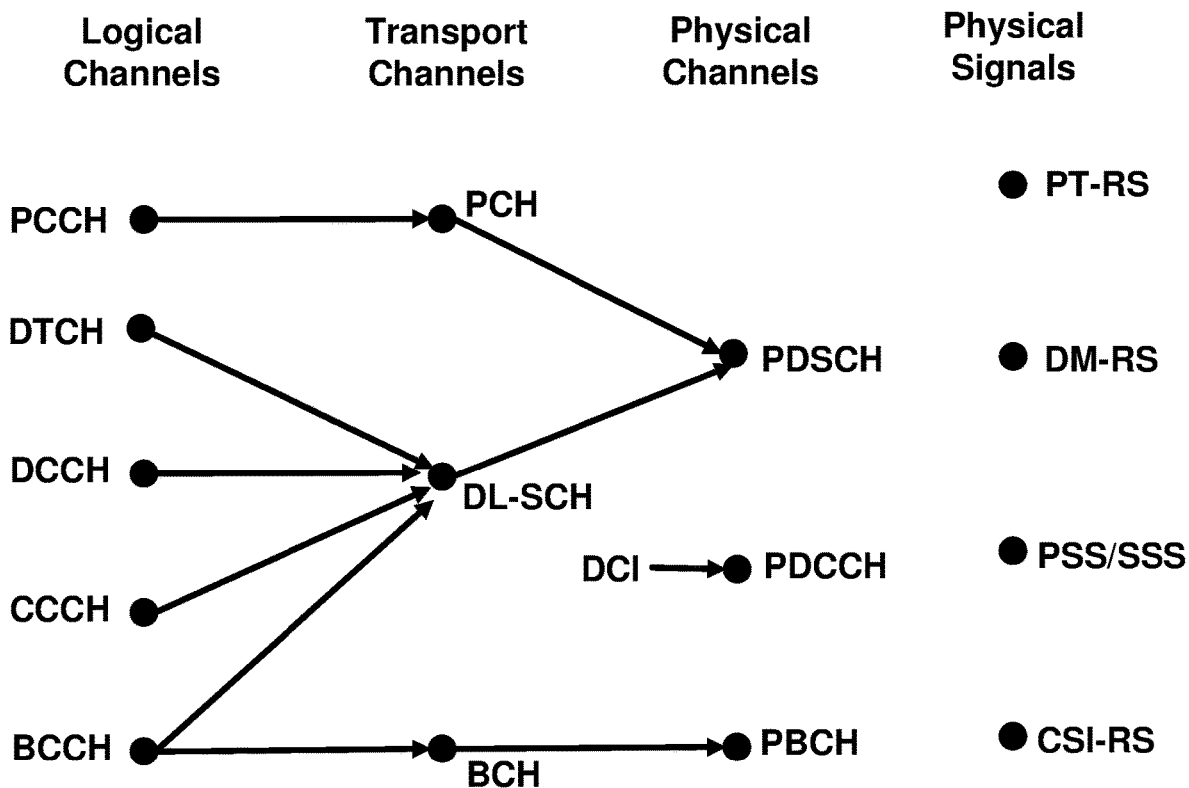
FIG. 5A shows example mapping of channels between layers of the protocol stack and different physical signals in downlink in accordance with several of various embodiments of the present disclosure.
Figure 5B:
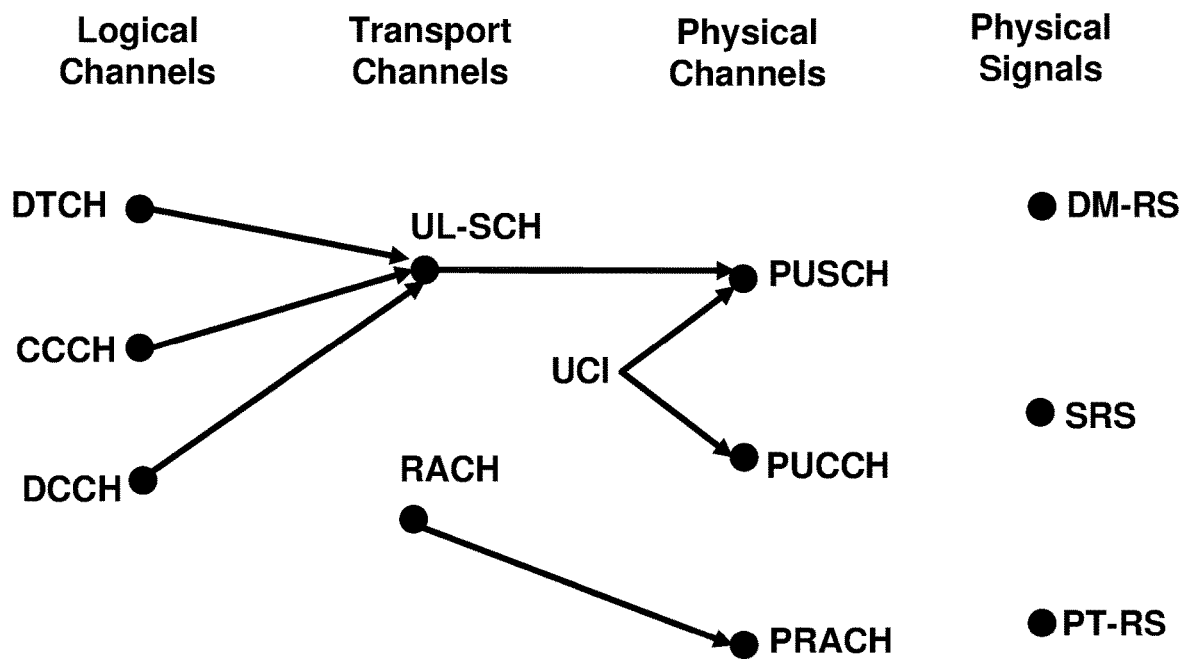
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
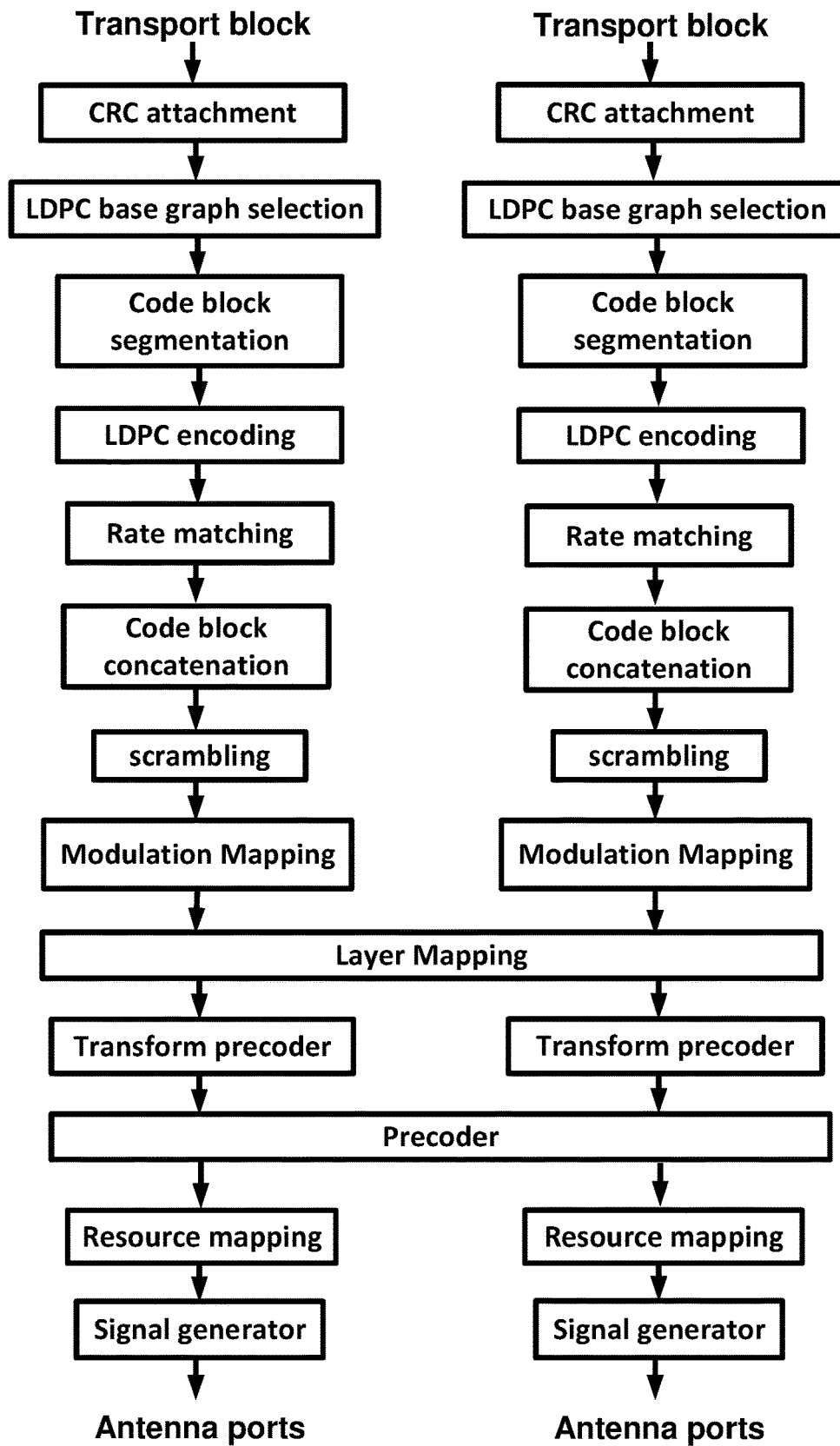
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
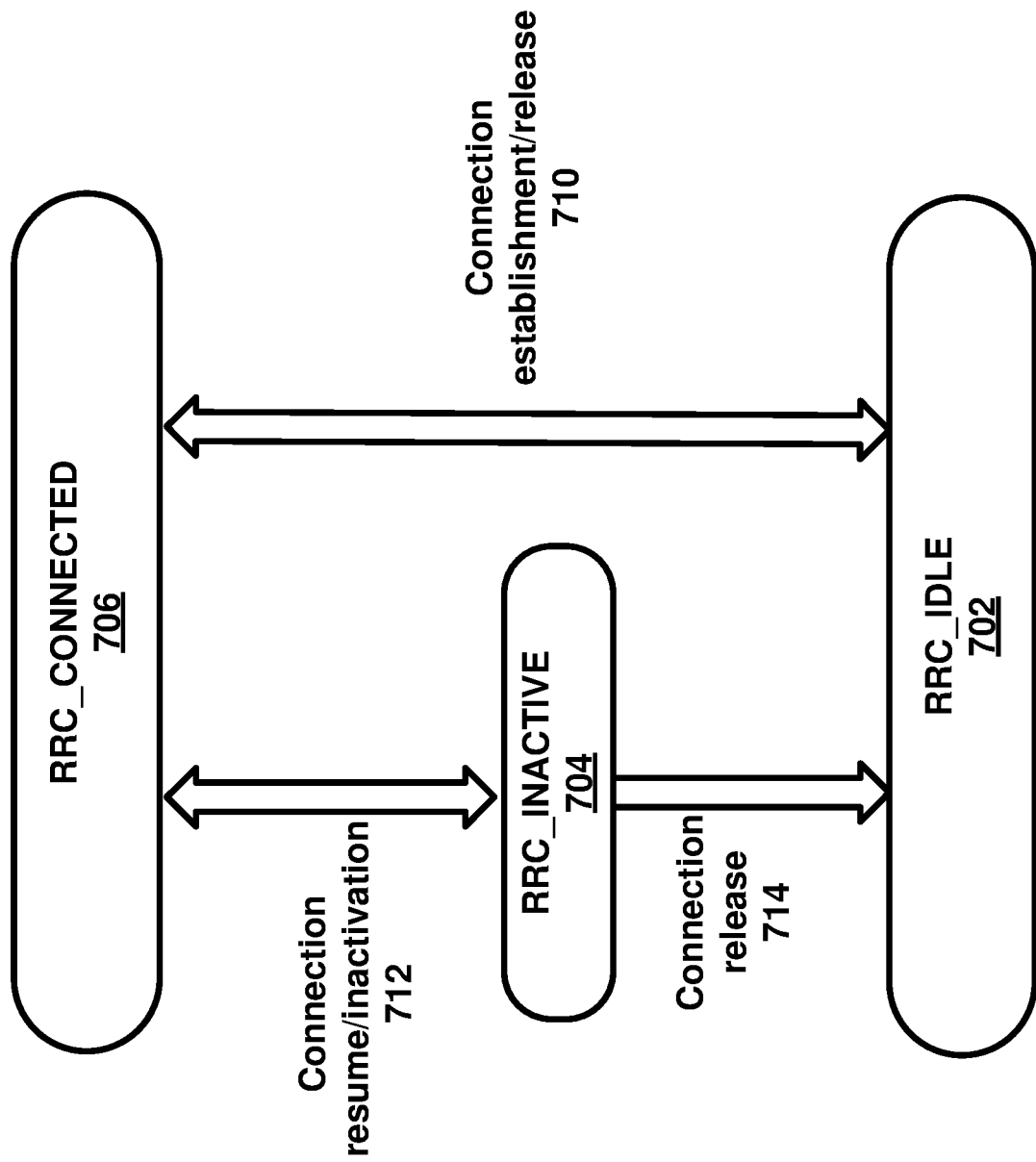
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 µs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu=0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g., the µ value).

Figure 8:
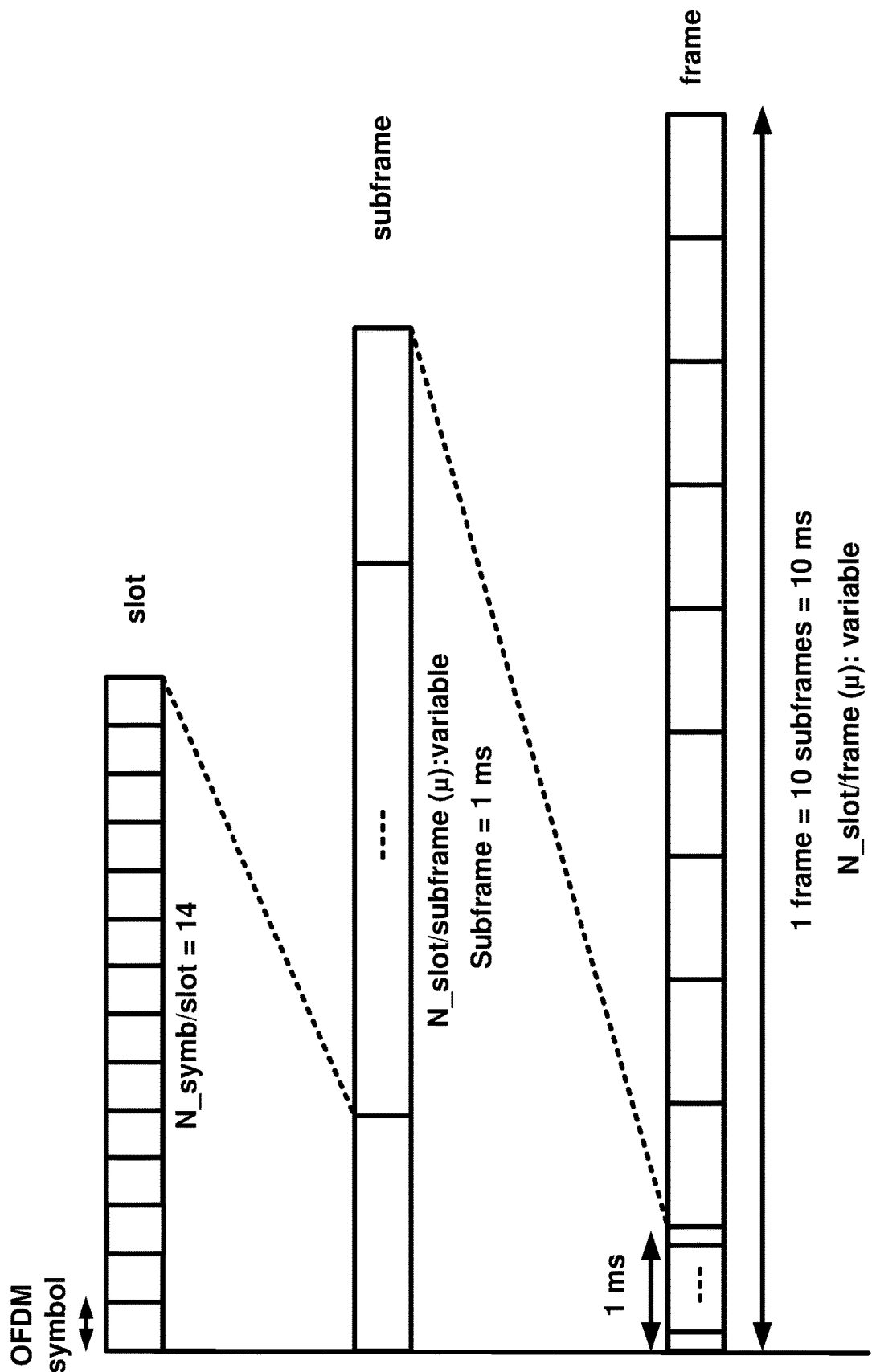
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of µ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
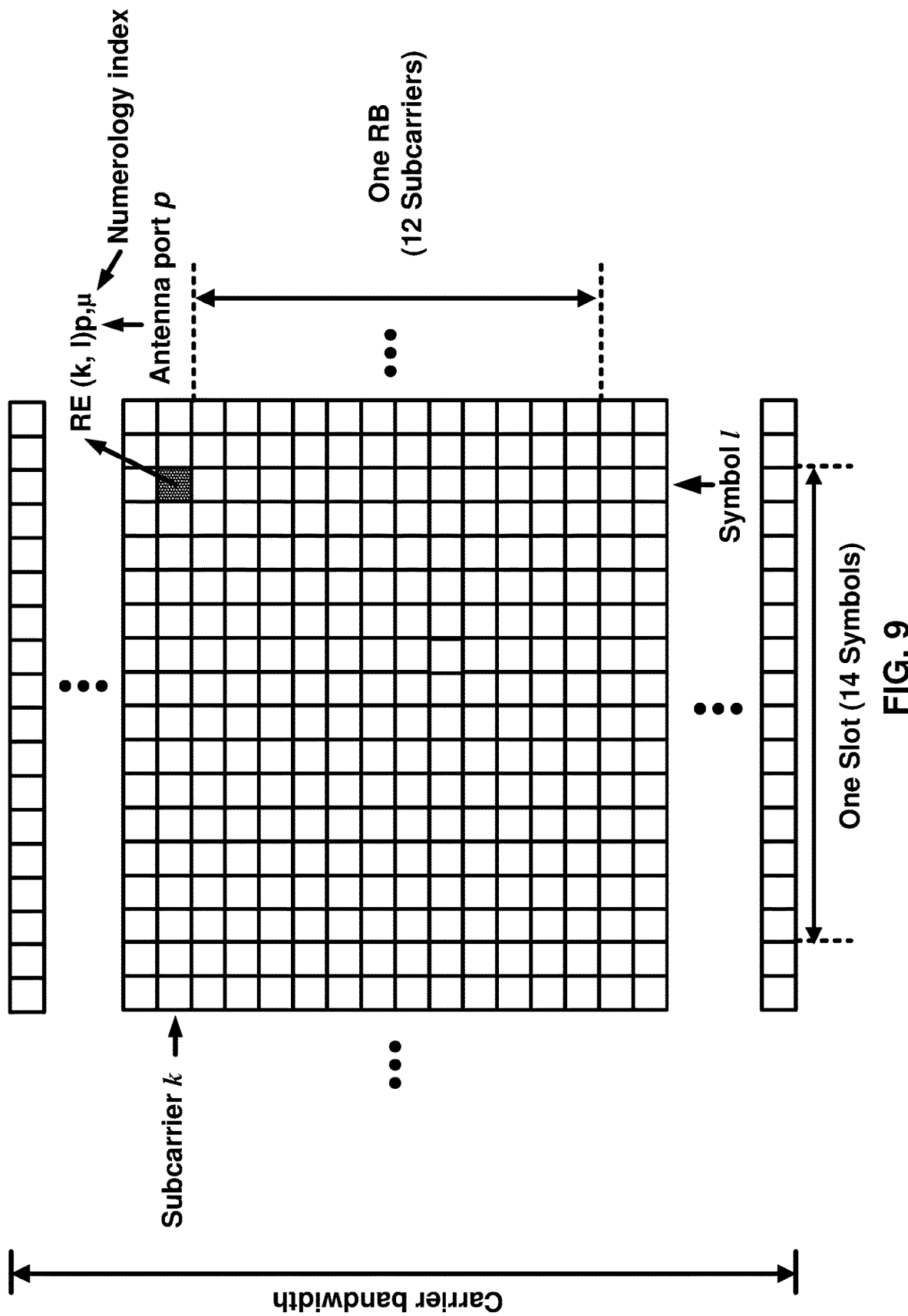
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
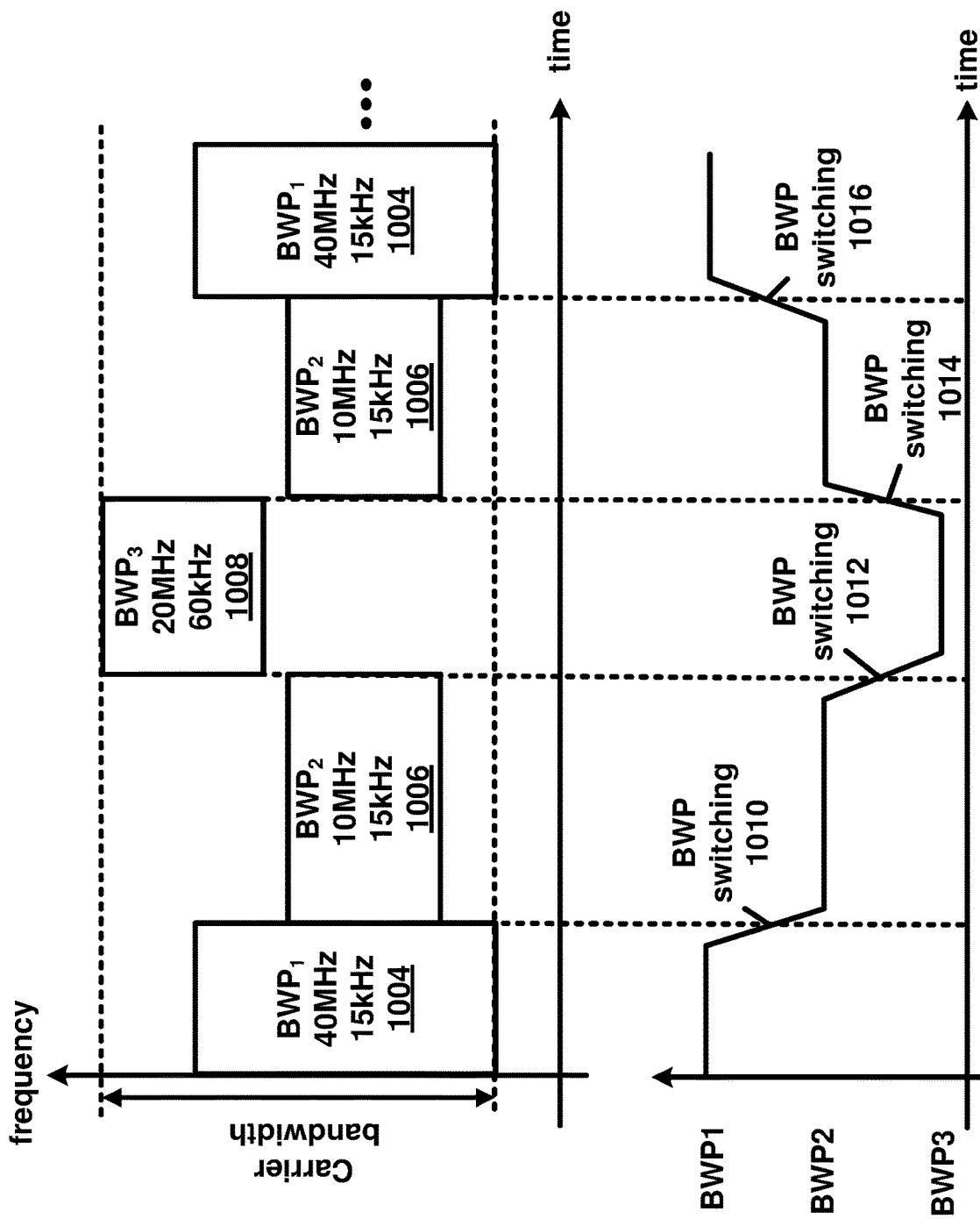
FIG. 10 shows example adaptation and switching of bandwidth parts in accordance with several of various embodiments of the present disclosure.

FIG. 10 shows an example of bandwidth part adaptation and switching. In this example, three BWPs (BWP$_1$ 1004, BWP$_2$ 1006 and BWP$_3$ 1008) are configured for a UE on a carrier bandwidth. The BWP$_1$ is configured with a bandwidth of 40 MHz and a numerology with subcarrier spacing of 15 KHz, the BWP$_2$ is configured with a bandwidth of 10 MHz and a numerology with subcarrier spacing of 15 KHz and the BWP$_3$ is configured with a bandwidth of 20 MHz and a subcarrier spacing of 60 KHz. The wireless device may switch from a first BWP (e.g., BWP$_1$) to a second BWP (e.g., BWP$_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
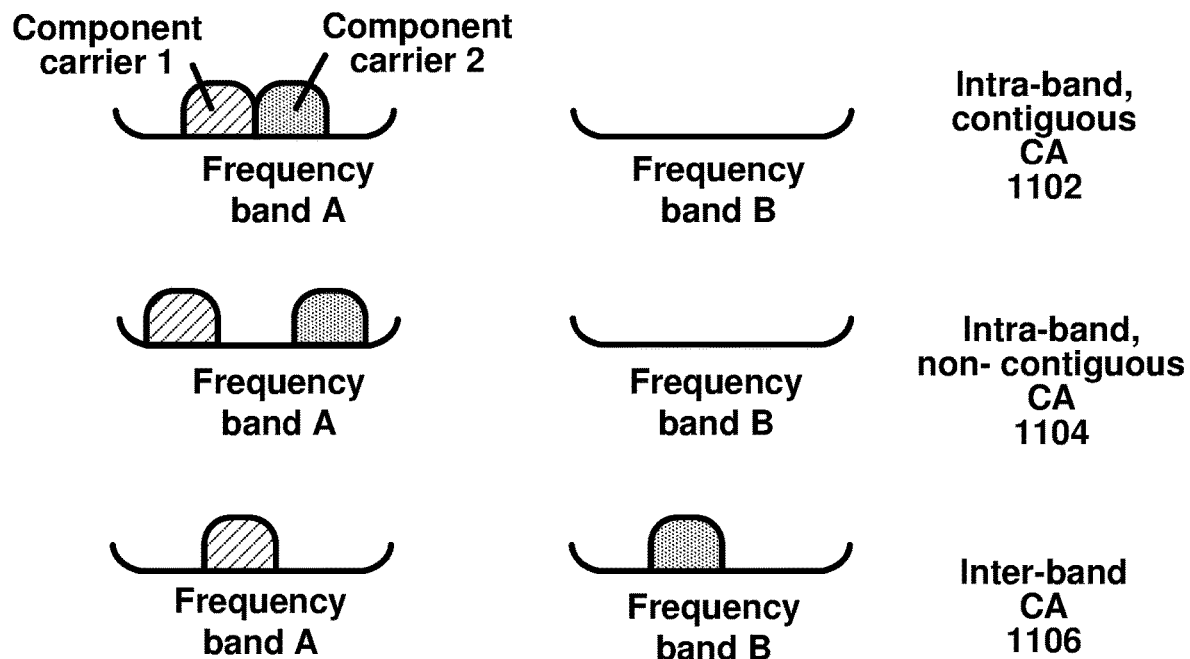
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
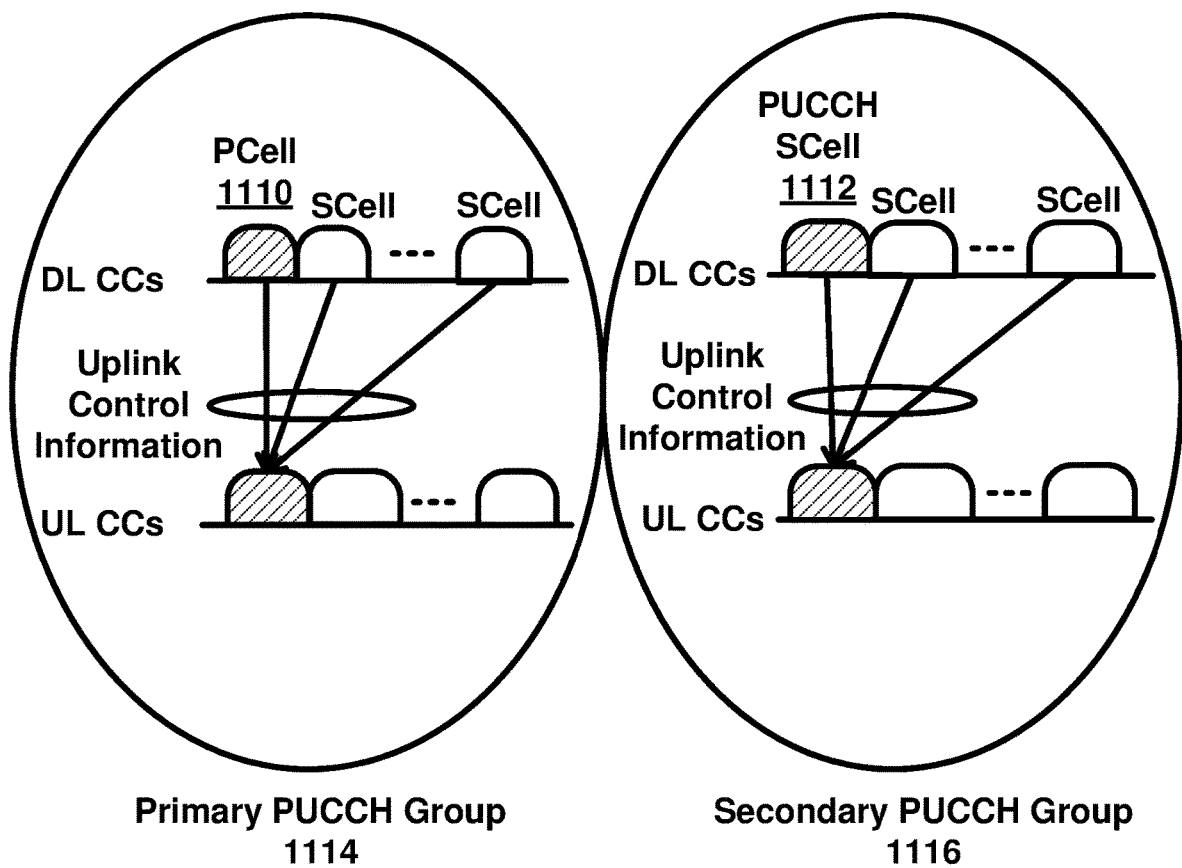
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
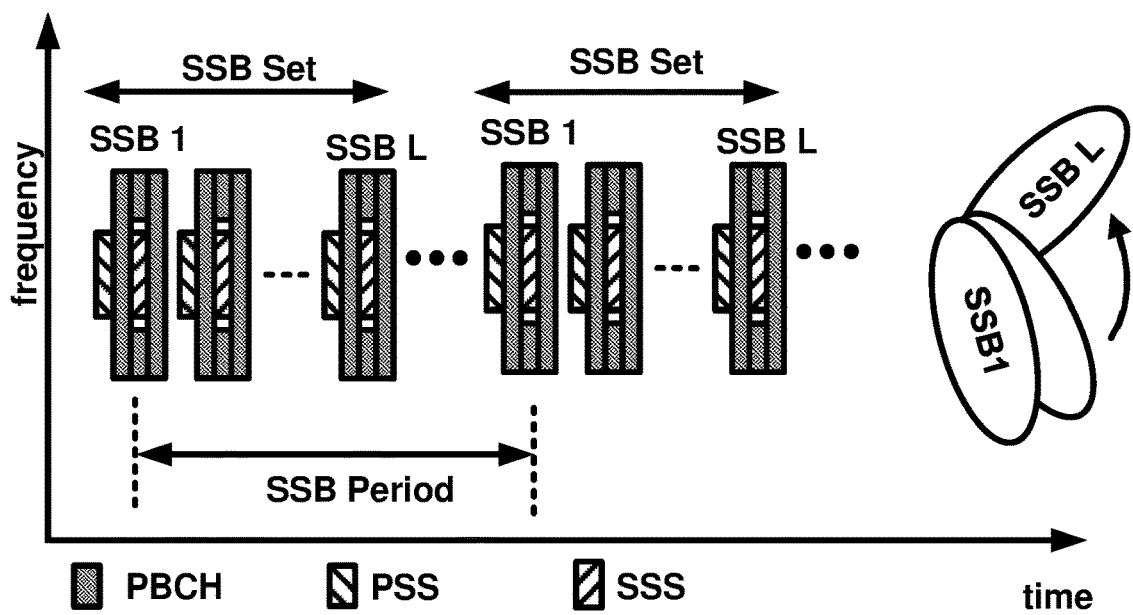
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
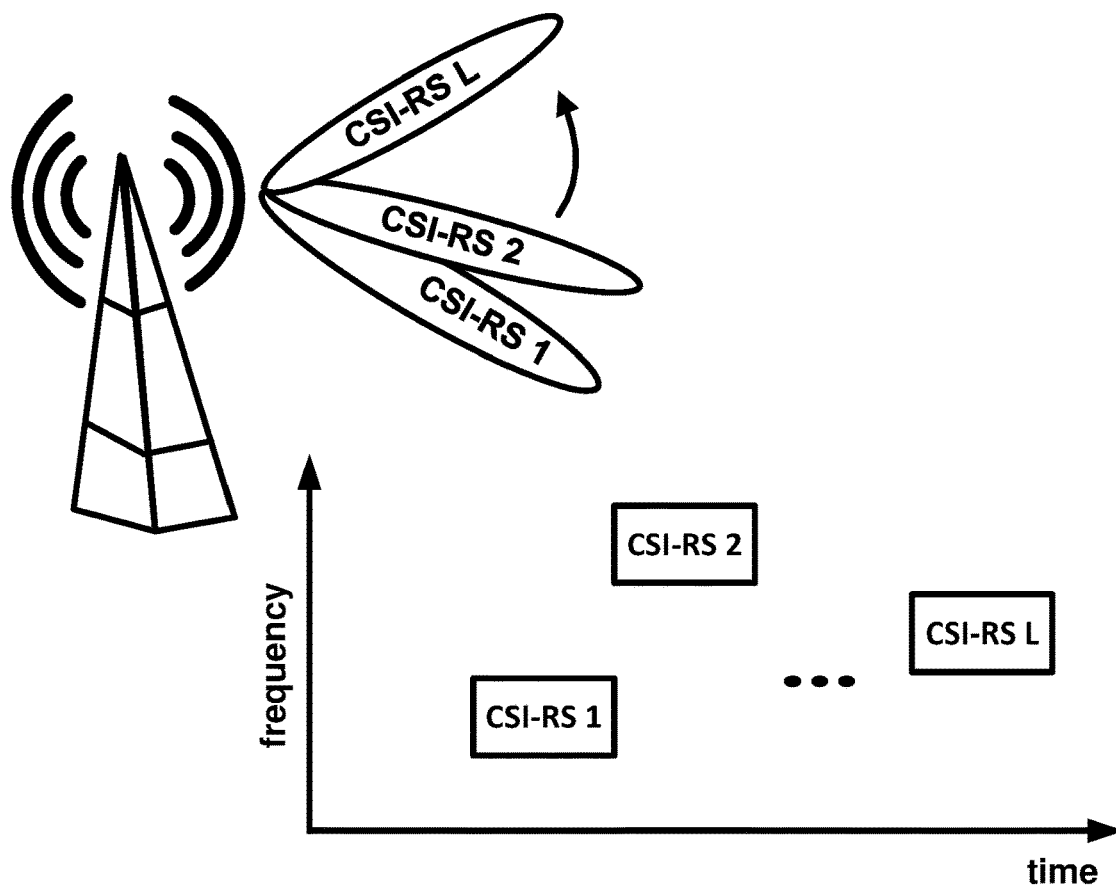
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
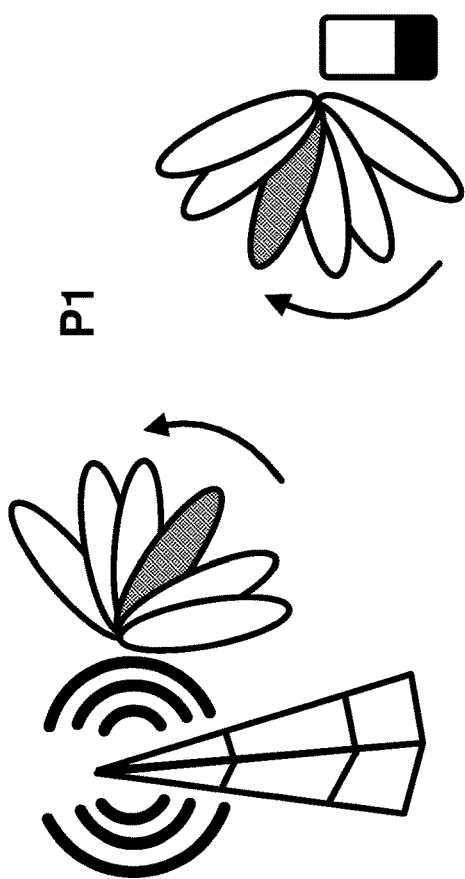
FIG. 14A, FIG. 14B and FIG. 14C show example beam management processes in accordance with several of various embodiments of the present disclosure.
Figure 14C:
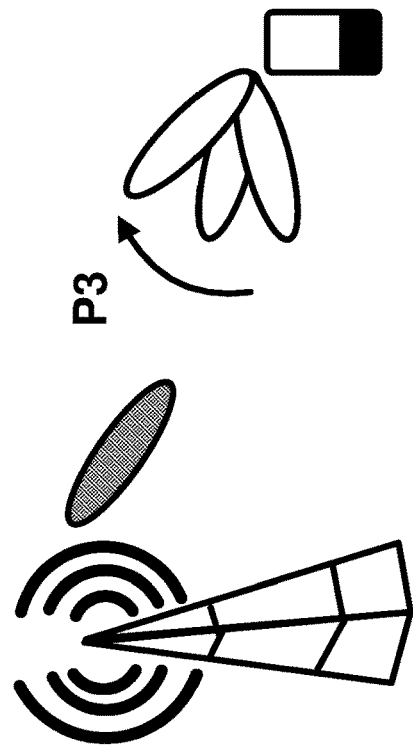
Figure 14B:
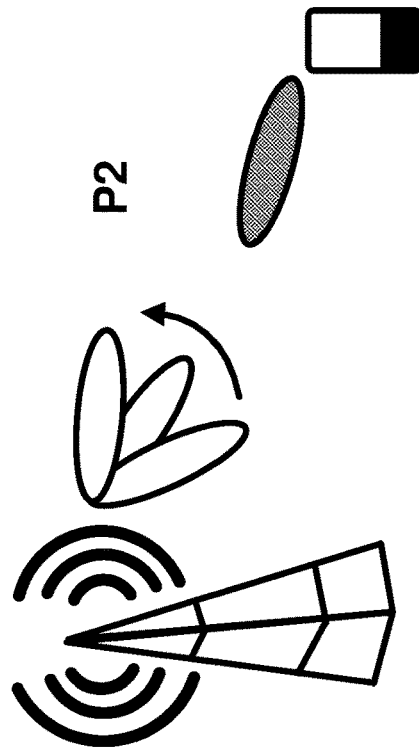

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells.

For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
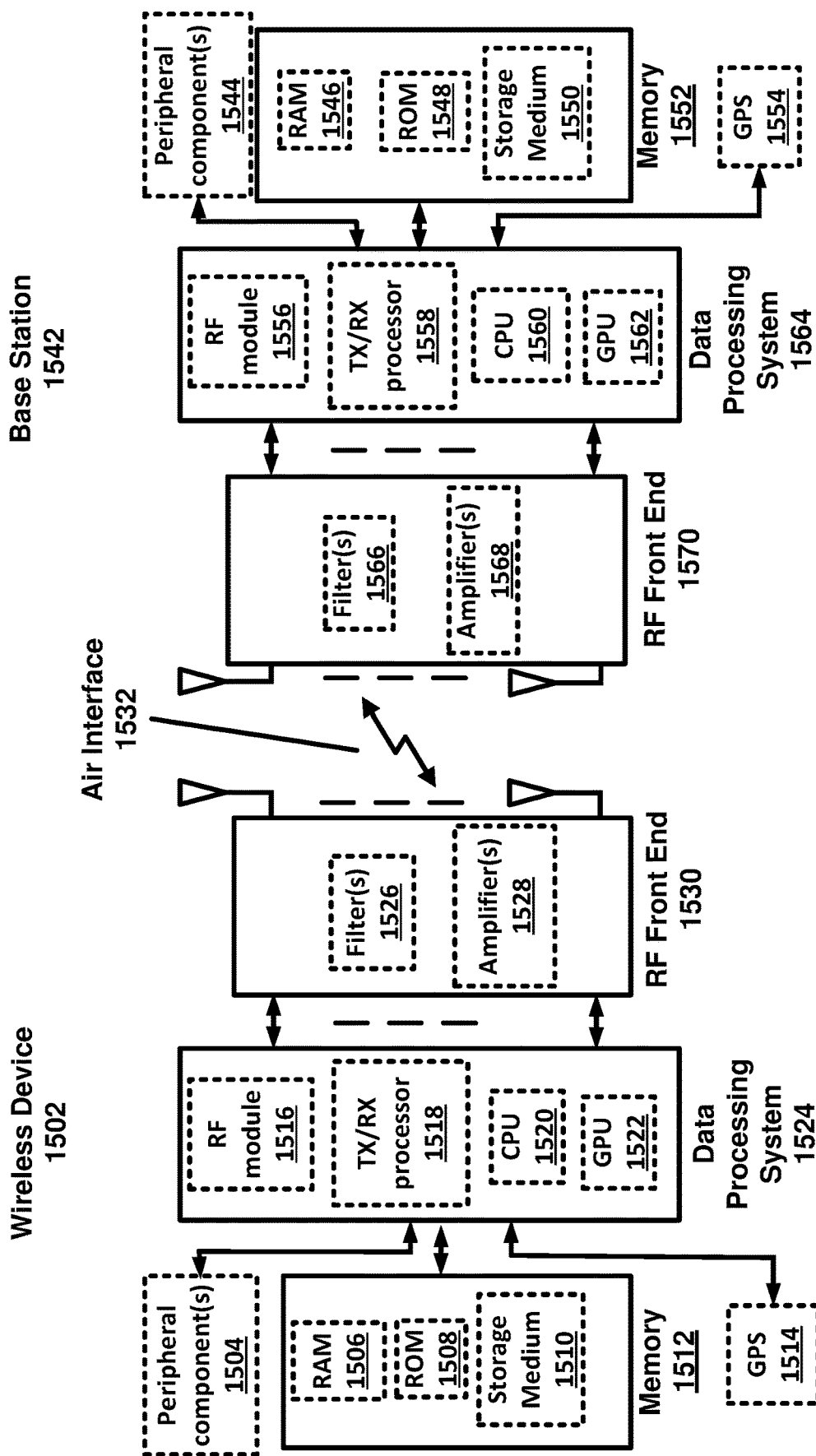
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier (s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation.

For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, at least for the case of a known cell, a reference signal (RS) may be supported to expedite the activation process during the SCell activation procedure for efficient SCell activation for both frequency range 1 (FR1) and frequency range 2 (FR2). The RS may provide at least the functionalities of automatic gain control (AGC) settling and time/frequency tracking during SCell activation procedure. In an example, the RS may be used in CSI measurement/acquisition and cell search. In an example, tracking reference signal (TRS) may be selected as the RS for SCell activation. In an example, the TRS may be triggered by DCI and/or MAC CE.

In an example, a wireless device may measure the triggered RS during SCell activation procedure no earlier than a predetermined slot m. In an example, the triggered RS may be associated with a BWP. The measurement of the RS may be independent of the activation state of the BWP.

In an example, for efficient SCell activation, a number of burst/symbols of a reference signal (RS) may be required for automatic gain control (AGC) settling and Time/Frequency tracking for different cases, e.g., frequency range 1 (FR1) and frequency range 2 (FR2), known and unknown SCell. In an example, a burst of the RS may be 2-slot with four CSI-RSs resources (4 samples) for FR1. In an example, a burst of the RS may be 1-slot with two CSI-RSs resources (2 samples) or 2-slot with four CSI-RSs resources (4 samples) for FR2.

In an example, for efficient SCell activation, the trigger of the RS, used in SCell activation, may be integrated into a single triggering signaling with the trigger of SCell activation transmitted on an activated cell. In an example, the triggering of RS may be separate from SCell activation command. In an example, both separate and integrated triggers may be used for SCell activation.

In an example, a PDSCH TB containing two respective MAC CEs for both triggers may be used. In an example, a PDSCH TB containing one MAC CE for both triggers may be used. In an example, a DCI may be used for both triggers. In an example, a PDSCH TB may contain the MAC CE for SCell activation and its scheduling DL grant may be used to trigger the RS. In an example, a DL grant and an UL grant received in the same slot/OFDM symbols of PDCCH may be used, wherein the DL grant may be scheduling a PDSCH TB containing MAC CE for SCell activation and the UL grant may be used for triggering the RS. In an example, SCell activation MAC CE may be used for SCell activation and a specific configuration of RS may be implicitly triggered and used in SCell activation.

In an example, for separate triggering signaling, SCell activation MAC-CE may be used as SCell activation command and DCI may be used for triggering RS.

In an example, layer 1 (L1) signaling may be used to lower the SCell activation latency compared to layer 2 (L2) signaling. In an example, efficient SCell activation via L1 aperiodic RS (e.g., based on TRS, CSI-RS, or SRS) and the SCell activation procedure may be initiated when UE receives a temporary RS trigger associated with the SCell.

In an example, a base station may configure (for example based on UE capability and/or receiving a capability message comprising one or more IEs indicating that UE is capable) one or more of aperiodic CSI-RS, periodic and/or semi-persistent CSI-RS, SRS, and RS based on SSS/PSS as the RS used during SCell activation.

In an example, the RS for SCell activation many be be triggered by DCI or MAC CE. In an example, a DCI triggering mechanism for aperiodic TRS may be used (e.g., by DCI 0_1 or 0_2). In an example, a DCI field in the DCI scheduling the SCell activation command may be used to trigger TRS. In an example, TRS and SCell activation may be triggered by a DCI format or a DCI field. In an example, TRS may be triggered by an explicit MAC CE, or implicitly by the SCell activation command.

In an example, a group-common DCI (e.g., a non-scheduling DCI) may be used for triggering SCell activation and RS.

In an example, when MAC CE is used for fast SCell activation, target SCell ID may be included in the MAC CE. In an example, TRS triggering information (e.g., trigger state ID) may be included in the MAC CE.

In an example, when DCI is used for fast SCell activation, the TRS trigger state ID may be included in the DCI.

In an example, when SCell activation command in MAC CE for a SCell is received, same or other MAC CE in the same PDSCH may indicate one state from preconfigured list of CSI trigger states for a BWP of a SCell. The TCI-state associated with the triggered TRS may be activated.

In an example, a UE may measure the RS regardless of the state of a BWP during SCell activation procedure. In an example, the base station may indicate which BWP the UE measures the RS on along with the indication of triggering the RS. In an example, if there is no indication on which BWP the UE measures the temporary RS on, the first Active Downlink BWP may be used.

Figure 16:
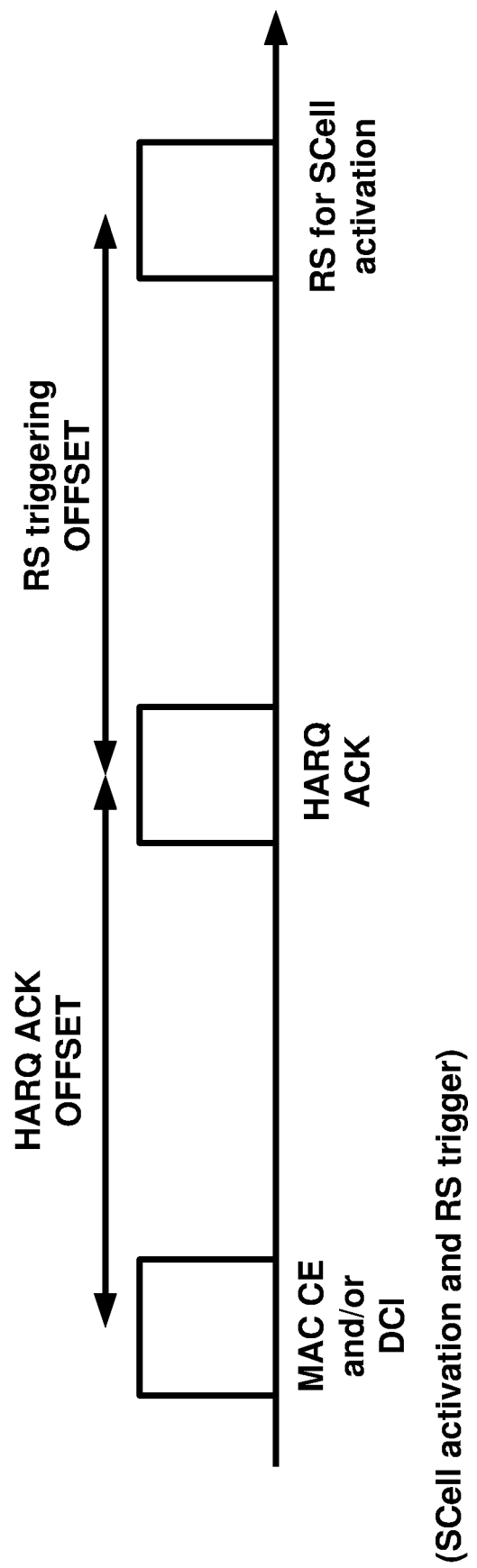
FIG. 16 shows an example SCell activation process in accordance with several of various embodiments of the present disclosure.

An example SCell activation process with triggering of an RS (e.g., a temporary RS such as TRS) for efficient SCell activation is shown in FIG. 16. The wireless device may receive one or more triggering/activation commands (e.g., one or more MAC CEs, one or more DCIs, a combination of a MAC CE and a DCI, etc.) for efficient SCell activation and triggering of the RS used in SCell activation. The one or more triggering/activation commands may be acknowledged, e.g., by transmission of a HARQ feedback at a timing, for example, a timing indicated by a DCI (e.g., s scheduling DCI), etc. The time duration between the reception of the one or more triggering/activation commands and the HARQ ACK may be referred to as K1. The wireless device may receive the RS (e.g., the temporary RS) used in SCell activation (e.g., TRS, CSI-RS, etc.) at a timing which is an offset from the transmission timing of the HARQ ACK of the one or more triggering/activation commands. The offset from the transmission timing of the HARQ ACK and the timing of reception of the RS used in the SCell activation may be based on one or more configuration parameters and/or values of one or more fields of the one or more triggering/activation commands (e.g., one or more MAC CEs, one or more DCIs, a combination of a MAC CE and a DCI, etc.) for efficient SCell activation and triggering of the RS used in SCell activation.

Existing solutions for more efficient activation of secondary cells may be based on activation/triggering and reception of reference signals (e.g., temporary reference signals) and using the reference signals in secondary cell activation. Existing physical and/or MAC layer signaling for triggering/activation of SCells and/or reference signals and/or related procedures may not be efficient. There is a need to enhance the existing signaling for triggering/activation of SCells and/or reference signals and/or related procedures. Example embodiments enhance the existing signaling for triggering/activation of SCells and/or reference signals and/or related procedures.

In an example embodiment, a wireless device may receive one or more messages comprising configuration parameters. The one or more messages may comprise one or more RRC messages. The one or more messages may comprise configuration parameters of a plurality of cells. The plurality of cells may comprise a primary cell and one or more secondary cells. The plurality of cells may be provided by a single base station (e.g., in case of single-connectivity) or multiple base stations (e.g., in case of multi-connectivity, e.g., two base stations in case of dual-connectivity). In case of dual connectivity, the plurality of cells may be grouped into a master cell group (MCG) provided by a master base station and a secondary cell group (SCG) provided by a secondary base station. One of the one or more secondary cells in a SCG may be referred to as a primary secondary cell (PS-Cell).

In an example, a cell, in the plurality of cells, may be configured/enabled with a first type of activation process or may be configured/enabled with both of the first type of activation process and a second type of activation process. For example, configuration parameters of the cell may comprise one or more parameters indicating that the cell is configured/enabled with the first type of activation process. For example, the one or more parameters may indicate that the cell is configured/enabled with both the first type of activation process and a second type of activation process. For example, the wireless device may receive a MAC CE comprising field, a value of the field indicating that the cell is configured/enabled with a first type of activation process or that the cell is configured/enabled with both the first type of activation process and a second type of activation process. In response to the cell being configured with the first type of activation process or both of the first type and second type of activation process, the wireless device may receive signaling indicating activation of the first cell based on the first type of activation process.

In an example, the plurality of cells may be grouped into a plurality of cell groups (e.g., a MCG or a SCG). In an example, a cell group may be associated with a MAC entity. A cell group, in the plurality of cell groups, may comprise one or more cells and the cell group may be configured/enabled with the first type of activation process or may be configured/enabled with both a first type of activation process and a second type of activation process. The one or more cells of the cell group may be activated using the first activation process based on the cell group being configured/enabled with first activation process. For example, the configuration parameters of the cell group may comprise one or more parameters indicating that the cell group is configured with the first type of activation process or that the cell group is activated with both the first type of activation process and the second type of activation process. For example, the configuration parameters of a cell may comprise a first parameter indicating that the cell belongs to a first cell group and the configuration parameters of the cell may comprise one or more second parameters indicating that the cell is configured with the first type of activation process or that the cell is configured with both of a first type of activation process and a second type of activation process. For example, the wireless device may receive a MAC CE comprising field, a value of the field indicating that the cell group is configured/enabled with a first type of activation process or that the cell group is configured/enabled with both the first type of activation process and a second type of activation process. In response to the cell group being configured with the first type of activation process or both of the first type and second type of activation process, the wireless device may receive signaling indicating activation of one or more cells of the cell group based on the first type of activation process.

In an example, the wireless device may be configured/enabled with the first type of activation process or both of a first type of activation process and a second type of activation process. For example, the wireless device may receive one or more configuration parameters indicating that the wireless device is configured/enabled with the first type of activation process or that the wireless device is configured/enabled with both of the first type of activation process and the second type of activation process. For example, the wireless device may receive a MAC CE comprising field, a value of the field indicating that the wireless device is configured/enabled with a first type of activation process or that the wireless device is configured/enabled with both the first type of activation process and a second type of activation process. In response to the wireless device being configured with the first type of activation process or both of the first type and second type of activation process, the wireless device may receive signaling indicating activation of one or more cells, of the plurality of cells configured for the wireless device, based on the first type of activation process.

In an example embodiment, a first number of cells, of the plurality of configured cells for the wireless device, may be configured with the first type of activation. The first number may be at most N (e.g., N=8, 16, 24, etc.). At most N cells of the plurality of cells may be configured with activation using the first type of activation process. In an example, the number of cells, of the plurality of cells, that may be activated using the first type of activation may not be limited, e.g., all of the cells configured for the wireless device may be configured with the first type of activation.

Figure 17:
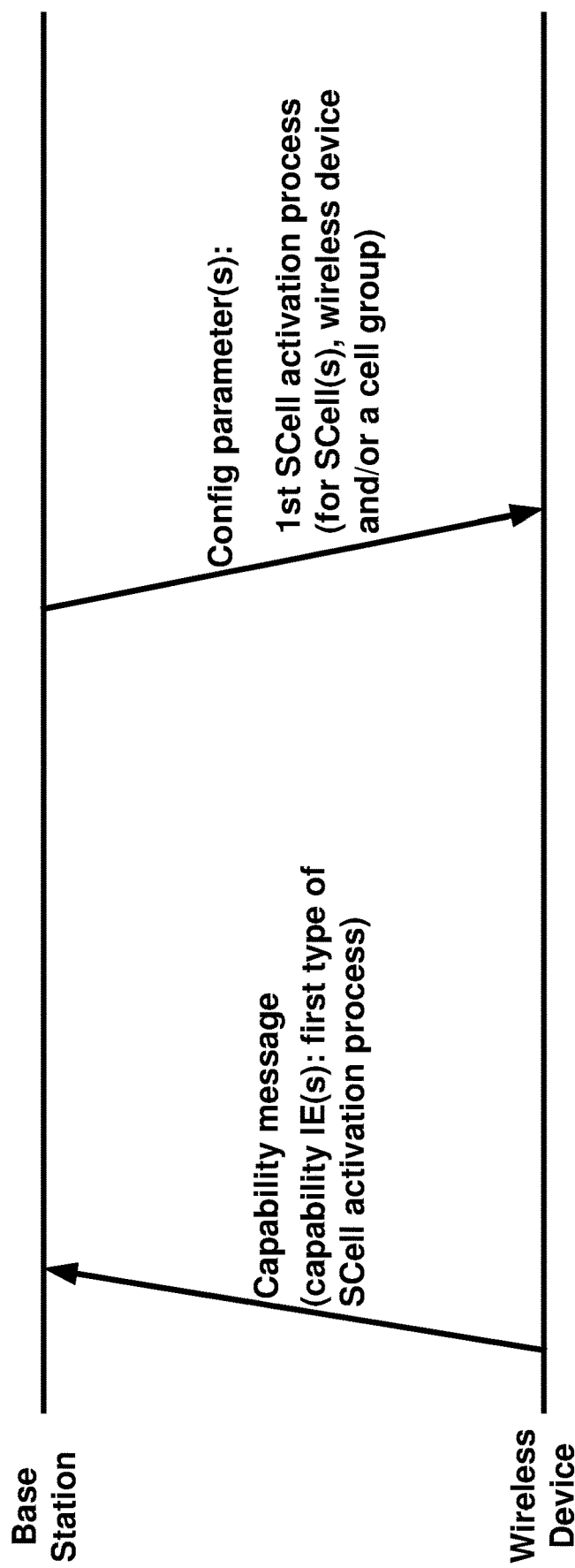
FIG. 17 shows an example process in accordance with several of various embodiments of the present disclosure.

In an example embodiment, as shown in FIG. 17, a wireless device may transmit a capability message, to a base station, comprising one or more capability information elements (IEs) associated with various wireless device capabilities (e.g., associated with parameters used in different procedures and based on wireless device hardware/software capabilities). In an example, the one or more capability IEs may comprise a capability IE indicating whether the wireless device is capable of supporting the first type of activation process. In an example, the one or more capability IEs may comprise a capability IE indicating whether a cell of the wireless device or a cell group (e.g., MCG or SCG) of the wireless device and/or cells associated with a MAC entity of the wireless device is capable of activation using the first type of activation process. In an example, the one or more capability IEs may comprise a capability IE indicating a maximum number of cells that the wireless device is capable of activation using the first type of activation process and/or a maximum number of cells that the wireless device is capable of simultaneous activation using the first type of activation process. In an example, in response to transmission of the capability message comprising the one or more capability IEs, the wireless device may receive one or more messages comprising configuration parameters associated with the first type of activation process. For example, the configuration parameters may comprise one or more parameters indicating that a configured cell is configured with a first type of activation process and/or that a cell group (e.g., a MCG or a SCG or a cell group associated with a MAC entity) is configured with a first type of activation process and/or that the wireless device is configured with the first type of activation process for its configured cells. In an example, in response to transmission of the capability message, the wireless device may receive one or more messages comprising configuration parameters indicating that cell activation for a cell configured for the wireless device or for all cells configured for the wireless device or all cells of a cell groups configured for the wireless device may be performed using the first activation process and/or using a first type/format of activation command (e.g., MAC CE or DCI). In an example, in response to transmission of the capability message, the wireless device may receive a MAC CE indicating that a configured cell is configured with a first type of activation process and/or that a cell group (e.g., a MCG or a SCG or a cell group associated with a MAC entity) is configured with a first type of activation process and/or that the wireless device is configured with the first type of activation process for its configured cells.

In an example, the first type of activation process may be based on triggering an RS (e.g., a temporary RS) and the wireless device may receive the RS and use the received RS in the activation process of a cell. In an example, the RS (e.g., the temporary RS) used in the first type of activation process may be TRS. Other types of reference signals (e.g., CSI-RS) may be used in the first type of activation process. The RS may provide one or more of the functionalities of automatic gain control (AGC) settling, time/frequency tracking during SCell activation procedure, CSI measurement/acquisition and cell search. The first type of activation process may result in a relatively faster activation of a cell than a second type of activation process (e.g., compared to a second type of activation process wherein a temporary RS is not triggered/indicated/activation with and used in SCell activation). A first timing of activation of a cell using the first type of activation process may be sooner than a second timing of the activation of the cell using a second type of activation process. For example, the RS (e.g., the temporary RS) may not be activated/triggered using the second type of activation process resulting in a relatively longer cell activation.

In an example, the first type of the activation process may be based on a first MAC CE (e.g., a first MAC CE associated with a first format, a first LCID, etc.) and the second type of activation process may be based on a second MAC CE (e.g., a second MAC CE associated with a second format and/or a second LCID).

In an example, the first MAC CE format (used in the first type of SCell activation process) may be a variable size MAC CE and the second MAC CE (used in the second type of activation process) may be a fixed size MAC CE (e.g., one octet or four octets). In an example, the first MAC CE may include a first field associated with activation of one or more cells and one or more second fields associated with activation of the RSs (temporary RSs) used in activation of the one or more cells. In an example, the number of the one or more second fields may depend on the number of cells that are being activated. The number of the one or cells that are being activated may be determined based on values of bits of the first field. The number of the cells that are being activated may be determined based on a number of cells that are deactivated prior to receiving an activation command and their state is indicated as activated in the activation command.

In an example, the first MAC CE may be used for SCell activation only. In an example, the first MAC CE may be used for SCell activation only and may not be used for SCell deactivation. In an example, the second MAC CE may be used for both cell activation and cell deactivation. For example, the wireless device may receive the first MAC CE (e.g., of the first format and/or associated with the first LCID) that indicate activation of a first cell and may receive the second MAC CE (e.g., of the second format and/or associated with the second LCID) that indicate deactivation of the first cell. In an example, the wireless device may receive configuration parameters indicating that the first cell is configured/enabled with the first type of activation and based on/in response to the first cell being configured/enabled with the first type of activation, the wireless device may receive the first MAC CE for activation of the first cell and may receive the second MAC for deactivation of the first cell.

In an example embodiment, an activation command (e.g., a command indicating SCell activation and/or triggering/activation of an RS used in SCell activation, and wherein the command may be a MAC CE or a DCI) may include a field comprising a plurality of bits, wherein each bit in the plurality of bits may correspond to a cell. The field may be a bitmap. For example, the i-th bit (e.g., $C_i$) of the bitmap may correspond to an i-th cell, e.g., the i-th cell in a set of cells that are ordered in an ascending order or descending order of cell indexes of a plurality of cells. In an example, the i-th bit (e.g., $C_i$) of the bitmap may correspond to the i-th cell in a set of cells that are ordered, in an ascending order or descending order, of cell indexes of a first plurality of cells that are configured with the first type of SCell activation (e.g., fast SCell activation). In an example, the i-th bit (e.g., $C_i$) of the bitmap may correspond to the i-th cell in a set of cells that are ordered, in an ascending order or descending order, of cell indexes of a first plurality of cells that are deactivated prior to reception of the command. In an example, the i-th bit (e.g., $C_i$) of the bitmap may correspond to the i-th cell in a set of cells that are ordered, in an ascending order or descending order, of cell indexes of a first plurality of cells that are configured with the first type of SCell activation (e.g., fast SCell activation) and are deactivated reception of the command.

In an example embodiment, an activation command (e.g., a command indicating SCell activation and/or triggering/activation of an RS used in SCell activation, and wherein the command may be a MAC CE or a DCI) may comprise a field indicating a cell to be activated. For example, the field may be a bitmap comprising a plurality of bits, wherein a bit of the plurality of the bits may be associated with a cell and a value of the bit (e.g., one) may indicate activation of the cell. In an example, the command may be used for both activation of the cell and indication/activation/triggering of the RS (e.g., temporary RS) used for activation of the cell. In an example, the command may further comprise one or more fields associated with the bit, wherein the one or more field may indicate/activate/trigger the RS used for activation of the cell. In an example, the one or more fields may indicate a configuration of the RS (e.g., a configuration of the RS of a plurality of RS configurations, e.g., a plurality of RRC configured RS configurations). In an example a configuration of RS may indicate the BWP (e.g., by including the BWP ID) and/or resources associated with transmission of the RS. For example, a field of the one or more fields may comprise a value/ID identifying the configuration of the RS from the plurality of configurations of the RS.

Figure 18:
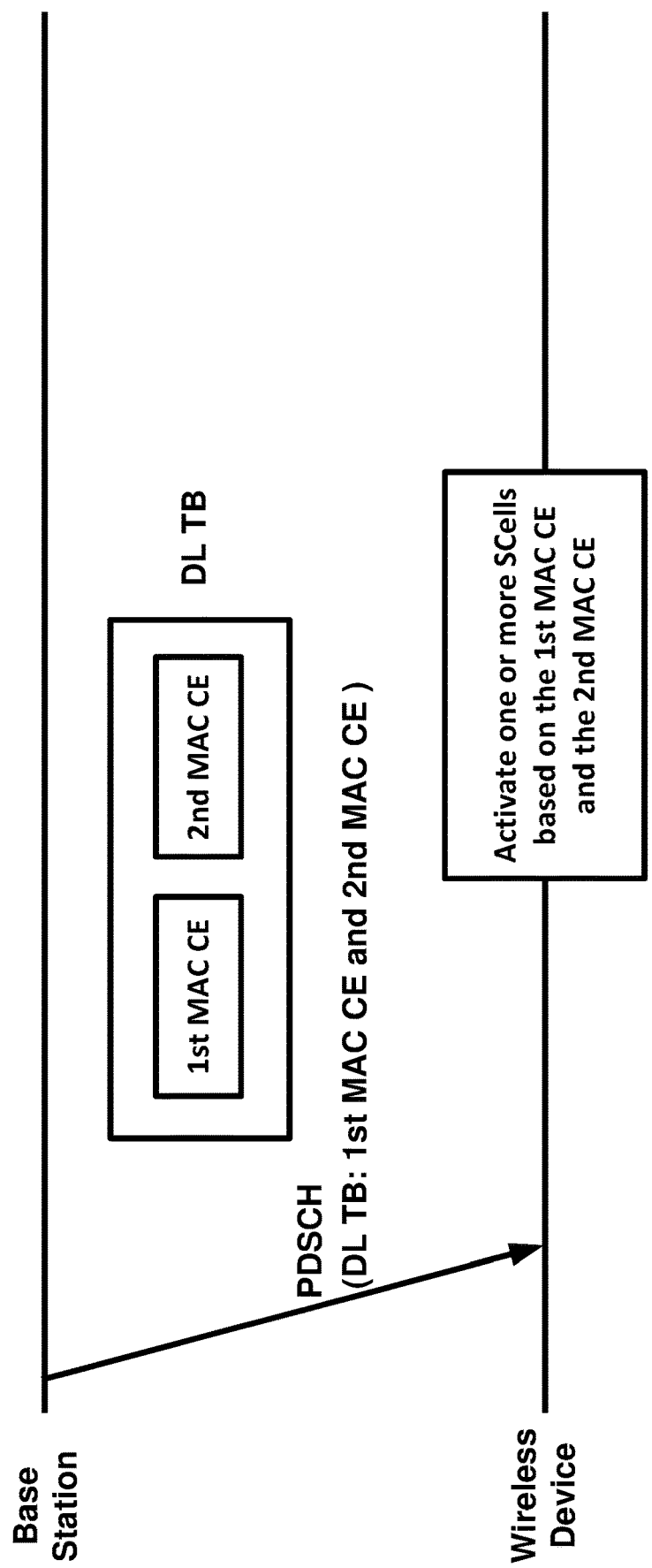
FIG. 18 shows an example process in accordance with several of various embodiments of the present disclosure.

In an example embodiment as shown in FIG. 18, a wireless device may receive one or more messages (e.g., one or more RRC messages) comprising configuration parameters of a plurality of cells. The wireless device may receive a TB, via a PDSCH, comprising a first MAC CE and a second MAC CE. For example, the wireless device may receive a DCI comprising scheduling information for reception of the TB. The first MAC CE and the second MAC CE may be used in activation of one or more SCells. The first MAC CE may be for indication of the one or more SCells to be activated and the second MAC CE may be for triggering/activation/indication of RSs used in activation of the one or more SCells. The first MAC CE may be of a first size and the first size may be fixed (e.g., one octet or four octets). The first MAC CE may comprise a plurality of bits. In an example, the plurality of bits may be a bitmap, wherein each bit in the bitmap may correspond to a cell. For example, the i-th bit (Ci) of the bitmap may be associated with the i-th cell in a set of configured cells ordered, for example, based on the cell indexes of the set of cells.

Figure 19:
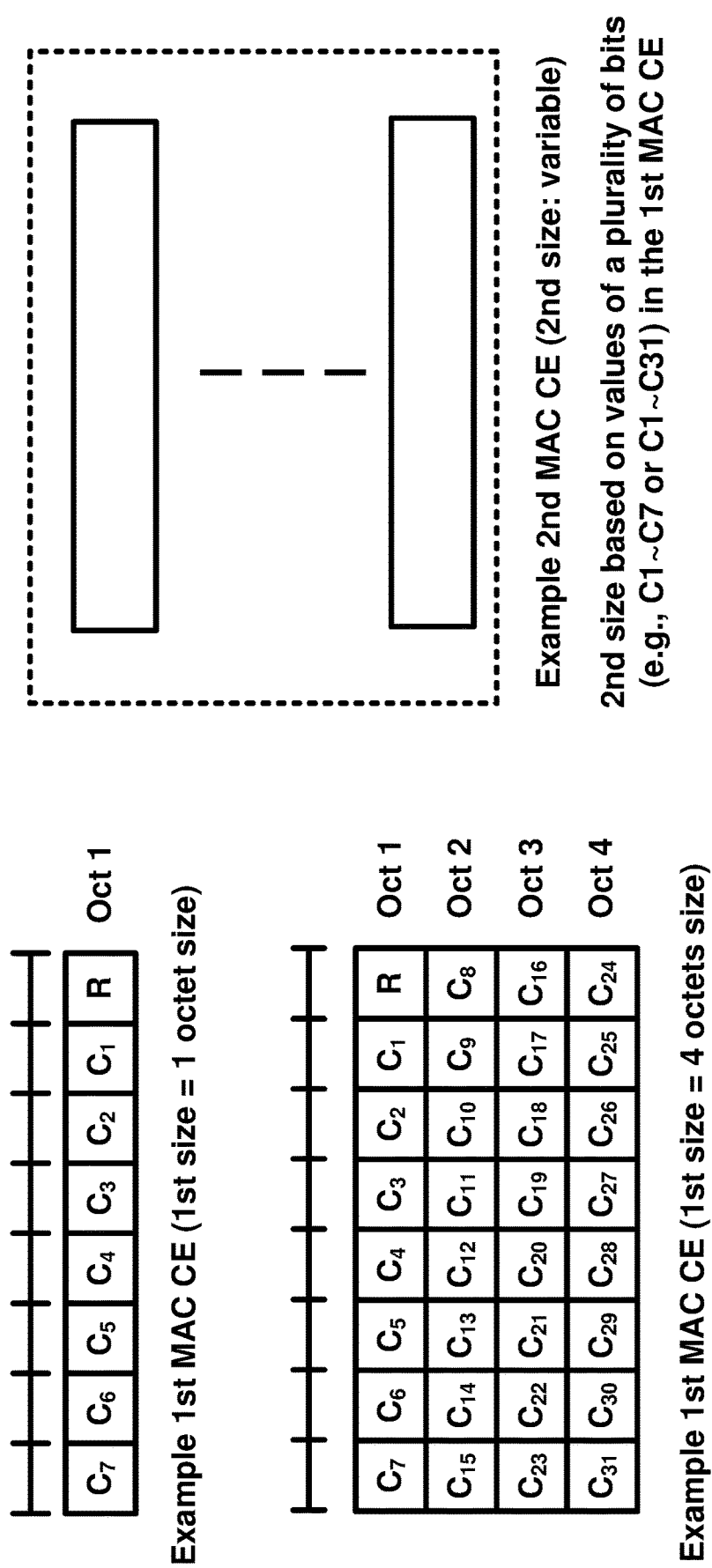
FIG. 19 shows example medium access control (MAC) control element (CE) formats in accordance with several of various embodiments of the present disclosure.

In an example as shown in FIG. 19, a second size of the second MAC CE may be variable and may be based on values of the plurality of bits of the first MAC CE. For example, the first size of the MAC CE may be one octet or four octets and the second size of the MAC CE may be based on values of the plurality of bits of the first MAC CE (e.g., based on values of $C1{\sim}C7$ in case the first MAC CE is of a one octet size and based on values of $C1{\sim}C31$ in case the first MAC CE is of four octet size). The plurality of bits may comprise one or more first bits that have values of one. In an example, the second size of the second MAC CE may be based on a first number of the one or more first bits that have values of one. In an example, one or more second bits, of the one or more first bits that have values of one, may be associated with one or more first cells of the plurality of cells and the one or more first cells may be deactivated prior to receiving the transport block (comprising the first MAC CE and the second MAC CE). The one or more first bits that have values of one may correspond to the one or more first cells that are deactivated prior to receiving the transport block and zero or more second cells that are activated prior to receiving the transport block.

In an example, the one or more first cells may be configured/enabled with the first type of activation process (e.g., the activation process based on triggering/activation/indication of temporary RS used in activation of the one or more first cells resulting in activation of the one or more first cells in one or more first timings and is a relatively faster activation process than the second activation process). For example, the wireless device may receive configuration parameters indicating that the one or more first cells are configured/enabled with the first type of activation process. The second MAC CE may indicate activation/triggering of one or more reference signals for activation of the one or more first cells using the first type of activation process.

In an example, the second MAC CE may indicate activation/triggering of one or more reference signals for activation of at least a portion/subset of the one or more first cells using the first type of activation process. For example, the second MAC CE may indicate the portion/subset of the one or more first cells that are activated using the first type of activation process. For example, the second MAC CE may comprise a field indicating the portion/subset of the one or more first cells for activation using the first type of activation process.

The wireless device may use the first MAC CE and the second MAC CE and may activate one or more first cells, of the plurality of cells, based on the first MAC CE and the second MAC CE. The activation of at least a portion/subset of the one or more first cells may be based on the first activation process using the triggered/activated/indicated RS by the second MAC CE and resulting in a fast activation of the one or more first cells. In an example, the one or more first cells may be deactivated prior to receiving the transport block (comprising the first MAC CE and the second MAC CE).

Figure 20:
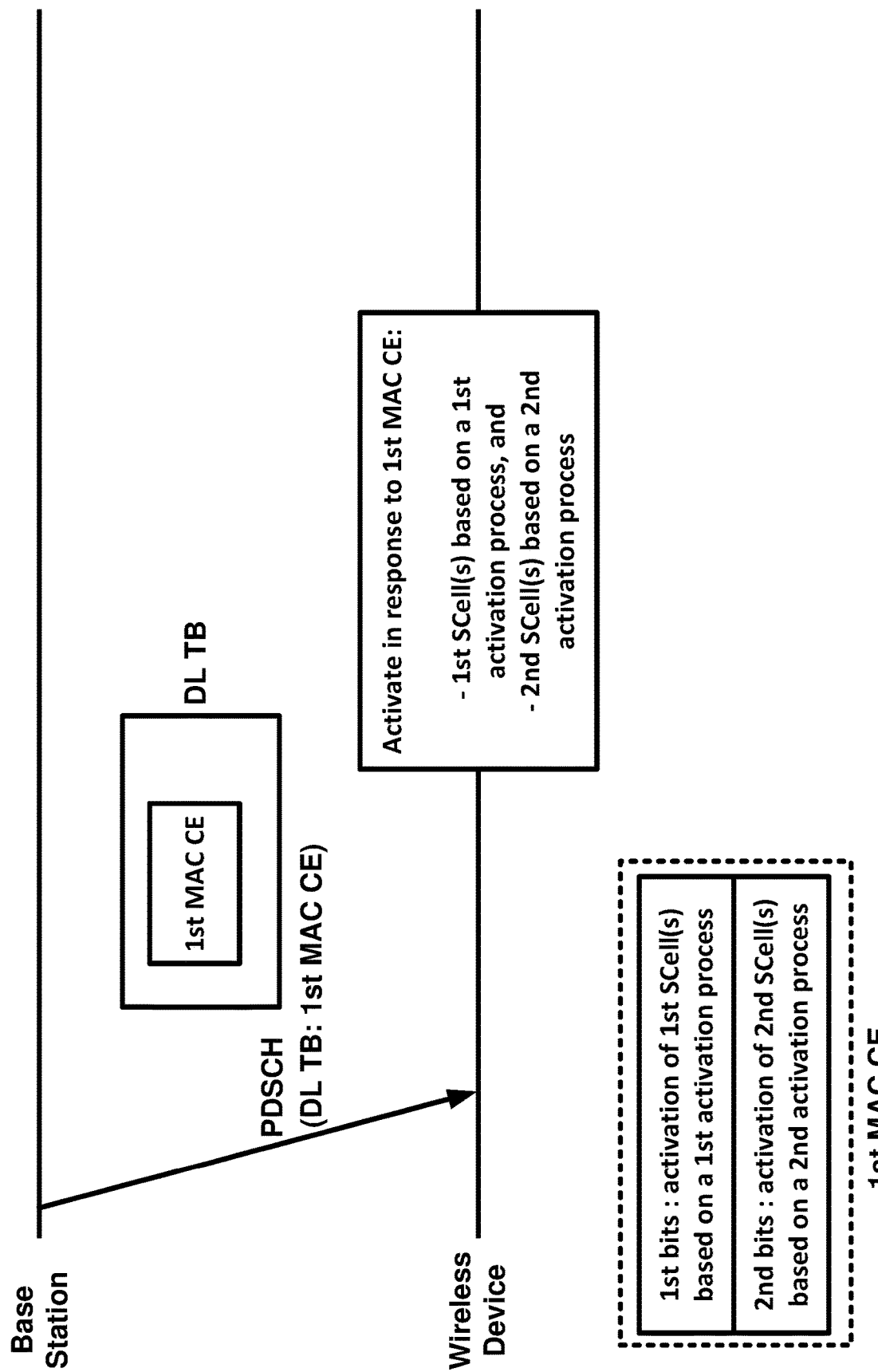
FIG. 20 shows an example process in accordance with several of various embodiments of the present disclosure.

In an example embodiment as shown in FIG. 20, a wireless device may receive one or more messages (e.g., one or more RRC messages) comprising configuration parameters of a plurality of cells. The wireless device may receive a TB, via a PDSCH, comprising a first MAC CE. For example, the wireless device may receive a DCI comprising scheduling information for reception of the TB and the wireless device may receive the TB based on the scheduling information indicated by the DCI. The first MAC CE may be used for SCell activation. The first MAC CE may comprise a comprise a first plurality of bits and a second plurality of bits. For example, the first plurality of bits may be used as a first bitmap and the second plurality of bits may be used as a second bitmap. The first plurality of bits may indicate activation of one or more first cells, of the plurality of cells, using the first type of activation process. The second plurality of bits may indicate activation of one or more second cells, of the plurality of cells, using the second type of activation process. In response to reception of the TB/first MAC CE, the wireless device may activate the one or more first cells, using the first type of activation process, and the one or more second cells using the second type of activation process.

In an example, the wireless device may receive configuration parameters indicating that the one or more first cells are configured/enabled for activation via the first type of activation process. In an example, the wireless device may receive configuration parameters indicating that a first plurality of cells, comprising the one or more first cells, are configured/enabled for activation via the first type of activation process. In an example, the configuration parameters may indicate that the one or more second cells are not configured with the first type of activation process and/or that the one or more second cells are configured with the second type of activation process. In an example, the configuration parameters may indicate that a second plurality of cells, comprising the one or more second cells, are not configured/enabled with the first type of activation and/or that the second plurality of cells are configured with the second type of activation process.

Figure 21:
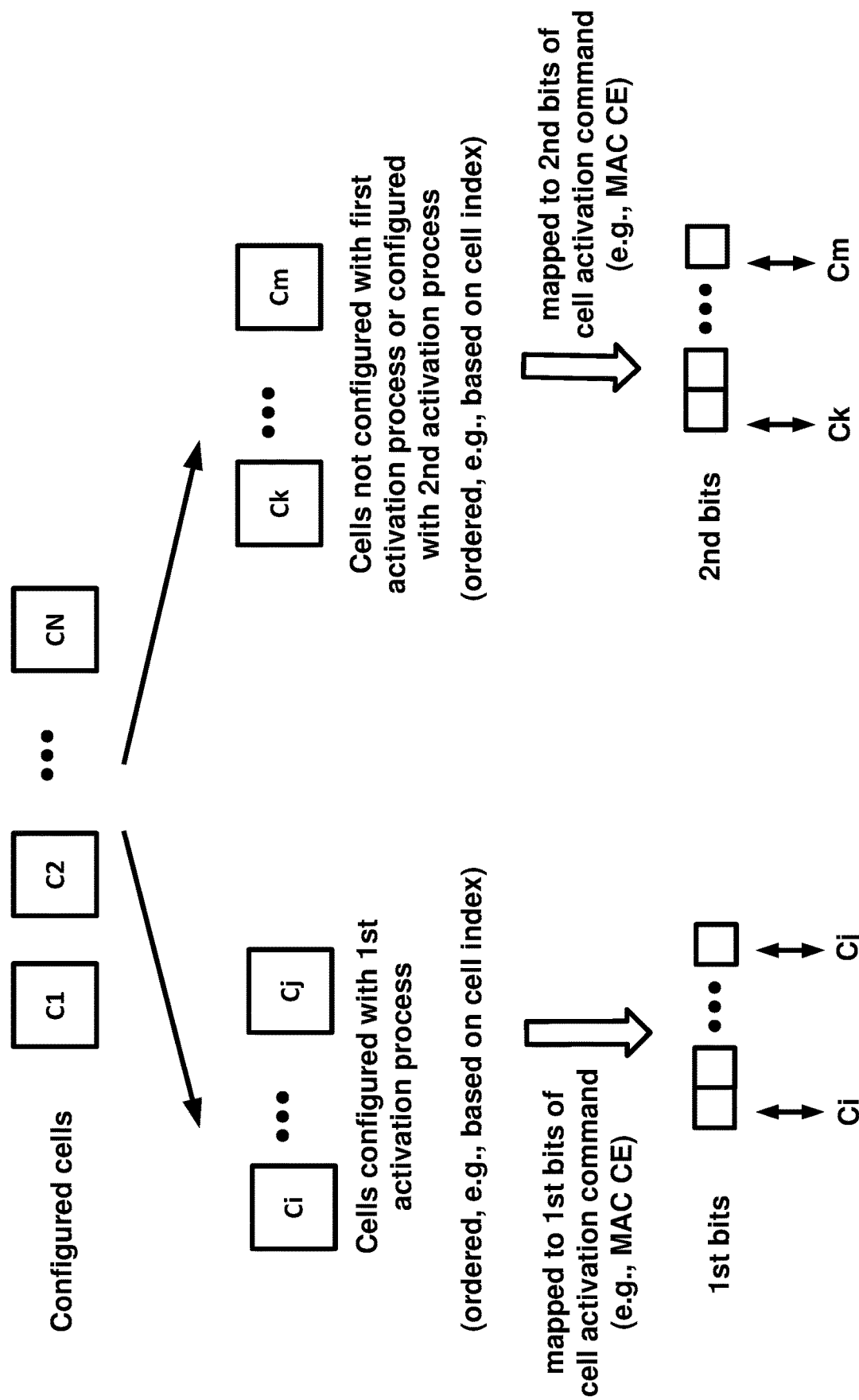
FIG. 21 shows an example process in accordance with several of various embodiments of the present disclosure.

In an example, the wireless device may determine the one or more first cells, to be activated using the first activation process, based on the first plurality of bits and based on the first plurality of cells. For example, each bit in the first plurality of bits may correspond to a cell in the first plurality of cells (e.g., according to the position of the bit in the first plurality of bits) and the value of each bit may indicate activation state of the corresponding cell. For example, each bit in the second plurality of bits may correspond to a cell in the second plurality of cells (e.g., according to the position of the bit in the second plurality of bits) and the value of each bit may indicate activation state of the corresponding cell. For example, as shown in FIG. 21, the wireless device may receive configuration parameters of a plurality of cells (e.g., $C_1, \ldots, C_N$). A first subset of the plurality of cells (e.g., $C_i, \ldots, C_j$) may be configured with the first type of activation process (e.g., based on indication/triggering of and receiving of the temporary RS in SCell activation) and a second subset of the plurality of cells (e.g., $C_k, \ldots, C_m$) may not be configured with the first type of activation process and/or may be configured with the second type of activation process. The first subset of the plurality of cells (for example, ordered based on cell index, e.g., in an ascending or descending order of cell indexes) may be mapped to a first plurality of bits of an activation command (for example, the first plurality of bits of the first MAC CE in FIG. 20) and the second subset of the plurality of bits (for example, ordered based on cell index, e.g., in an ascending or descending order of cell indexes) may be mapped to a second plurality of bits of the activation command (for example, the second plurality of bits of the first MAC CE in FIG. 20). Each bit in the first plurality of bits may be mapped to a cell in the first subset (for example, the leftmost (e.g., most significant) bit may be mapped to $C_i$ and the rightmost (e.g., least significant) bit may be mapped to $C_j$). Each bit in the second plurality of bits may be mapped to a cell in the second subset (for example, the leftmost (e.g., most significant) bit may be mapped to $C_k$ and the rightmost (e.g., least significant) bit may be mapped to $C_m$).

The first type of activation process may be based on receiving one or more first temporary RSs indicated/triggered/activated for use in activation of the one or more first cells (e.g., using the first MAC CE or a using a different activation/triggering command). For example, in case a different command is used for indication/triggering/activation of the one or more temporary RSs, the TB may comprise a second MAC CE, wherein the second MAC CE may indicate activation/triggering of the one or more temporary RSs. For example, in case a different command is used for indication/triggering/activation of the one or more temporary RSs, the wireless device may receive a DCI indicating triggering/activation of the one or more temporary RSs.

The second type of activation process may not be based on receiving one or more second temporary RSs indicated/triggered/activated for activation of the one or more second cells. The first type of the activation process, for the one or more first cells, may result in relatively faster activation of the one or more first cells compared with the one or more second cells.

Figure 22:
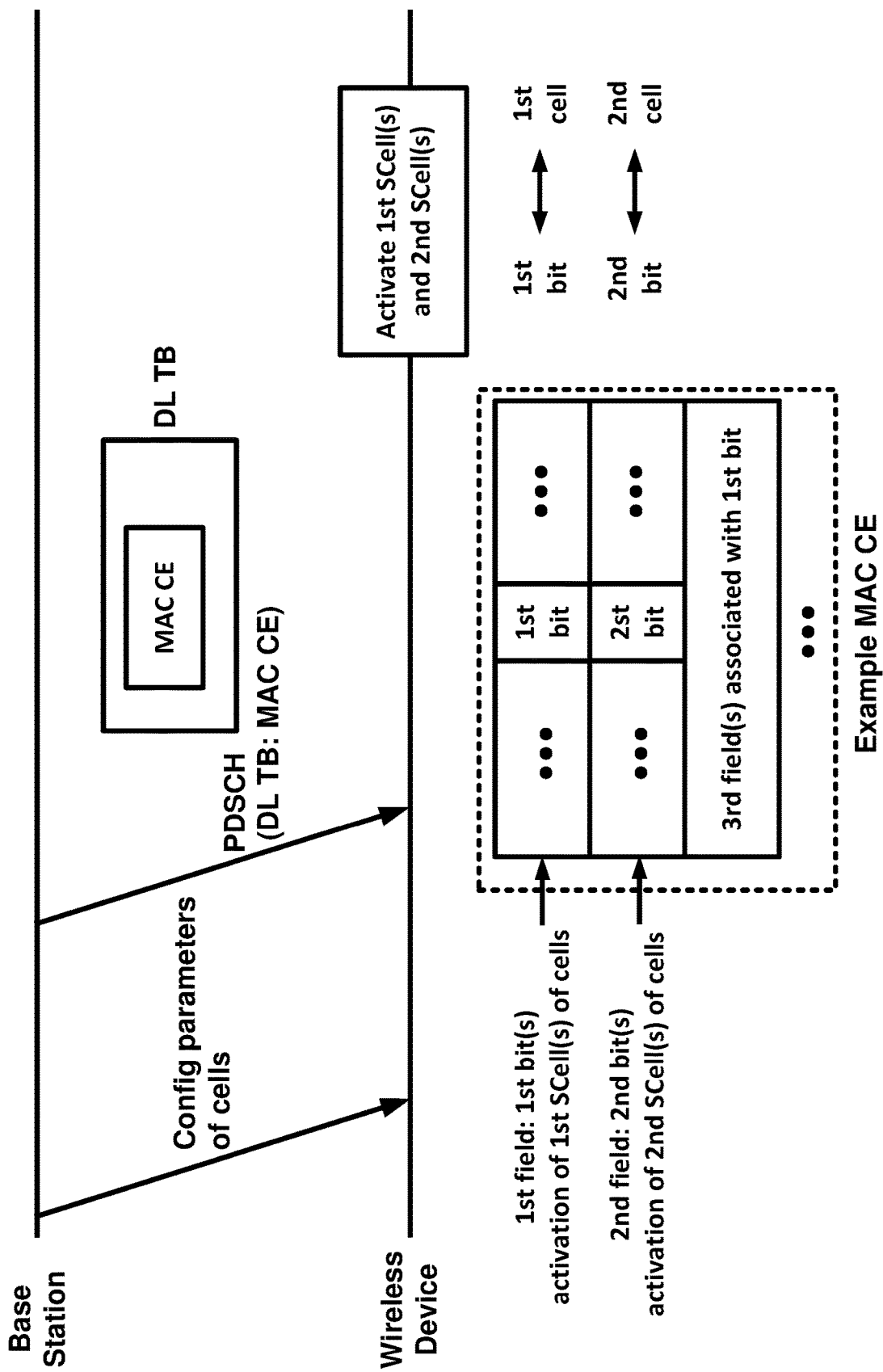
FIG. 22 shows an example process in accordance with several of various embodiments of the present disclosure.

In an example embodiment as shown in FIG. 22, a wireless device may receive one or more messages (e.g., one or more RRC messages) comprising configuration parameters of a plurality of cells. The wireless device may receive a MAC CE. For example, the wireless device may receive a TB comprising the MAC CE. For example, the wireless device may receive a DCI comprising scheduling information for reception of the TB and the wireless device may receive the TB based on the scheduling information indicated by the DCI. The MAC CE may comprise a first field and a second field. The first field may comprise one or more first bits that are associated with one or more first cells of the plurality of cells. The second filed may comprise one or more second bits that are associated with one or more second cells of the plurality of cells. In an example, the first field may be associated with a first type of activation process and may be used to indicate activation of a cell using the first type of activation process. The first type of activation process may be based on indication/triggering and receiving an RS and using the RS in activation of a cell.

A first bit of the one or more first bits may have a value of one. The first bit may correspond to a first cell of the one or more first cells. For example, the position of the first bit, in the one or more first bits, may indicate the first cell. For example, the i-th most significant bit, in the one or more first bits, may correspond to i-th cell in the one or more first cells that are ordered according to cell index. For example, the i-th least significant bit, in the one or more first bits, may correspond to i-th cell in the one or more first cells that are ordered according to cell index. The first cell may be deactivated prior to receiving the MAC CE/TB. A second bit of the one or more second bits may have a value of one. The second bit may correspond to a second cell of the one or more second cells. For example, the position of the second bit, in the one or more second bits, may indicate the second cell. For example, the i-th most significant bit, in the one or more second bits, may correspond to i-th cell in the one or more second cells that are ordered according to cell index. For example, the i-th least significant bit, in the one or more second bits, may correspond to i-th cell in the one or more second cells that are ordered according to cell index. The second cell may be deactivated prior to receiving the MAC CE/TB.

The MAC CE may further comprise one or more third field associated with the first bit. The one or more third fields may be used for indication/triggering of a RS used in activation of the first cell. For example, the one or more third fields may indicate an RS triggering state (e.g., a triggering state ID) for the RS, wherein the receiving the RS by the wireless device is based on the RS triggering state. The wireless device may receive the RS in response to the receiving the MAC CE and based on the one or more third fields.

Figure 23:
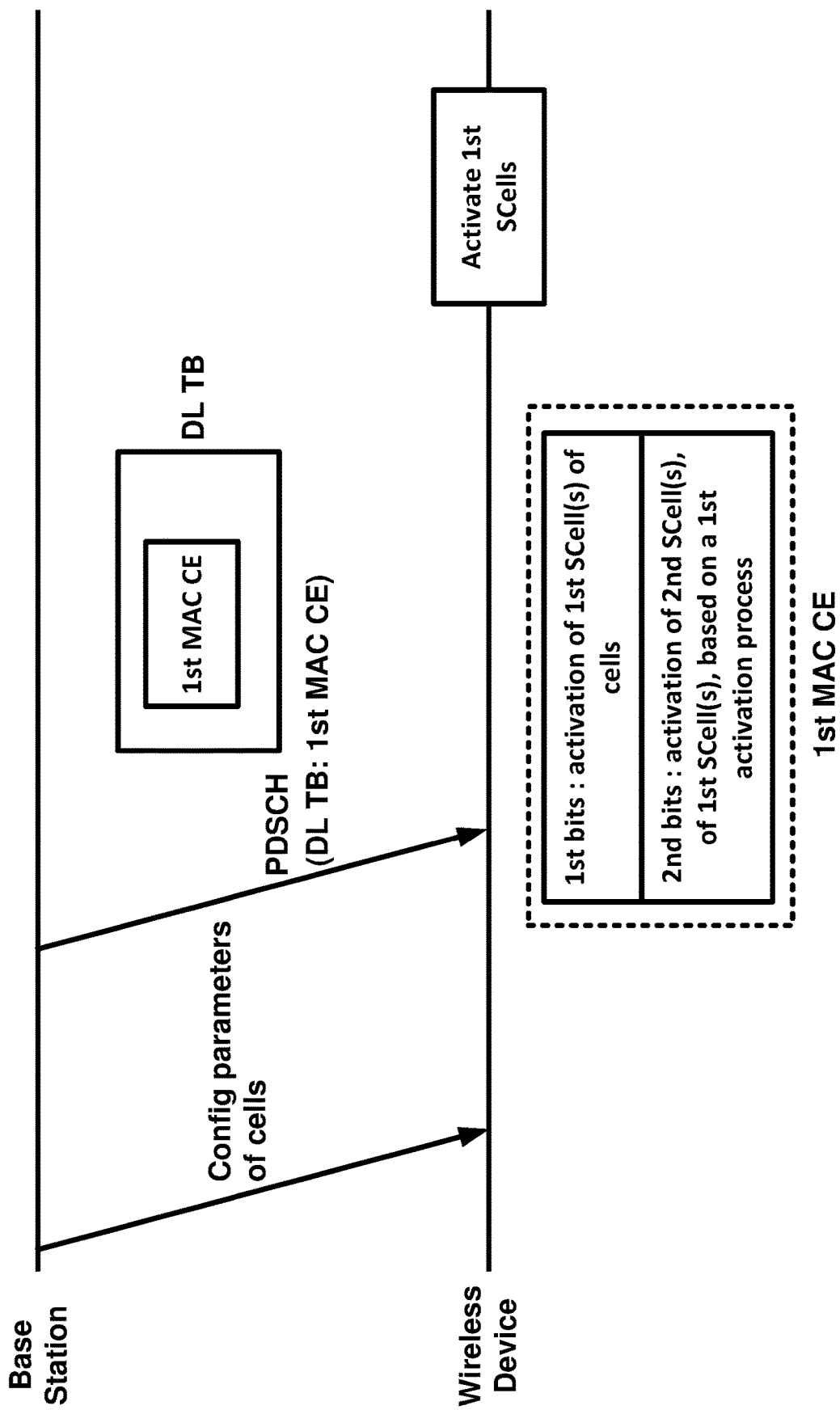
FIG. 23 shows an example process in accordance with several of various embodiments of the present disclosure.

In an example embodiment as shown in FIG. 23, a wireless device may receive configuration parameters of a plurality of cells. The wireless device may receive a TB comprising a MAC CE. The MAC CE may be used for SCell activation. The MAC CE may comprise a first plurality of bits and a second plurality of bits. For example, the first plurality of bits may indicate a first bitmap and the second plurality of bits may indicate a second bitmap. The first plurality of bits may indicate activation of one or more first cells of the plurality of cells. The second plurality of bits may indicate one or more second cells, of the one or more first cells, to be activated using a first activation process. The first activation process may be based on triggering/indication/activation of and receiving an RS and using the RS for SCell activation. For example, a bit in the second plurality of bits may be associated with a cell in the one or more first cells and a value of the bit may indicate whether the cell is to be activate using the first type of activation process. For example, a value of one for the bit may indicate that the cell, in the one or more first cells, is to be activated using the first type of activation process.

Figure 24:
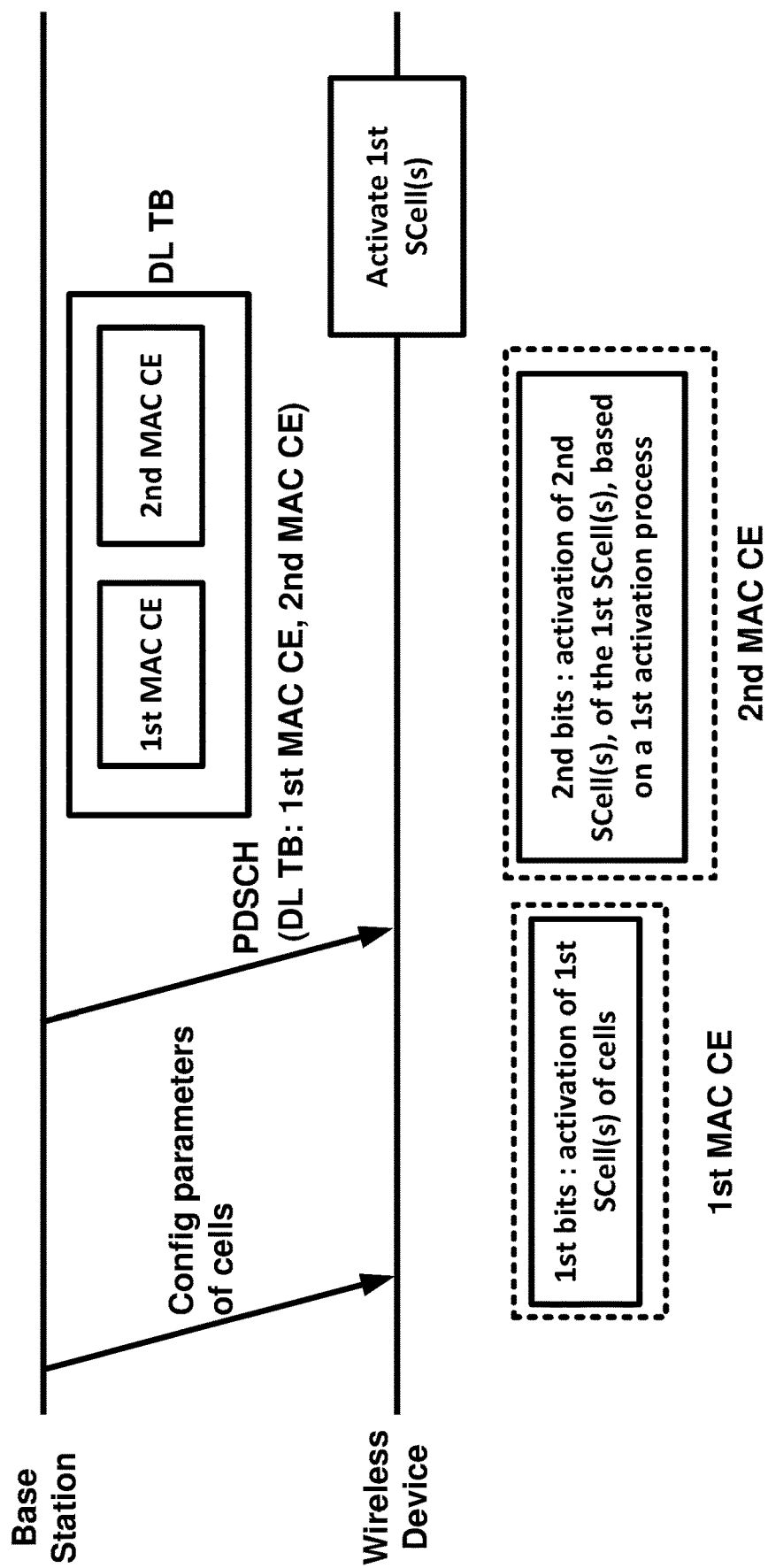
FIG. 24 shows an example process in accordance with several of various embodiments of the present disclosure.

In an example embodiment as shown in FIG. 24, a wireless device may receive configuration parameters of a plurality of cells. The wireless device may receive a TB comprising a first MAC CE and a second MAC CE. For example, the wireless device may receive a DCI comprising scheduling information for reception of the TB. The first MAC CE may comprise a first plurality of bits (e.g., a first bitmap) and the second MAC CE may comprise a second plurality of bits (e.g., a second bitmap). The first plurality of bits, of the first MAC CE, may indicate activation of one or more first cells of the plurality of cells configured for the wireless device. The first plurality of bits may comprise one or more first bits associated with the one or more first cells. The one or more first bits may have values of one indicating activation of the one or more first cells. The second plurality of bits, of the second MAC CE may indicate, activation of one or more second cells, of the one or more first cells, using a first type of activation process. For example, the second plurality of bits may comprise one or more second bits that are associated with the one or more first bits/cells. One or more third bits of the one or more second bits may be associated with the one or more second cells and may have values of one indicating activation of the one or more second cells, of the one or more first cells, using the first type of activation process. The first activation process may be based on triggering/indication/activation of and receiving an RS and using the RS for SCell activation. The first type of activation process may result in a relatively faster activation compared to a second activation process. For example, a bit in the second plurality of bits may be associated with a cell in the one or more first cells and a value of the bit may indicate whether the cell is to be activate using the first type of activation process. For example, a value of one for the bit may indicate that the cell, in the one or more first cells, is to be activated using the first type of activation process. The wireless device may activate the one or more first cells wherein the wireless device may activate one or more second cells of the one or more first cells using the first type of activation process.

In an example, the second MAC CE may further indicate triggering/activation of one or more RSs used in the activation of the one or more second cells, of the one or more first cells, and associated with the first activation process. For example, the second MAC CE may comprise one or more field indicating a triggering state for the triggering/ activation of the one or more RSs. For example, the triggering state may indicate a configuration of the RS in a plurality of configurations of the RS. The configuration of the RS may indicate resources associated with the RS and/or the BWP (e.g., the BWP of the cell to be activated) that the RS is transmitted.

In an example, the wireless device may receive the one or more RSs used in activation of the one or more second cells. In an example, the wireless device may receive the one or more RSs in response to reception of the second MAC CE and based on the one or more fields of the second MAC CE. The wireless device may activate the one or more second cells based on the received one or more RSs.

Figure 25:
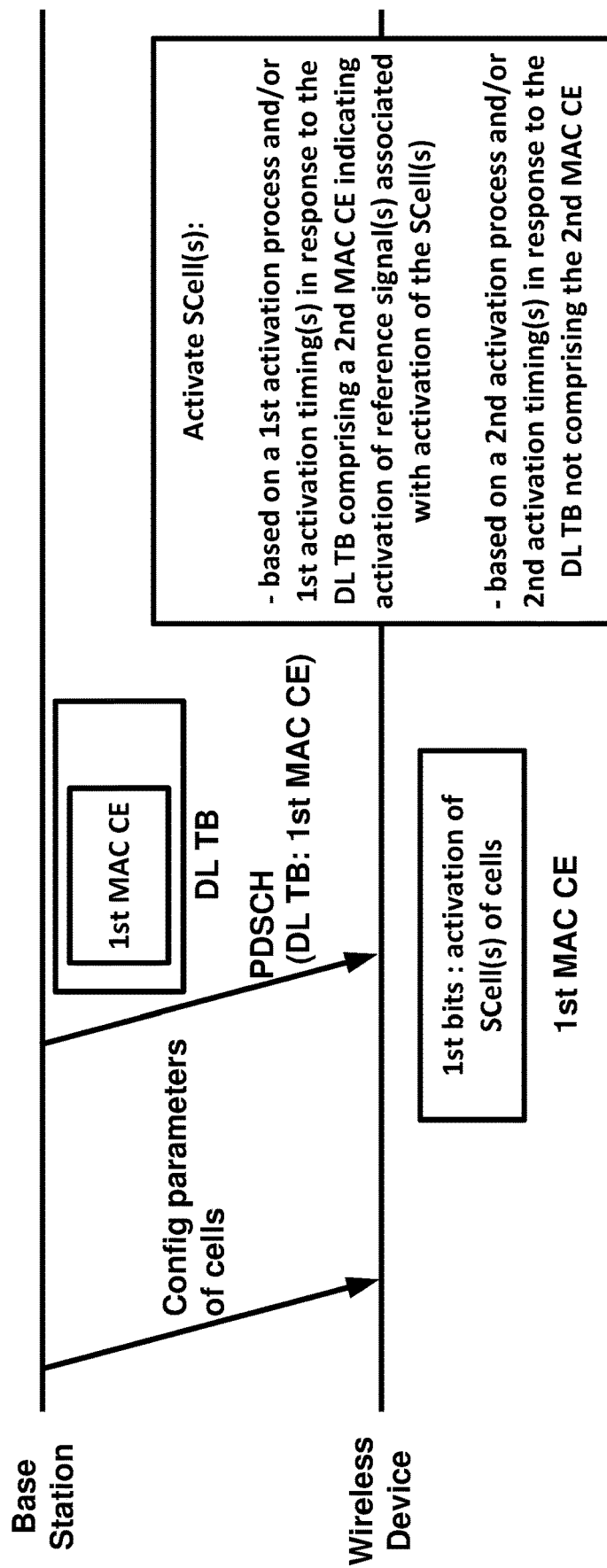
FIG. 25 shows an example process in accordance with several of various embodiments of the present disclosure.

In an example embodiment as shown in FIG. 25, a wireless device may receive one or more messages (e.g., one or more RRC messages) comprising configuration parameters of a plurality of cells. The wireless device may receive a TB comprising a MAC CE. The MAC CE may be used for SCell activation. The MAC CE may indicate activation of one or more cells of the plurality of cells. The wireless device may activate the one or more cells.

In an example, the TB may further comprise a second MAC CE indicating activation/triggering/indication of one or more reference signals (RSs) for activation of the one or more cells using a first type of activation process. The activation of the one or more cells may be based on the first activation process and/or based on one or more first activation timings in response to the TB comprising the second MAC CE. In an example, the second MAC CE may comprise one or more fields indicating activation/triggering of the one or more RSs. For example, a field, of the one or more fields, may indicate a triggering state (e.g., a triggering state ID) of an RS of the one or more RSs.

In an example, the TB may not comprise the second MAC CE. The activation of the one or more cells may not be based on the first activation process and/or may be based on a second activation process and/or may be based on one or more second activation timings in response to the TB not comprising the second MAC CE. The one or more first timings may be earlier than the one or more second timings and the first activation process may be relatively faster than the second activation process.

Figure 26:
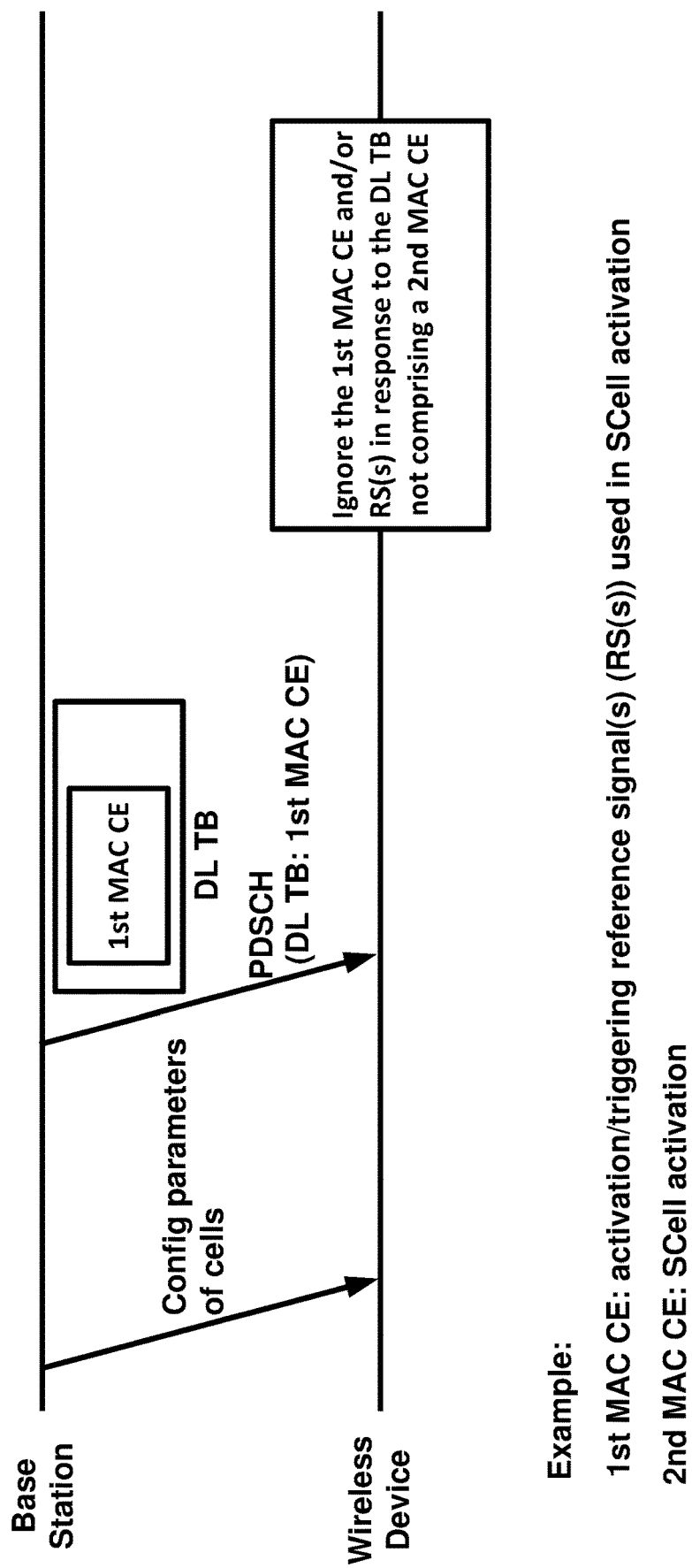
FIG. 26 shows an example process in accordance with several of various embodiments of the present disclosure.

In an example embodiment as shown in FIG. 26, a wireless device may receive a DL TB, via PDSCH. For example, the wireless device may receive a DCI comprising scheduling information for reception of a DL TB and the wireless device may receive the DL TB based on the scheduling information indicated in DCI. The DL TB may comprise a first MAC CE. The wireless device may determine that the DL TB comprises the first MAC CE and that the DL TB does not comprise a second MAC CE. The wireless device may determine that the DL TB comprises the first MAC CE and does not comprise the second MAC CE based on the LCIDs associated with logical channels and/or MAC CEs included in the subheaders of the MAC sub-PDUs included in the MAC PDU associated with the DL TB. Based on determining that the DL TB does not comprise the second MAC CE, the wireless device may ignore the first MAC CE.

In an example, the first MAC CE may be for activation of one or more reference signals used in cell activation. The second MAC CE may be the MAC CE for SCell activation. Based on determining that the DL TB does not comprise the second MAC CE, the wireless device may ignore the second MAC and may not expect to receive the one or more reference signals. In an example, based on determining that the DL TB does not comprise the second MAC CE and in case the wireless device receives the one or more reference signals, the wireless may ignore (e.g., may not process) the one or more reference signals.

In an example embodiment, the wireless device may receive one or more messages (e.g., one or more RRC messages) comprising configuration parameters of a plurality of cells. The wireless device may receive a transport block comprising a first MAC CE for activation of one or more reference signals used in cell activation. For example, the first MAC CE may comprise one or more fields indicating activation/triggering of the one or more reference signals used in cell activation. For example, the one or more fields may indicate one or more triggering states (e.g., triggering state IDs) for the activation/triggering of the one or more reference signals. The wireless device may determine (e.g., based on the LCIDs associated with logical channels and/or MAC CEs included in the subheaders of the MAC sub-PDUs included in the MAC PDU associated with the transport block) whether the transport block comprises a second MAC CE for activation of one or more cells of the plurality of cells. In response to the transport block comprising the second MAC CE, the wireless device may receive the one or more references based on the first MAC CE (e.g., based on the values of the one or more fields of the first MAC CE indicating triggering state for activation/ triggering of the one or more reference signals) and may activate the one or more cells based on the received one or more reference signals. In response to the transport block not comprising the second MAC CE, the wireless device may ignore the first MAC CE. In an example, in response to the transport block not comprising the second MAC CE, the wireless device may not expect to receive the one or more reference signals indicated by the first MAC CE. In an example, in response to the transport block not comprising the second MAC CE, and the wireless device receiving the one or more reference signals, the wireless device may ignore (e.g., not process) the one or more reference signals.

Figure 27:
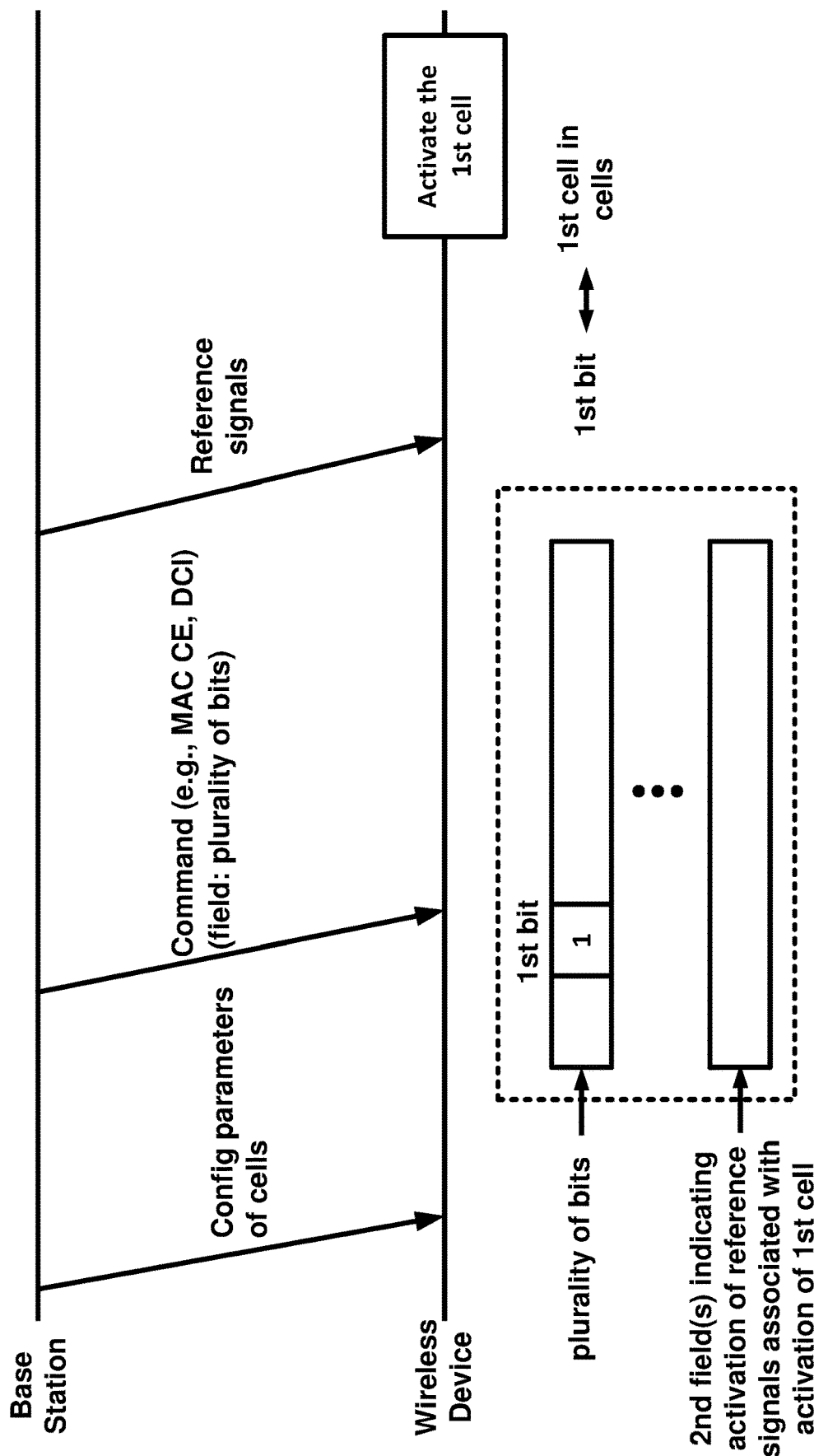
FIG. 27 shows an example process in accordance with several of various embodiments of the present disclosure.

In an example embodiment as shown in FIG. 27, a wireless device may receive one or more messages (e.g., one or more RRC messages) comprising configuration parameters of a plurality of cells. The wireless device may receive a command (e.g., a MAC CE, a DCI, etc.) comprising a field comprising a plurality of bits. For example, in case the command is a MAC CE, the wires device may receive a scheduling DCI comprising scheduling information for reception of a TB and wherein the TB may comprise the MAC CE. The plurality of bits of the command may be a bitmap wherein each bit, in the plurality of bits, may correspond to a cell in the plurality of cells. A first bit, in the plurality of bits, may correspond to a first cell in the plurality of cells. The first bit may have a first value. The first value may be one. The first cell may be deactivated prior to receiving the command (e.g., prior to receiving the MAC CE in case the command is based on the MAC CE). The command (e.g., the MAC CE, the DCI) may further comprise one or more second fields associated with the first bit. In an example, the command (e.g., the MAC CE, the DCI) may further comprise the one or more second fields based on the first bit having the one value of one. In an example, the command (e.g., the MAC CE, the DCI) may further comprise the one or more second fields based on the first bit having the one value of one and the first cell, associated with the first bit, being deactivated prior to receiving the command (e.g., the MAC CE, the DCI). In an example, the one or more messages (e.g., the one or more RRC messages) may comprise one or more first configuration parameters indicating the first cell is configured/enabled with the first type of activation process. In an example, the command (e.g., the MAC CE, the DCI) may further comprise the one or more second fields based on the first bit having the one value of one and the first cell, associated with the first bit, being configured with a first type of activation process. In an example, the command (e.g., the MAC CE, the DCI) may further comprise the one or more second fields based on the first bit having the one value of one, the first cell, associated with the first bit, being configured with the first type of activation process and the first cell being deactivated prior to receiving the command. The first activation process may be based on indication/activation/triggering of one or more reference signals and using the one or more reference signals in activation of a cell.

In an example, in case the command is a MAC CE, the MAC CE may be a variable size MAC CE wherein the size of the MAC CE may be based on a number of fields that are included in the MAC CE and are associated with the bit(s) of the plurality of bits.

The one or more second fields of the command (e.g., the MAC CE, the DCI) may indicate activation/triggering of one or more reference signals associated with activation of the first cell. The wireless device may receive the one or more reference signals based on the command/the one or more field of the command and may activate the first cell based on the received one or more received reference signals.

In an example, the one or more fields may indicate a triggering/activation state for the one or more reference signals. For example, a field, in the one or more fields, may indicate a triggering/activate state ID for the one or more reference signals. The triggering/activation state ID may indicate a configuration in a plurality of configurations for transmission of the one or more reference signals. For example, the configuration, in the plurality of configurations, may indicate radio resources and/or BWP(s) and/or other configurations of the one or more reference signals. For example, the triggering state (e.g., the triggering state ID). indicated by the field of the one or more fields, may indicate a BWP in a plurality of BWPs of the first cell to be activated. The wireless device may receive the one or more reference signals based on the triggered/activate configuration of the one or more reference signals, for example, via the BWP associated with the triggering/activation state. In an example, the one or more field may comprise a field indicating the BWP (e.g., the BWP ID) of the first cell to be activate, via which the one or more reference signals are transmitted by the base station.

In an example, the plurality of bits of the command (e.g., the MAC CE, the DCI) may further comprise a second bit. The second bit may be associated with a second cell of the plurality cells. The second bit may have a value of one. In an example, the second cell may be activated prior to receiving the command. The command may not comprise one or more third fields associated with the second bit. In an example, the command may not comprise the one or more third fields associated with the second bit based on the second cell being activated prior to receiving the command.

In an example, the plurality of bits of the command (e.g., the MAC CE, the DCI) may further comprise a second bit. The second bit may be associated with a second cell of the plurality cells. The second bit may have a value of one. In an example, the second cell may be not be configured/enabled with the first type of the activation process. The command may not comprise one or more third fields associated with the second bit. In an example, the command may not comprise the one or more third fields associated with the second bit based on the second cell not being enabled/configured with the first type of activation process.

In an example, the plurality of bits of the command (e.g., the MAC CE, the DCI) may further comprise a third bit. The third bit may be associated with a third cell of the plurality cells. The third bit may have a value of zero. The third cell may be activated or may be deactivated prior to receiving the command. The third cell may or may not be configured/enabled with the first type of activation process. The command may not comprise one or more fourth fields associated with the second bit. In an example, the command may not comprise the one or more third field associated with the third bit based on the third cell being activated prior to receiving the command.

Figure 28:
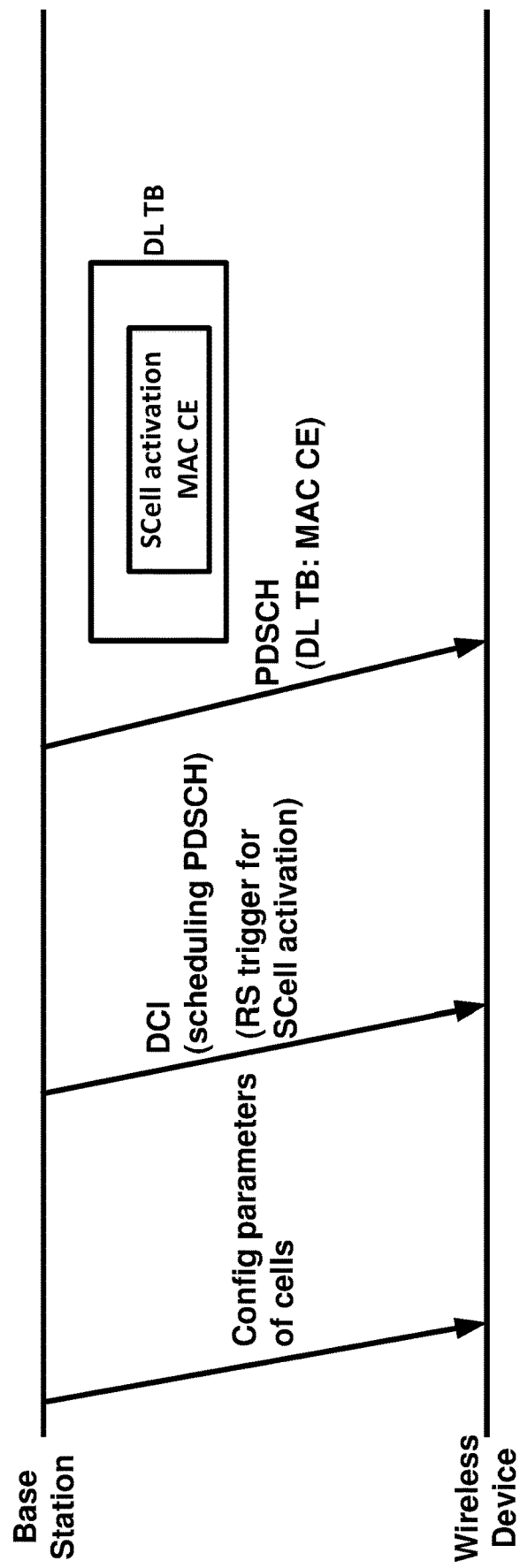
FIG. 28 shows an example process in accordance with several of various embodiments of the present disclosure.

In an example embodiment as shown in FIG. 28, a wireless device may receive one or more messages (e.g., one or more RRC messages) comprising configuration parameters of a plurality of cells. The wireless device may receive a DCI comprising scheduling information (e.g., radio resources, HARQ information, etc.) for reception of a transport block. The transport block may comprise a MAC CE indicating activation of one or more cells of the plurality of cells. The MAC CE may indicate activation of the one or more cells using a first type of activation process. The first type of activation process may be based on indication/triggering/activation of one or more reference signals, receiving the one or more reference signals based on the indication/activation/triggering and using the one or more reference signals in activation of the one or more cells.

In an example, the DCI scheduling the transport block may comprise a first field. A first value of the first field may indicate that a second field of the DCI, for triggering/ activation/indication of one or more reference signals used in activation of the one or more cells, is present in the DCI. In an example, the first value of the first field may indicate that a second field of the DCI is used for triggering/ activation/indication of one or more reference signals that are used in activation of the one or more cells.

In an example, the DCI scheduling the transport block may be associated with a first RNTI. The association of the DCI with the first RNTI may indicate that a field of the DCI, for triggering/activation/indication of one or more reference signals used in activation of the one or more cells, is present in the DCI. In an example, the association of the DCI with the first RNTI may indicate that a field of the DCI is used for triggering/activation/indication of one or more reference signals that are used in activation of the one or more cells.

In an example, the DCI scheduling the transport block may be received via a first search space/CORESET. The reception of the DCI via the first search space/CORESET may indicate that a field of the DCI, for triggering/activation/indication of one or more reference signals used in activation of the one or more cells, is present in the DCI. In an example, reception of the DCI via the first search space/CORESET may indicate that a field of the DCI is used for triggering/activation/indication of one or more reference signals that are used in activation of the one or more cells.

In an example, the field (e.g., the second field) may be an SRS request field. The wireless device may determine that the SRS request field of the DCI is used for triggering/ indication/activation of the one or more reference signals based on the first field of the DCI and/or based on the RNTI associated with the DCI and/or based on the search space/ CORESET that the DCI is received.

In an example, the field (e.g., the second field) may be a CSI-RS trigger (e.g., a ZP-CSI-RS trigger) field. The wireless device may determine that the CSI-RS field of the DCI is used for triggering/indication/activation of the one or more reference signals based on the first field of the DCI and/or based on the RNTI associated with the DCI and/or based on the search space/CORESET that the DCI is received.

In an example, the field (e.g., the second field) may be a SCell dormancy indication field. The wireless device may determine that the SCell dormancy indication field of the DCI is used for triggering/indication/activation of the one or more reference signals based on the first field of the DCI and/or based on the RNTI associated with the DCI and/or based on the search space/CORESET that the DCI is received.

The wireless device may determine that the DCI is used for triggering/activation/indication of the one or more reference signals used in activation of the one or more cells and that a field (e.g., second field) of the DCI is used in triggering/activation/indication of the one or more reference signals based on the first field of the DCI and/or the RNTI associated with the DCI (e.g., based on RNTI being the first RNTI) and/or based on the DCI being received via the first CORESET/search space. The wireless device may receive the one or more reference signals used in activation of the one or more cells based on the DCI (e.g., the field (e.g., the second field) of the DCI). The wireless device may activate the one or more cells based on the MAC CE and based on the DCI.

Figure 29:
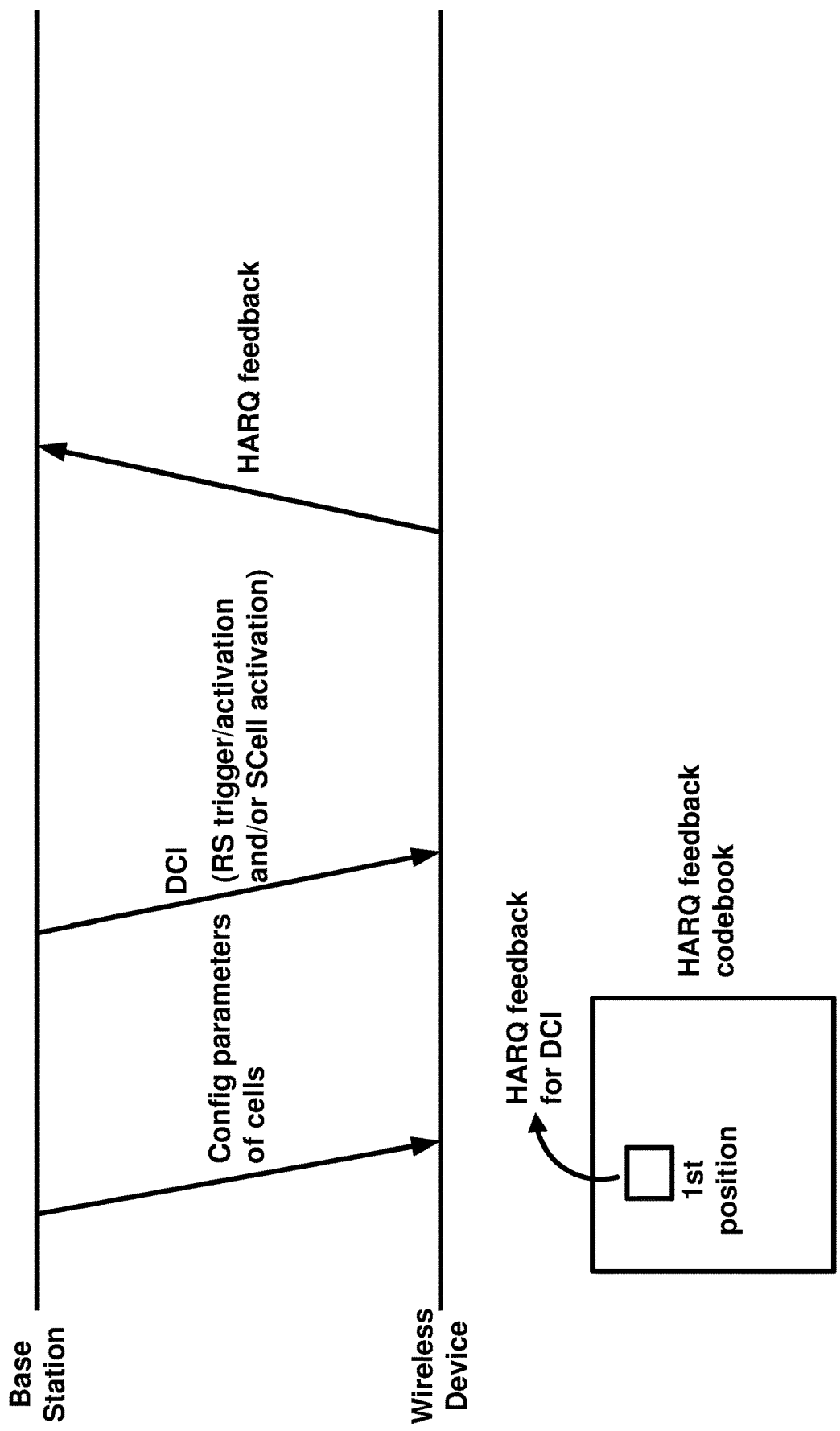
FIG. 29 shows an example process in accordance with several of various embodiments of the present disclosure.

In an example embodiment as shown in FIG. 29, a wireless device may receive one or more messages (e.g., one or more RRC messages) comprising configuration parameters of a plurality of cells comprising one or more first cells. The wireless device may receive a plurality of commands (e.g., DCIs) indicating activation/deactivation of the plurality of cells. The plurality commands (e.g., alone or in combination with other commands) may indicate activation/ triggering/indication of a plurality of reference signals, wherein the plurality of reference signals may be received by the wireless device and may be used in activation of at least a portion/subset of the plurality of cells. A first command (e.g., a first DCI) in the plurality of commands (e.g., the plurality of DCIs) may indicate activation/deactivation of the one or more first cells in the plurality of cells. In an example, the first command (e.g., the first DCI) in the plurality of commands (e.g., the plurality of DCIs) may trigger one or more reference signals used in activation of the one or more first cells. The first command (e.g., the first DCI) in the plurality of commands (e.g., the plurality of DCIs) may be received in a first timing (e.g., a first slot, a first symbol, etc.). The wireless device may create a HARQ feedback codebook comprising a plurality of HARQ feedbacks associated with the plurality of DCIs. The plurality of HARQ feedbacks may be included in the HARQ feedback codebook based on determined positions of the plurality of HARQ feedbacks. The wireless device may determine positions of the plurality of HARQ feedbacks, in the HARQ feedback codebook, and may include the plurality of HARQ feedbacks in the HARQ feedback codebook based on the determined positions of the plurality of HARQ feedbacks. The wireless device may determine a first position of a first HARQ feedback, associated with the first command (e.g., the first DCI), in the plurality of positions of the plurality of HARQ feedbacks included in the HARQ feedback codebook. The wireless device may receive the first DCI in a first timing. The wireless device may determine the first position of the first HARQ feedback based on a first timing of the first DCI (e.g., the first slot and/or the first symbol that the first DCI is received) in a plurality of timings of the plurality of DCIs (e.g., the plurality of symbols and/or the plurality of slots that the plurality of DCIs are received). In an example, the wireless device may receive the first DCI via a first cell associated with a first cell index. The plurality of DCIs may be received via one or more cells associated with one or more cell indexes. The wireless device may determine the first position of the first HARQ feedback based on the first cell index in one or more cell indexes of the one or more cells that the plurality of DCIs are received. The wireless device may transmit the HARQ feedback codebook using an uplink channel (e.g., an uplink control channel e.g., a PUCCH).

The wireless device may activate/deactivate the plurality of cells based on the plurality of commands (e.g., the plurality of DCIs). In an example, the wireless device may receive the plurality of reference signals used in activation of at least a portion/subset of the plurality of cells. The wireless device may active at least a portion/subset of the plurality of cells based on the received reference signals.

Figure 30:
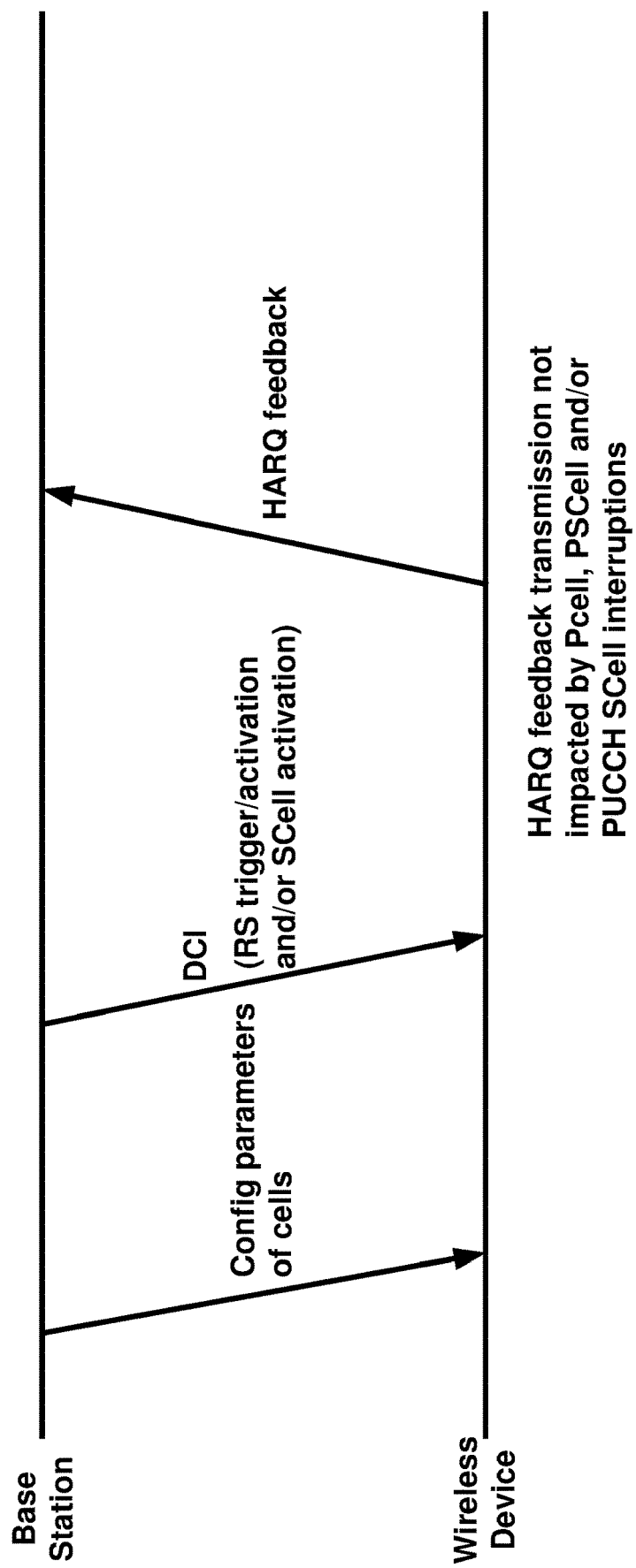
FIG. 30 shows an example process in accordance with several of various embodiments of the present disclosure.

In an example embodiment as shown in FIG. 30, a wireless device may receive one or more messages (e.g., one or more RRC messages) comprising configuration parameters of a plurality of cells comprising one or more secondary cells. The wireless device may receive a DCI indicating/ triggering/activating one or more reference signals associated with activation of the one or more secondary cells. The wireless device may transmit a feedback/acknowledgement (e.g., a HARQ feedback, a confirmation MAC CE, etc.) indicating reception (e.g., successful/correct reception) of the DCI. The transmission of the feedback/acknowledgement (e.g., the HARQ feedback, the confirmation MAC CE) may not be impacted by interruptions due to primary cell (PCell), primary secondary cell (PSCell) and/or PUCCH SCell interruptions (e.g., due to SCell activation/deactivation). In an example, the interruptions (e.g., due to SCell activation/deactivation) may not interrupt/impact feedback/acknowledgement (e.g., the HARQ feedback, the confirmation MAC CE) related to signaling (e.g., physical layer or MAC layer control signaling) for activation/triggering/indication of reference signals used in activation of the one or more secondary cells.

In an example embodiment, the wireless device may receive a DCI comprising scheduling information for reception of a TB. The TB may comprise a MAC CE indicating/triggering/activating one or more reference signals associated with activation of the one or more secondary cells. The wireless device may transmit a feedback/acknowledgement (e.g., a HARQ feedback, a confirmation MAC CE) indicating reception (e.g., successful/correct reception) of the DCI/TB/MAC CE. The transmission of the feedback/acknowledgement (e.g., the HARQ feedback, the confirmation MAC CE) may not be impacted by interruptions due to primary cell (PCell), primary secondary cell (PSCell) and/or PUCCH SCell interruptions (e.g., due to SCell activation/deactivation). In an example, the interruptions (e.g., due to SCell activation/deactivation) may not interrupt/impact feedback/acknowledgement (e.g., HARQ feedback) related to signaling (e.g., physical layer or MAC layer control signaling) for activation/triggering/indication of reference signals used in activation of the one or more secondary cells.

In an example, an interruption (e.g., an interruption at SCell activation/deactivation and up to a duration) may be defined on an active serving cell if the active serving cell is not in the same band as any of the SCells being activated or deactivated. In an example, an interruption (e.g., an interruption at SCell activation/deactivation and up to a duration) may be defined on an active serving cell if the active serving cell is in the same band as any of the SCells being activated or deactivated (e.g., when the cell specific reference signals from the active serving cells and the SCells being activated or deactivated are available in the same slot). In an example the active serving cell may be a PCell, a PSCell or a PUCCH SCell. In an example, transmission of the feedback/acknowledgement (e.g., the HARQ feedback) of the signaling (e.g., DCI or MAC CE) indicating/activating/triggering the one or more reference signals, used in activation of the one or more secondary cells, may not be impacted by interruptions due to primary cell (PCell), primary secondary cell (PSCell) and/or PUCCH SCell interruptions (e.g., due to SCell activation/deactivation).

Figure 31:
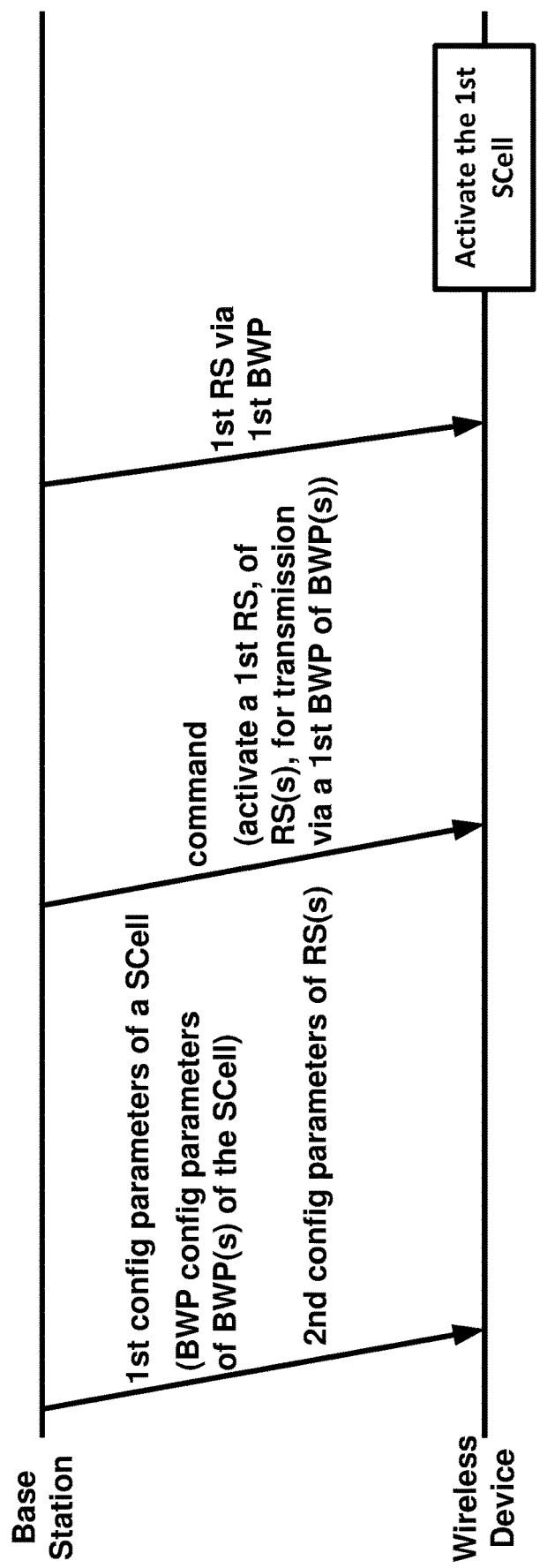
FIG. 31 shows an example process in accordance with several of various embodiments of the present disclosure.

In an example embodiment as shown in FIG. 31, a wireless device may receive one or more messages comprising configuration parameters comprising first configuration parameters and second configuration parameters. The first configuration parameters may be for a secondary cell and may comprise BWP configuration parameters of one or more BWPs of the secondary cell. The second configuration parameters may be for one or more reference signals associated with activation of the secondary cell. The one or more reference signals may be used for reception by the wireless device and activating the secondary cell using a first type of activation process (e.g., a fast activation process). In an example, the second configuration parameters may be BWP specific and may be for reception of the one or more reference signals via a BWP of the secondary cell. The wireless device may receive a command (e.g., a DCI or a MAC CE) that indicates activation/triggering/transmission of a first reference signal of the one or more reference signals via a first BWP of the one or more BWPs and using the second configuration parameters. For example, the second configuration parameters may include different sets of parameters for different BWP and a field of the command (e.g., DCI, MAC CE) may indicate parameters associated with a BWP in a plurality of BWPs. For example, a first set of parameters associated with a first BWP may be associated with an ID/triggering state and a value of the field of the command (e.g., DCI, MAC CE) may indicate the ID/triggering state. In response to reception of the command, the wireless device may receive the first reference signal via the first BWP. The wireless device may activate the secondary cell based on the received first reference signal.

In an example embodiment, a wireless device may receive configuration parameters of a plurality of cells. The wireless device may receive a transport block comprising a first medium access control (MAC) control element (CE) and a second MAC CE. The first MAC CE and the second MAC CE may be for cell activation. A first size of the first MAC CE may be fixed. The first MAC CE may comprise a plurality of bits. A second size of the second MAC CE may be variable and may be based on values of the plurality of bits. Based on the receiving the first MAC CE and the second MAC CE, the wireless device may activate one or more first cells of the plurality of cells.

In an example, the first size of the MAC CE may be one of one octet and four octets.

In an example, the one or more first cells may be deactivated prior to receiving the transport block.

In an example, the second size of the second MAC CE may be based on a first number of one or more first bits, of the plurality of bits, that have values of one.

In an example, the second size of the second MAC CE may further be based on a second number of one or more second bits, of the one or more first bits, that are associated with the one or more first cells of the plurality of cells. The one or more first cells may be deactivated prior to receiving the transport block.

In an example, the second size of the second MAC CE may further be based on a second number of one or more second bits, of the one or more first bits that are associated with the one or more first cells of the plurality of cells. The one or more first cells may be deactivated prior to receiving the transport block. The one or more first cells may be configured/enabled for a first activation process. In an example, the first activation process may be based on a fast activation process and/or based on one or more first timings (e.g., a relatively faster activation process than a second activation process).

In an example, the second MAC CE may indicate activation/triggering of one or more reference signals for activation of at least a portion/subset of the one or more first cells based on a first activation process. In an example, the first activation process may be based on a fast activation process and/or based on one or more first timings (a relatively faster activation process than a second activation process). In an example, the activation of the at least the portion/subset of the one or more first cells may be based on receiving the one or more reference signals whose activation is indicated by the second MAC CE.

In an example, the wireless device may receive one or more configuration parameters indicating that at least a portion/subset of the one or more first cells are configured/enabled with a first activation process. In an example, the first activation process may be based on a fast activation process and/or based on one or more first timings (a relatively faster activation process than a second activation process).

In an example embodiment, a wireless device may receive configuration parameters of a plurality of cells. The wireless device may receive a transport block comprising a first medium access control (MAC) control element (CE), for secondary cell (SCell) activation, comprising a first plurality of bits and a second plurality of bits. The first plurality of bits may indicate activation of one or more first cells using a first activation process. The second plurality of bits may indicate activation of one or more second cells using a second activation process. The wireless device may activate the one or more first cells, based on the first activation process, and the one or more second cells, based on the second activation process, in response to receiving the first MAC CE.

In an example, the first activation process may result in a relatively faster activation than the second activation process.

In an example, the transport block may further comprise a second MAC CE indicating activation/triggering of one or more reference signals associated with the activation of the one or more first cells using the first activation process.

In an example, the wireless device may receive configuration parameters indicating that the one or more first cells are associated/configured with the first activation process.

In an example, the wireless device may receive configuration parameters indicating that the one or more second cells are associated/configured with the second activation process and/or may indicate that the one or more second cells are not associated/configured with the first activation process.

In an example, the wireless device may receive configuration parameters indicating that: a first plurality of cells, comprising the one or more first cells, are associated/configured with the first activation process; and that a second plurality of cells, comprising the one or more second cells, are associated/configured with the second activation process and/or are not associated/configured with the first activation process. The wireless device may determine the one or more first cells, from the first plurality of cells, based on the first plurality of bits. The wireless device may determine the one or more second cells, from the second plurality of cells, based on the second plurality of bits.

In an example, a first bit, in the first plurality of bits, may be associated with a first cell in the first plurality of cells. A first position of the first bit may be based on a first cell index of the first cell in a first plurality of cell indexes of the first plurality of cells. In an example, a second bit, in the second plurality of bits, may be associated with a second cell in the second plurality of cells. A second position of the second bit may be based on a second cell index of the second cell in a second plurality of cell indexes of the second plurality of cells.

In an example embodiment, a wireless device may receive configuration parameters of a plurality of cells. The wireless device may receive a MAC CE comprising: a first field comprising one or more first bits corresponding to one or more first cells of the plurality of cells; and a second field comprising one or more second bits corresponding to one or more second cells of the plurality of cells. A first bit, in the one or more first bits, may correspond to a first cell in the one or more first cells and may have a value of one. A second bit, in the one or more second bits, may corresponds to a second cell in the one or more second cells and may have a value of one. The first cell and the second cell may be deactivated prior to receiving the MAC CE. The MAC CE may further comprise one or more third fields associated with the first bit. The one or more third fields may indicate activation of one or more reference signals associated with activation of the first cell. The wireless device may receive the one or more reference signals in response to receiving the MAC CE. The wireless device may activate the first cell and the second cell.

In an example, the MAC CE may not further comprise one or more fourth fields associated with the second cell.

In an example, the first field may be associated with a first type of activation process.

In an example, the first type of activation process may be based on receiving an indication/triggering of a reference signals (RS) and using the RS for cell activation.

In an example embodiment, a wireless device may receive configuration parameters of a plurality of cells. The wireless device may receive a transport block comprising a first medium access control (MAC) control element (CE), for secondary cell (SCell) activation, comprising the first plurality of bits and the second plurality of bits. The first plurality of bits may indicate activation of one or more first cells. The second plurality of bits may indicate activation of one or more second cells, of the one or more first cells, using a first activation process. The wireless device may activate the one or more first cells in response to receiving the first MAC CE.

In an example embodiment, a wireless device may receive configuration parameters of a plurality of cells. The wireless device may receive a transport block comprising a first medium access control (MAC) control element (CE) and a second MAC CE. The first MAC CE may comprise a first plurality of bits indicating activation of one or more first cells of the plurality of cells. The second MAC CE may comprise a second plurality of bits indicating activation of one or more second cells, of the one or more first cells, based on a first activation process. The wireless device may activate the one or more first cells.

In an example, the first activation process may be based on a relatively faster activation than a second activation process.

In an example, the second MAC CE may indicate activation of reference signals associated with the activation of the one or more second cells with the first activation process. The wireless device may receive the reference signals in response to receiving the second MAC CE, wherein activating the one or more second cells, of the one or more first cells, may be in response to receiving the reference signals.

In an example, the first plurality of bits may comprise one or more first bits that have values of one. The one or more first bits may be associated with the one or more first cells. The second plurality of bits may comprise one or more second bits that correspond to the one or more first bits. One or more third bits of the one or more second bits may have values of one and may be associated with the one or more second cells.

In an example embodiment, a wireless device may receive configuration parameters of a plurality of cells. The wireless device may receive a transport block comprising a first medium access control (MAC) control element (CE) indicating activation of one or more cells of the plurality of cells. The wireless device may activate the one or more cells based on a first activation process and/or based on one or more first activation timings in response to the transport block further comprising a second MAC CE indicating activation of one or more reference signals associated with activation of the one or more cells. The wireless device may activate the one or more cells based on a second activation process and/or based on one or more second activation timings in response to the transport block not comprising the second MAC CE.

In an example, the one or more first timings may be earlier than the one or more second timings.

In an example, the second MAC CE may be for a first type of activation process (e.g., fast activation) for activation of the one or more cells. In an example, the second MAC CE may indicate activation of one or more reference signals. The activation of the one or more cells, using the first activation process, may be based on receiving the one or more references signals.

In an example embodiment, a wireless device may receive a transport block comprising a first medium access control (MAC) control element (CE). The wireless device may ignore the first MAC CE based on the transport block not comprising a second MAC CE.

In an example, the first MAC CE may be for activation of one or more reference signals used in cell activation. The second MAC CE may be for SCell activation.

In an example embodiment, a wireless device may receive configuration parameters of a plurality of cells. The wireless device may receive a transport block comprising a first medium access control (MAC) control element (CE) for activation of one or more reference signals used in cell activation. The wireless device may determine whether the transport block comprises a second MAC CE for activation of one or more cells of the plurality of cells. In response to the transport block comprising the second MAC CE: the wireless device may receive the one or more references based on the first MAC CE; and the wireless device may activate the one or more cells. In response to the transport block not comprising the second MAC CE, the wireless device may ignore the first MAC CE.

In an example embodiment, a wireless device may receive configuration parameters of a plurality of cells. The wireless device may receive a MAC CE comprising a first field comprising a plurality of bits. A first bit, in the plurality of bits, may correspond to a first cell, in the plurality of cells, and may have a first value of one. The first cell may be deactivated prior to receiving the MAC CE. The MAC CE may further comprise one or more second fields, associated with the first bit. The one or more second fields may indicate activation of one or more reference signals associated with activation of the first cell. The wireless device may receive the one or more reference signals in response to receiving the MAC CE. The wireless device may activate the first cell.

In an example, the MAC CE may further comprise the one or more second fields based on the first bit having the first value of one and the first cell being deactivated prior to receiving the MAC CE.

In an example, the wireless device may receive one or more configuration parameters indicating that a first type or activation process is configured/enabled for the first cell. The first type of activation process may be based on triggering/activation and reception of one or more reference signals used in activation of a cell. In an example, the MAC CE may further comprise the one or more second fields based on the first bit having the first value of one and the first cell being deactivated prior to receiving the MAC CE and the first type of activation process being configured/enabled for the first cell.

In an example, a second bit, in the plurality of bits, may be associated with a second cell, in the plurality of cells, and may have a second value of one. The second cell may be activated prior to receiving the MAC CE. The MAC CE may not comprise one or more third field associated with the second bit. In an example, the MAC CE may not comprise the one or more third fields based on the second bit having the second value of one and the second cell being activated prior to receiving the MAC CE.

In an example, a third bit, in the plurality of bits, may be associated with a third cell, in the plurality of cells, and may have a third value of zero. The MAC CE may not comprise one or more fourth fields associated with the third bit. In an example, the MAC CE may not comprise the one or more fourth fields based on the third bit having the third value of zero.

In an example, the one or more second fields, associated with the first bit, may comprise a triggering state field, wherein a first value of the triggering state field may indicate activation of the one or more reference signals. In an example, the wireless device may receive configuration parameters indicating a plurality of values, comprising the first value, for the triggering state field, wherein the first value may be one of the plurality of values. In an example, the first value of the triggering state field may indicate a triggering state that is associated with a first bandwidth part (BWP). In an example, the receiving the one or more reference signals may be via the first BWP. In an example, the one or more second fields, associated with the first bit, may further comprise a BWP identifier field indicating an identifier of a BWP via which the one or more reference signals are received.

In an example embodiment, a wireless device may receive configuration parameters of a plurality of cells. The wireless device may receive a downlink control information (DCI) comprising scheduling information for reception of a transport block. The transport block may comprise a medium access control (MAC) control element (CE) indicating activation of one or more cells of the plurality of cells. In an example, the DCI may comprise a first field, a first value of the first field indicating that a second filed, for a reference signal state indication, is present in the DCI. In an example, the DCI may comprise a first field, a first value of the first field indicating that a second filed of the DCI is used for a reference signal state indication. The wireless device may receive one or more reference signals based on the reference signal state indication. The wireless device may activate the one or more cells based on the MAC CE and the received one or more reference signals.

In an example, the second field may be an SRS request field.

In an example, the field may be a CSI-RS trigger (e.g., ZP-CSI-RS trigger) field.

In an example, the second field may be a SCell dormancy indication field.

In an example embodiment, a wireless device may receive configuration parameters of a plurality of cells. The wireless device may receive a downlink control information (DCI) comprising scheduling information for reception of a transport block. The transport block may comprise a medium access control (MAC) control element (CE) indicating activation of one or more cells of the plurality of cells. In an example, the DCI may be associated with a first radio network temporary identifier (RNTI) indicating that a filed, for a reference signal state indication, is present in the DCI. In an example, the DCI may be associated with a first radio network temporary identifier (RNTI) indicating that a field of the DCI is used for a reference signal state indication. The wireless device may receive one or more reference signals based on the reference signal state indication. The wireless device may activate the one or more cells based on the MAC CE and the received one or more reference signals.

In an example, the field may be an SRS request field.

In an example, the field may be a CSI-RS trigger (e.g., ZP-CSI-RS trigger) field.

In an example, the field may be a SCell dormancy indication field.

In an example embodiment, a wireless device may receive configuration parameters of a plurality of cells. The wireless device may receive a downlink control information (DCI) comprising scheduling information for reception of a transport block. The transport block may comprise a medium access control (MAC) control element (CE) indicating activation of one or more cells of the plurality of cells. In an example, the DCI may be received via a CORESET/search space indicating that a filed, for a reference signal state indication, is present in the DCI. In an example, the DCI may be received via a CORESET/search space indicating that that a field of the DCI is used for a reference signal state indication. The wireless device may receive one or more reference signals based on the reference signal state indication. The wireless device may activate the one or more cells based on the MAC CE and the received one or more reference signals.

In an example, the field may be an SRS request field.

In an example, the field may be a CSI-RS trigger (e.g., ZP-CSI-RS trigger) field.

In an example, the field may be a SCell dormancy indication field.

In an example embodiment, a wireless device may receive configuration parameters of a plurality of cells comprising one or more first cells. The wireless device may receive a plurality of DCIs indicating activation/deactivation of the plurality of cells and/or triggering a plurality of reference signals used in activation of the plurality of cells. A first DCI, in the plurality of DCIs, may indicate activation and/or deactivation of the one or more first cells in the plurality of cells and/or may trigger one or more reference signals used in activation of the one or more first cells. The first DCI may be received in a first timing. The wireless device may transmit a HARQ feedback codebook, via an uplink channel, comprising a plurality of HARQ feedbacks associated with the plurality of DCIs. A first position of a first HARQ feedback, associated with the first DCI, in the plurality of HARQ feedbacks, may be based on the first timing of the first DCI in a plurality of timings of the plurality of DCIs.

In an example, the plurality of DCIs may be received via one or more cells. The first DCI may be received via a cell in the one or more cells. The first position of the first HARQ feedback may be based on an index of the cell and one or more indexes of the one or more cells.

In an example embodiment, a wireless device may receive configuration parameters of one or more secondary cells. The wireless device may receive a DCI indicating triggering/activation of one or more reference signals associated with activation of the one or more secondary cells. The wireless device may transmit a HARQ feedback, indicating reception (e.g., correct/successful reception) of the DCI wherein the HARQ feedback may not be impacted by a PCell, a PSCell and/or a PUCCH SCell interruptions.

In an example embodiment, a wireless device may receive configuration parameters of one or more secondary cells. The wireless device may receive a DCI comprising scheduling information for reception of a TB comprising a MAC CE indicating triggering/activation of one or more reference signals associated with activation of the one or more secondary cells. The wireless device may transmit a HARQ feedback, indicating reception (e.g., correct/successful reception) of the DCI/TB/MAC CE wherein the HARQ feedback is not impacted by PCell, PSCell and/or PUCCH SCell interruptions.

In an example embodiment, a wireless device may receive configuration parameters of one or more secondary cells. The wireless device may receive a DCI indicating triggering/activation of one or more reference signals associated with activation of the one or more secondary cells. The wireless device may transmit a confirmation/acknowledgement (e.g., a confirmation MAC CE) indicating reception (e.g., correct/successful reception) of the DCI.

In an example embodiment, a wireless device may receive: first configuration parameters, of a secondary cell, comprising bandwidth part (BWP) configuration parameters of one or more bandwidth parts (BWPs); and second configuration of one or more reference signals associated with activation of the secondary cell. The wireless device may receive a command indicating activation of a first reference signal, of the one or more reference signals, for transmission of the first reference signal via a first BWP, of the one or more BWPs, and based on the second configuration parameters. The wireless device may receive the first reference signal via the first BWP. The wireless device may activate the secondary cell based on the received first reference signal.

In an example, the second configuration parameters may comprise: third parameters for transmission of the first reference signal via the first BWP of the one or more BWPs; and fourth parameters for transmission of a second reference signal via a second BWP of the one or more BWPs. The command may comprise a field, a value of the field indicating activation of the first reference signal for transmission via the first BWP.

In an example, the second configuration parameters may be for transmission of the first reference signal via the first BWP of the one or more BWPs. The command may not comprise a field associated with a BWP of the secondary cell.

In an example, the command may be one of a DCI or a MAC CE.

In an example, the command may further indicate activation of the secondary cell.

In a carrier aggregation scenario, a wireless device may be configured with a plurality of cells to communicate with one or more base stations. A cell, in the plurality of cells, may be a primary cell and one or more cells, in the plurality of cells, may be secondary cells. In carrier aggregation, a secondary cell may be dynamically activated and deactivated, by a base station, based on the wireless device capacity demand. The existing secondary cell activation processes and/or signaling may lead to an undesirable latency (e.g., latency needed for AGC setting, time/frequency tracking, etc.) that may degrade the wireless device and/or wireless network performance in terms of throughput and delay. There is a need to enhance the existing secondary cell activation processes and/or signaling to decrease the latency in secondary cell activation. Example embodiments enhance the existing secondary cell activation processes and/or signaling.

In example embodiments a wireless device may be configured with carrier aggregation. The wireless device may receive configuration parameters of a plurality of cells. The plurality of cells may be provided by a single base station (e.g., in case of single-connectivity) or by multiple base stations (e.g., in case of multi-connectivity, e.g., dual connectivity). The plurality of cells may comprise a primary cell and one or more secondary cells. The one or more secondary cells may comprise a first secondary cell.

Figure 32:
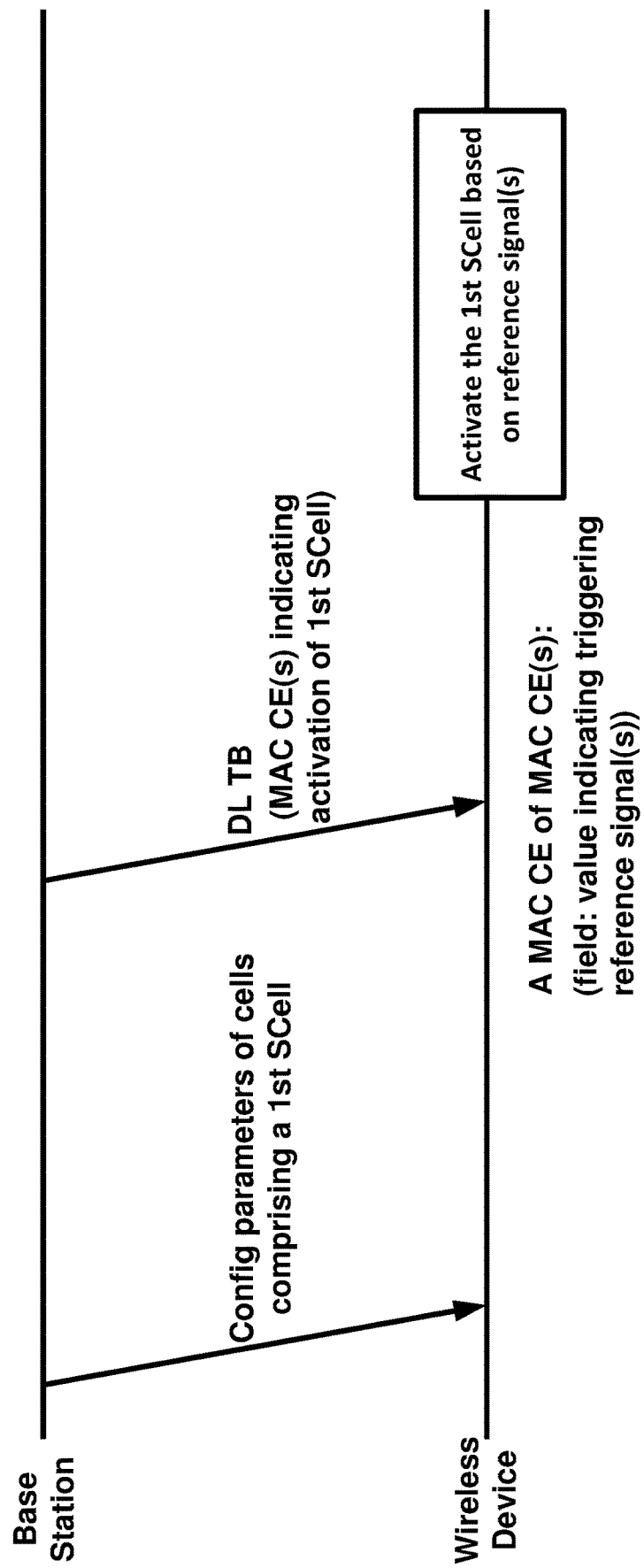
FIG. 32 shows an example process in accordance with several of various embodiments of the present disclosure.

In an example embodiment as shown in FIG. 32, the wireless device may receive a downlink transport block comprising one or more MAC CEs that indicate activation of the first secondary cell. The wireless device may receive the transport block via a primary cell or via a secondary cell that is activated. The first secondary cell may be deactivated prior to receiving the transport block. The one or more MAC CEs may indicate activation of the first secondary cell based on a first type of activation process. The first type of activation process may be based on receiving an indication of (e.g., a trigger for) transmission of one or more reference signals used in secondary cell activation. The configuration parameters of the first secondary cell may comprise one or more parameters indicating that the first secondary cell is configured with a first type of activation process. In an example, the wireless device may transmit, to a base station, a capability message comprising a capability IE indicating that the wireless device supports activation of the first secondary cell based on the first type of activation process.

The one or more MAC CEs may comprise a MAC CE that indicates triggering/activation of one or more reference signals (e.g., temporary/aperiodic reference signals that are transmitted by the base station to the wireless device temporarily and based on the MAC CE trigger). A logical channel identifier (LCID), associated with the MAC CE, may indicate that the MAC CE is for triggering/activation of one or more reference signals used in secondary cell activation. A burst of a reference signal, in the one or more reference signals, may comprise one or more slots. In an example, the one or more reference signals may comprise a tracking reference signal (TRS). The one or more reference signals may be used by the wireless device for secondary cell activation, for example to expedite the activation of the secondary cell. For example, the one or more reference signals may be used by the wireless device for automatic gain control (AGC) and/or time/frequency tracking during the activation process of the first secondary cell and/or channel state information (CSI) measurements and/or acquisition and cell search.

In an example, the one or more MAC CEs may indicate activation of one or more secondary cells comprising the first secondary cell. A number of the one or more secondary cells may be a first number. The MAC CE, in the one or more MAC CEs, that indicates triggering/activation of the one or more reference signals, may be a variable-size MAC CE. The size of the MAC CE may be based on the first number.

The MAC CE may comprise a first field with a first value indicating triggering/activation of the one or more reference signals. The first value of the first field may indicate a state (e.g., an activation/triggering state) for the one or more reference signals. For example, the first value may indicate one of a plurality of states (e.g., one of a plurality of RRC configured states). For example, the first value may indicate an identifier/index of the state (e.g., the activation/triggering state). For example, the identifier/index of the state may indicate a first configuration in a plurality of configurations. A configuration, in the plurality of configurations, may indicate radio resource and/or BWP(s) (e.g., identifiers of the BWP(s)) and/or other configuration parameters used in transmission of the one or more reference signals.

In response to receiving the MAC CE (e.g., in response to receiving the TB comprising the MAC CE), the wireless device may receive the one or more reference signals and may activate the first secondary cell based on the one or more reference signals. In an example, receiving the one or more reference signals may be based on a configuration indicated by the first value of the first field of the MAC CE. The wireless device may measure the received one or more reference signals and may activate the first secondary cell based on the measuring the one or more reference signals. The one or more reference signals may be received via a first active downlink bandwidth part (BWP) of the first secondary cell and may measure the one or more reference signals received via the first active downlink BWP. The first active downlink BWP may be the BWP that is active when the first secondary cell is activated. The wireless device may receive configuration parameters of a plurality of BWPs of the first secondary cell, the plurality of BWPs comprising the first active downlink BWP.

Figure 33:
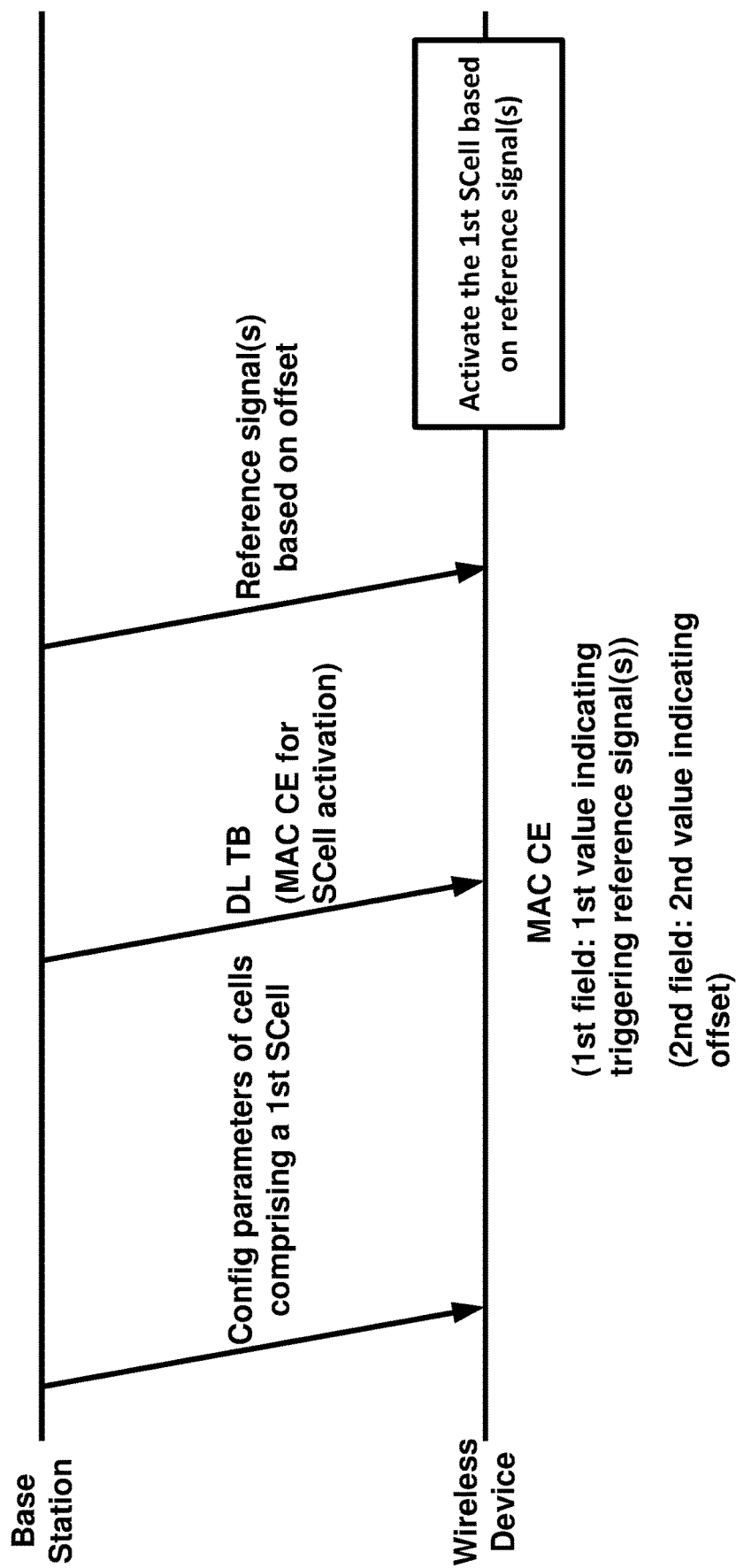
FIG. 33 shows an example process in accordance with several of various embodiments of the present disclosure.

The wireless device may receive the one or more reference signals based on (e.g., on or after) an offset to a reference timing. The offset may be based on a first configuration parameter (e.g., the wireless device may receive the first configuration parameter indicating the offset). In an example (e.g., as shown in FIG. 33), the MAC CE may further comprise a field indicating the offset (e.g., the offset configured based on the first configuration parameter). In an example, the wireless device may transmit a HARQ feedback (e.g., a HARQ ACK) associated with the downlink transport block (e.g., indicating successful reception of the downlink transport block) in a first timing and the reference timing may be based on the first timing of the HARQ feedback.

In an example, a single MAC CE may indicate the activation of first secondary and triggering/activation of the one or more reference signals. The MAC CE may comprise a second field comprising a plurality of bits. Each bit, in the plurality of bits, may be associated with a corresponding cell. A first bit, in the plurality of bits, may correspond to the first secondary cell. A first value of the first bit (e.g., a value of one of the first bit) may indicate activation of the first secondary cell.

In an example, a first MAC CE, in the one or more MAC CEs, may indicate activation of the first secondary cell and a second MAC CE, in the one or more MAC CEs, may indicate triggering/activation of the one or more reference signals. The second MAC CE may comprise a second field comprising a plurality of bits. Each bit, in the plurality of bits, may be associated with a corresponding cell. A first bit, in the plurality of bits, may correspond to the first secondary cell. A first value of the first bit (e.g., a value of one of the first bit) may indicate activation of the first secondary cell.

In an example embodiment as shown in FIG. 33, a wireless device may receive a downlink transport block comprising a first MAC CE for secondary cell activation. The first MAC CE may comprise a first filed and a second field.

A first value of the first field may indicate triggering/activation of one or more reference signals to be used in activation of the first secondary cell. The first value of the first field may indicate a state (e.g., an activation/triggering state) for the one or more reference signals. For example, the first value may indicate one of a plurality of states (e.g., one of a plurality of RRC configured states). For example, the first value may indicate an identifier/index of the state (e.g., the activation/triggering state). For example, the identifier/index of the state may indicate a first configuration in a plurality of configurations. A configuration, in the plurality of configurations, may indicate radio resource and/or BWP(s) (e.g., identifiers of the BWP(s)) and/or other configuration parameters used in transmission of the one or more reference signals.

A second value of the second field may indicate an offset (e.g., an offset to a reference timing). The wireless device may receive the one or more reference signals based on the offset (e.g., on or after the offset to the reference timing). In an example, the reference timing may be based on a timing of transmission of a HARQ feedback associated with the downlink transport block. The wireless device may activate the first secondary cell based on the one or more reference signals.

In an example, the first MAC CE may further comprise a third field comprising a plurality of bits. Each bit, in the plurality of bits, may correspond to a secondary cell. A first cell, in the plurality of bits may be correspond to/be associated with the first secondary cell. A value (e.g., a value of one) of the first bit may indicate activation of the first secondary cell.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 34:
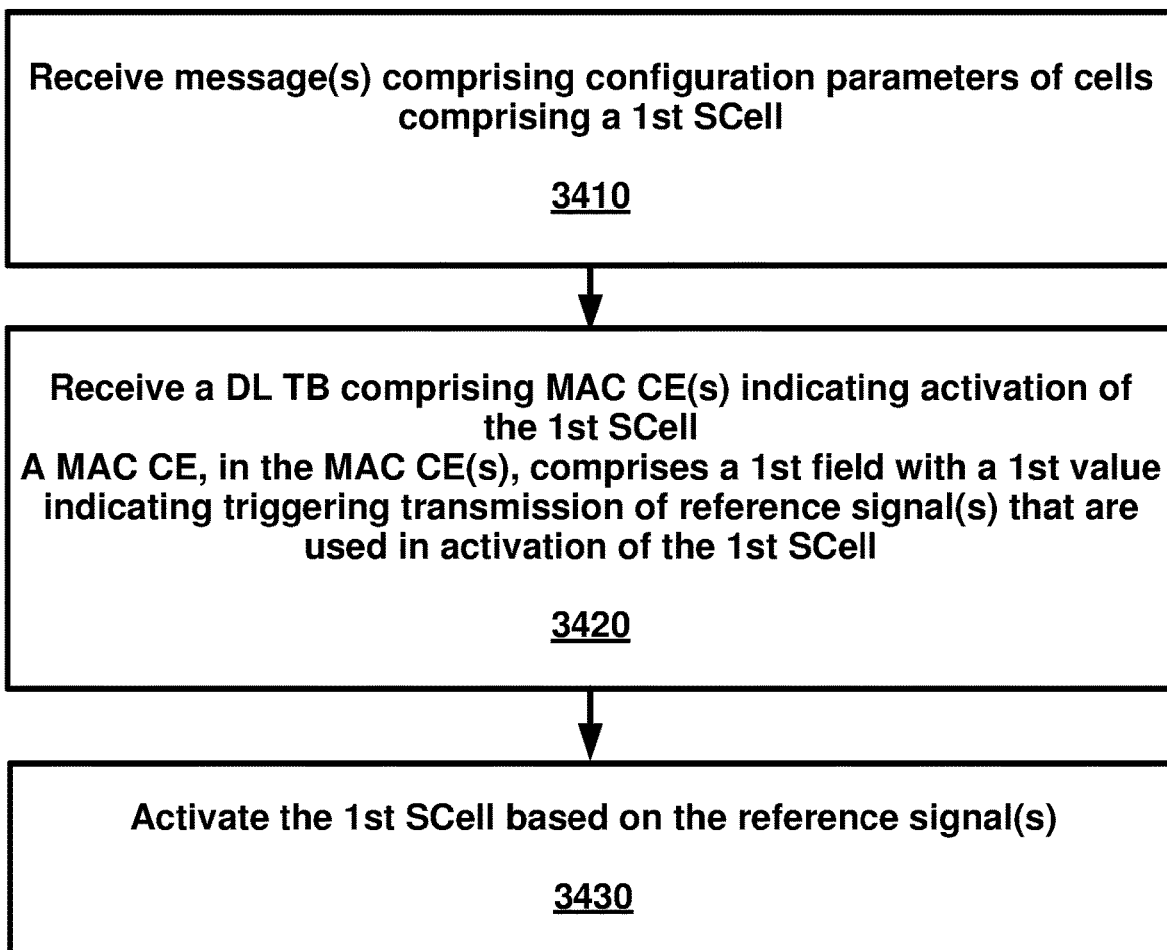
FIG. 34 shows an example flow diagram in accordance with several of various embodiments of the present disclosure.

FIG. 34 shows an example flow diagram in accordance with several of various embodiments of the present disclosure. At 3410, a wireless device may receive one or more messages comprising configuration parameters of a plurality of cells comprising a first secondary cell. At 3420, the wireless device may receive a downlink transport block comprising one or more medium access control (MAC) control elements (CEs) indicating activation of the first secondary cell. A MAC CE, in the one or more MAC CEs, may comprise a first field with a first value indicating triggering transmission of one or more reference signals that are used in activation of the first secondary cell. At 3430, the wireless device may activate the first secondary cell based on the one or more reference signals.

In an example embodiment, the wireless device may receive the one or more reference signals in response to receiving the MAC CE at 3420. In an example embodiment, receiving the one or more reference signals may be based on an offset to a reference timing. In an example embodiment, the offset may be based on a first configuration parameter. In an example embodiment, the MAC CE may comprise a second field with a second value indicating the offset (e.g., an RRC configured offset). In an example, the offset may be to a reference timing that is based on a timing of transmission of a hybrid automatic repeat request (HARM) feedback associated with the downlink transport block.

In an example embodiment, the wireless device may measure the one or more reference signals that are triggered in response to receiving the MAC CE at 3420. The activating the first secondary cell may be based on the measuring. In an example embodiment, the measuring may be for a first active downlink bandwidth part of the first secondary cell. In an example embodiment, the configuration parameters, received at 3410, may comprise bandwidth part configuration parameters of downlink bandwidth parts of the first secondary cell. The downlink bandwidth parts may comprise the first active downlink bandwidth part.

In example embodiment, the one or more reference signals may comprise an aperiodic reference signal.

In an example embodiment, the MAC CE, received at 3420, may be associated with a logical channel identifier (LCID) indicating that the MAC CE is for triggering reference signals used in secondary cell activation.

In an example embodiment, the MAC CE, received at 3420, may comprise a second field comprising a plurality of bits. A first bit, in the plurality of bits, may be associated with the first secondary cell. A first value (e.g., one) of the first bit may indicate activation of the first secondary cell.

In an example embodiment, the MAC CE, in the one or more MAC CEs received at 3420, may be a first MAC CE. The one or more MAC CEs may further comprise a second MAC CE. The second MAC CE may comprise a second field comprising a plurality of bits. A first bit, in the plurality of bits, may be associated with the first secondary cell. A first value (e.g., one) of the first bit may indicate activation of the first secondary cell.

In an example embodiment, the first value of the first field of the MAC CE, received at 3420, may indicate a state (e.g., a triggering/activation state) of the one or more reference signals. In an example, the first value of the first field of the MAC CE indicates an identifier/index of the state (e.g., the triggering/activation state) of the one or more reference signals. In an example embodiment, the identifier/index of the state (e.g., the triggering/activation state) may indicate a first configuration, in a plurality of configuration, for transmission of the one or more reference signals. In an example embodiment, a configuration, in the plurality of configurations, may indicate radio resources and/or BWP(s) (e.g., identifier(s) of the BWP(s)) and/or other configuration parameters used in transmission of the one or more reference signals. In an example embodiment, the wireless device may receive the one or more reference signals in response to receiving the MAC CE at 3420. The receiving may be based on the first configuration associated with the identifier/index of the state (e.g., the triggering/activation state) indicated by the first value of the first field.

In an example embodiment, a burst of a reference signal, in the one or more reference signals, may comprise one or more slots.

In an example embodiment, the one or more reference signals may comprise a tracking reference signal.

In an example embodiment, the first secondary cell may be deactivated prior to receiving the transport block at 3420.

In an example embodiment, the wireless device may receive a configuration parameter indicating that the first secondary cell is configured with a first type of activation process. The first type of the activation process may be based on receiving an indication of (e.g., a trigger for) transmission of one or more reference signals used in the first type of the activation process.

In an example embodiment, the wireless device may transmit a capability message comprising a capability information element indicating that the wireless device is capable of a first type of activation process. The first type of the activation process may be based on receiving an indication of (e.g., trigger for) transmission of one or more reference signals used in the first type of the activation process.

In an example embodiment, the one or more MAC CEs, received at 3420, may indicate activation of a first number of secondary cells comprising the first secondary cell. A size of the MAC CE, in the one or more MAC CEs received at

3420, may be based on the first number. In an example embodiment, the MAC CE received at 3420 may be a variable-size MAC CE.

In an example embodiment, the one or more reference signals may be used, by the wireless device, in one or more of an automatic gain control (AGC), time and/or frequency tracking during the activation process for the first secondary cell, channel state information (CSI) measurement, and acquisition and cell search.

Figure 35:
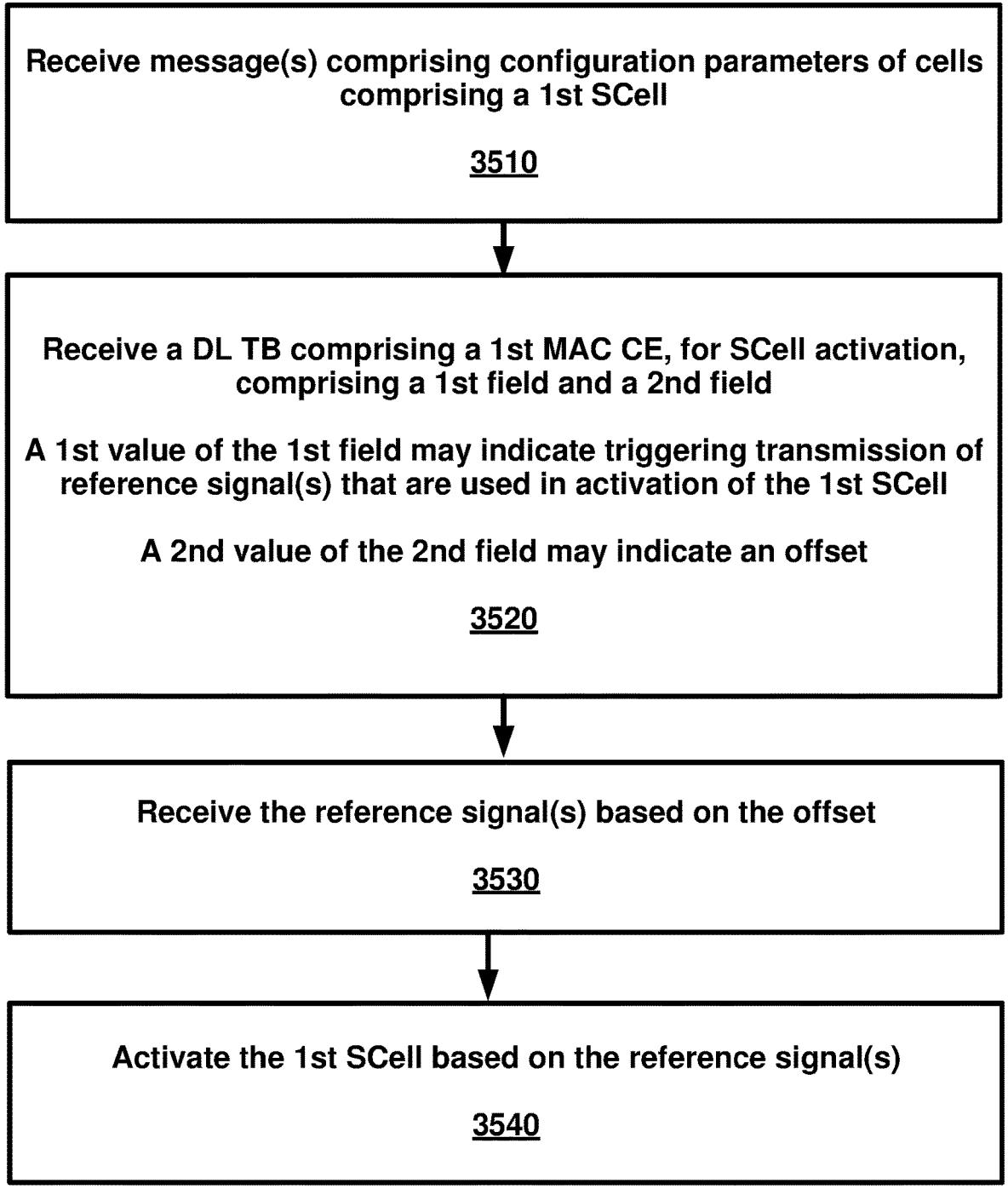
FIG. 35 shows an example flow diagram in accordance with several of various embodiments of the present disclosure.

FIG. 35 shows an example flow diagram in accordance with several of various embodiments of the present disclosure. At 3510, a wireless device may receive one or more messages comprising configuration parameters of a plurality of cells comprising a first secondary cell. At 3520, the wireless device my receive a downlink transport block comprising a first medium access control (MAC) control element (CE), for secondary cell activation, comprising a first field and a second field. A first value of the first field may indicate triggering transmission of one or more reference signals that are used in activation of the first secondary cell. A second value of the second field may indicate an offset. At 3530, the wireless device may receive the one or more reference signals based on the offset. At 3540, the wireless device may activate the first secondary cell based on the one or more reference signals.

In an example embodiment, the wireless device may transmit a HARQ feedback, associated with the downlink transport block received at 3520, in a first timing. The offset may be to a reference timing that is (e.g., determined) based on the first timing.

In an example embodiment, the first MAC CE, received at 3520, may further comprise a third field comprising a plurality of bits comprising a first bit associated with the first secondary cell. A value (e.g., a value of one) of the first bit may indicate activation of the first secondary cell.

In an example embodiment, the first value of the first field of the first MAC CE, received at 3520, may indicate a state (e.g., a triggering/activation state) of the one or more reference signals. In an example embodiment, the first value of the first field of the first MAC CE may indicate an identifier/index of the state (e.g., the triggering/activation state) of the one or more reference signals. In an example embodiment, the identifier/index of the state (e.g., the triggering/activation state) may indicate a first configuration, in a plurality of configurations, for transmission of the one or more reference signals. In an example embodiment, a configuration, in the plurality of configurations, may indicate radio resources and/or BWP(s) (e.g., identifier(s) of the BWP(s)) and/or other configuration parameters used in transmission of the one or more reference signals. In an example embodiment, the receiving the one or more reference signals, at 3530, may be based on the first configuration associated with the identifier/index of the state (e.g., the triggering/activation state) indicated by the first value of the first field.

Figure 36:
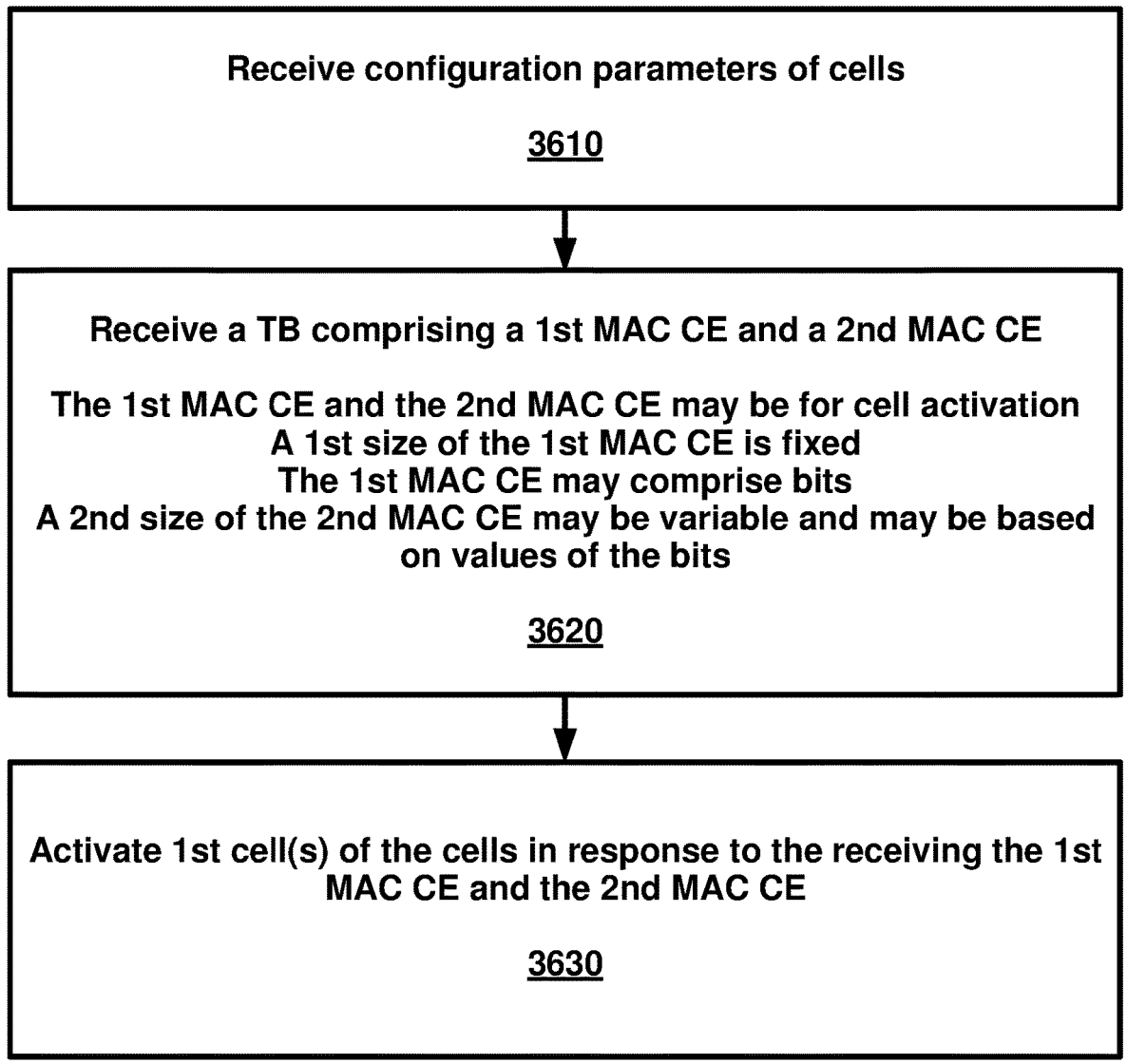
FIG. 36 shows an example flow diagram in accordance with several of various embodiments of the present disclosure.

FIG. 36 shows an example flow diagram in accordance with several of various embodiments of the present disclosure. At 3610, a wireless device may receive configuration parameters of a plurality of cells. At 3620, the wireless device may receive a transport block comprising a first medium access control (MAC) control element (CE) and a second MAC CE. The first MAC CE and the second MAC CE may be for cell activation. A first size of the first MAC CE may be fixed. The first MAC CE may comprise a plurality of bits. A second size of the second MAC CE may be variable and may be based on values of the plurality of bits. At 3630, the wireless device may activate one or more first cells of the plurality of cells in response to the receiving the first MAC CE and the second MAC CE.

In an example embodiment, the first size of the first MAC CE, received at 3620, may be one of one octet and four octets.

In an example embodiment, the one or more first cells may be deactivated prior to receiving the transport block.

In an example embodiment, the second size of the second MAC CE, received at 3620, may be based on a first number of one or more first bits, of the plurality of bits, that have values of one. In an example embodiment, the second size of the second MAC CE may further be based on a second number of one or more second bits, of the one or more first bits, that are associated with the one or more first cells of the plurality of cells. The one or more first cells may be deactivated prior to receiving the transport block. In an example embodiment, the one or more first bits may correspond to: the one or more first cells that are deactivated prior to receiving the transport block, and zero or more second cells that are activated prior to receiving the transport block. In an example embodiment, the second size of the second MAC CE may further be based on a second number of one or more second bits, of the one or more first bits, that are associated with the one or more first cells of the plurality of cells. The one or more first cells may be deactivated prior to receiving the transport block. The one or more first cells may be configured/enabled for a first type of activation process. In an example embodiment, the first type of the activation process may be based on receiving an indication of (e.g., trigger for) transmission of one or more reference signals used in the first type of the activation process.

In an example embodiment, the second MAC CE, received at 3620, may indicate activation/triggering of one or more reference signals for activation of at least a portion/subset of the one or more first cells based on a type of first activation process. In an example embodiment, the activation of the at least the potion/subset of the one or more first cells may be based on receiving the one or more reference signals whose activation is indicated by the second MAC CE.

In an example embodiment, the wireless device may receive one or more configuration parameters indicating that at least a portion/subset of the one or more first cells are configured/enabled with a first type of activation process. In an example embodiment, the first type of the activation process may be based on receiving an indication of (e.g., trigger for) transmission of one or more reference signals used in the first type of the activation process.

Figure 37:
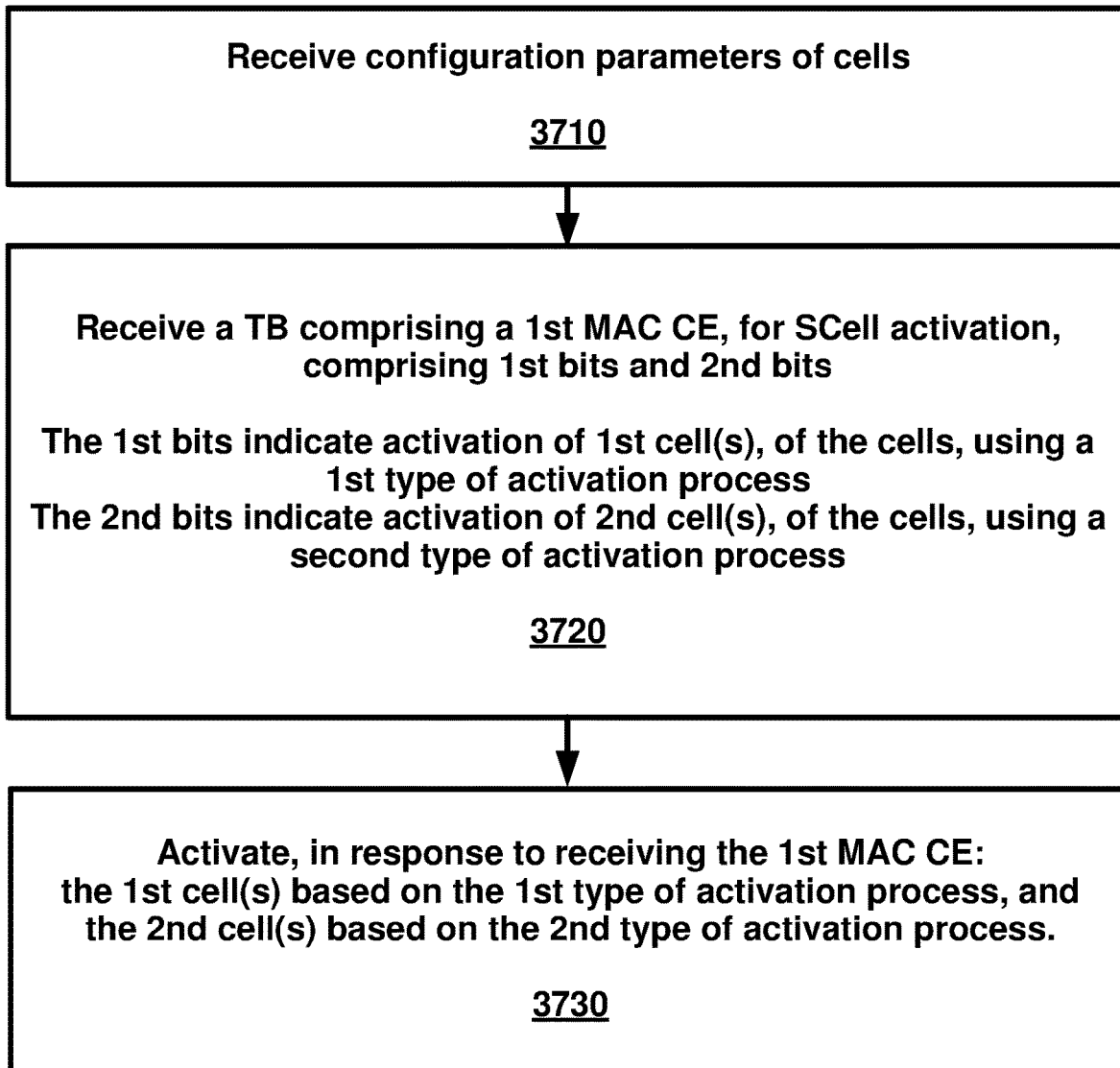
FIG. 37 shows an example flow diagram in accordance with several of various embodiments of the present disclosure.

FIG. 37 shows an example flow diagram in accordance with several of various embodiments of the present disclosure. At 3710, a wireless device may receive configuration parameters of a plurality of cells. At 3720, the wireless device may receive a transport block comprising a first medium access control (MAC) control element (CE), for secondary cell (SCell) activation, comprising a first plurality of bits and a second plurality of bits. The first plurality of bits may indicate activation of one or more first cells, of the plurality of cells, using a first type of activation process. The second plurality of bits may indicate activation of one or more second cells, of the plurality of cells, using a second type of activation process. At 3730, the wireless device may activate, in response to receiving the first MAC CE: the one or more first cells based on the first type of activation process; and the one or more second cells based on the second type of activation process.

In an example embodiment, the first type of the activation process may be based on receiving an indication of (e.g., trigger for) transmission of one or more reference signals used in the first type of the activation process.

In an example embodiment, the transport block, received at 3720, may further comprise a second MAC CE indicating activation/triggering of one or more reference signals associated with the activation of the one or more first cells using the first activation process.

In an example embodiment, the wireless device may receive configuration parameters indicating that the one or more first cells are associated/configured with the first type of activation process.

In an example embodiment, the wireless device may receive configuration parameters indicating that the one or more second cells are associated/configured with the second type of the activation process or indicating that the one or more second cells are not associated/configured with the first type of activation process.

In an example embodiment, the wireless device may receive configuration parameters indicating that: a first plurality of cells, comprising the one or more first cells, are associated/configured with the first type of activation process; and a second plurality of cells, comprising the one or more second cells, are associated/configured with the second type of activation process or that the second plurality of cells are not associated/configured with the first type of activation process. The wireless device may determine the one or more first cells, from the first plurality of cells, based on the first plurality of bits. The wireless device may determine the one or more second cells, from the second plurality of cells, based on the second plurality of bits. In an example embodiment, a first bit, in the first plurality of bits, may be associated with a first cell in the first plurality of cells. A first position of the first bit may be based on a first cell index of the first cell in a first plurality of cell indexes of the first plurality of cells. In an example embodiment, a second bit, in the second plurality of bits, may be associated with a second cell in the second plurality of cells. A second position of the second bit may be based on a second cell index of the second cell in a second plurality of cell indexes of the second plurality of cells.

Figure 38:
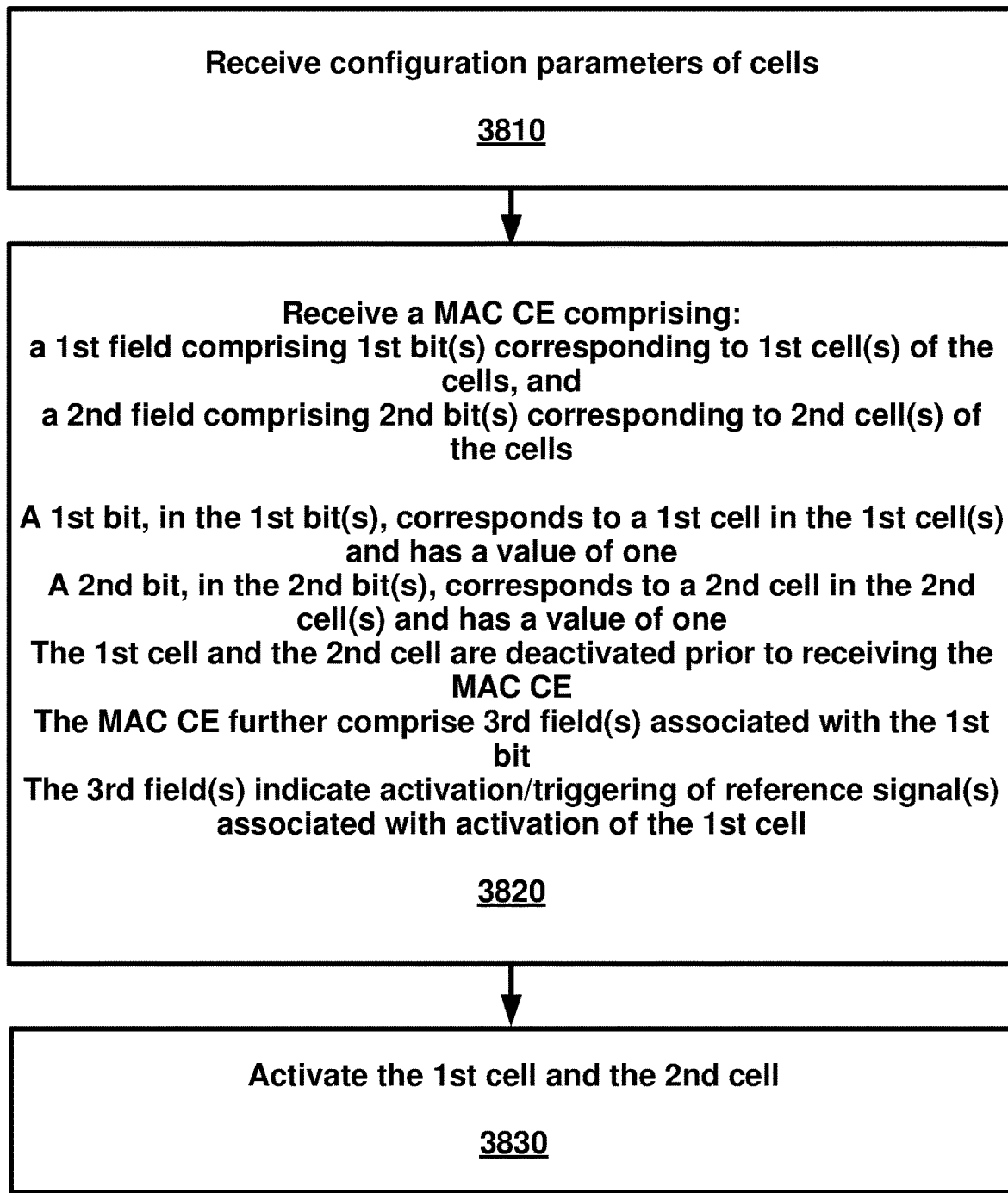
FIG. 38 shows an example flow diagram in accordance with several of various embodiments of the present disclosure.

FIG. 38 shows an example flow diagram in accordance with several of various embodiments of the present disclosure. At 3810, a wireless device may receive configuration parameters of a plurality of cells. At 3820, the wireless device may receive a medium access control (MAC) control element (CE) comprising: a first field comprising one or more first bits corresponding to one or more first cells of the plurality of cells; and a second field comprising one or more second bits corresponding to one or more second cells of the plurality of cells. A first bit, in the one or more first bits, may correspond to a first cell in the one or more first cells and may have a value of one. A second bit, in the one or more second bits, may correspond to a second cell in the one or more second cells and may have a value of one. The first cell and the second cell may be deactivated prior to receiving the MAC CE. The MAC CE may further comprise one or more third fields associated with the first bit. The one or more third fields may indicate activation/triggering of one or more reference signals associated with activation of the first cell. At 3830, the wireless device may activate the first cell and the second cell.

In an example embodiment, the activating, at 3830, may be in response to receiving the MAC CE.

In an example embodiment, the wireless device may receive the one or more reference signals in response to receiving the MAC CE at 3820. The activating the first cell, at 3830, may be based on the one or more reference signals.

In an example embodiment, the first field of the MAC CE, received at 3820, may be associated with a first type of activation process and the second field may be associated with a second type of activation process. In an example embodiment, the first type of activation process may comprises receiving an indication of (e.g., trigger for) transmission of one or more reference signals and using the one or more reference signal in the first type of the activation process.

In an example embodiment, the activating the first cell, at 3830, may be based on the first type of the activation process.

In an example embodiment, the activating the second cell, at 3830, may not be based on the first type of activation process or may be based on a second type of activation process.

Figure 39:
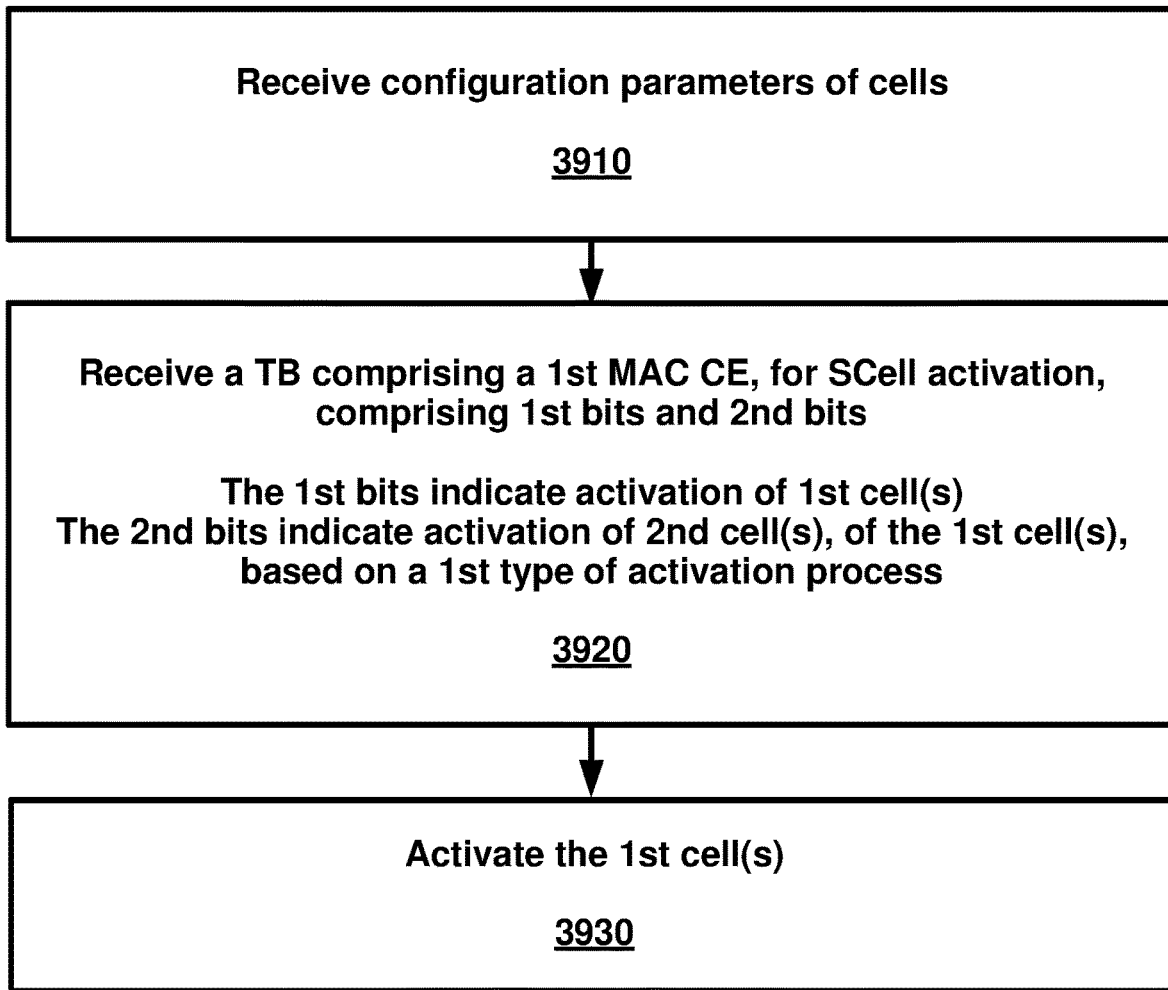
FIG. 39 shows an example flow diagram in accordance with several of various embodiments of the present disclosure.

FIG. 39 shows an example flow diagram in accordance with several of various embodiments of the present disclosure. At 3910, a wireless device may receive configuration parameters of a plurality of cells. At 3920, the wireless device may receive a transport block comprising a first medium access control (MAC) control element (CE), for secondary cell (SCell) activation, comprising a first plurality of bits and a second plurality of bits. The first plurality of bits may indicate activation of one or more first cells. The second plurality of bits may indicate activation of one or more second cells, of the one or more first cells, based on a first type of activation process. At 3930, the wireless device may activate the one or more first cells.

In an example embodiment, the first type of activation process may comprise receiving an indication of (e.g., trigger for) transmission of one or more reference signals and using the one or more reference signal in the first type of the activation process.

Figure 40:
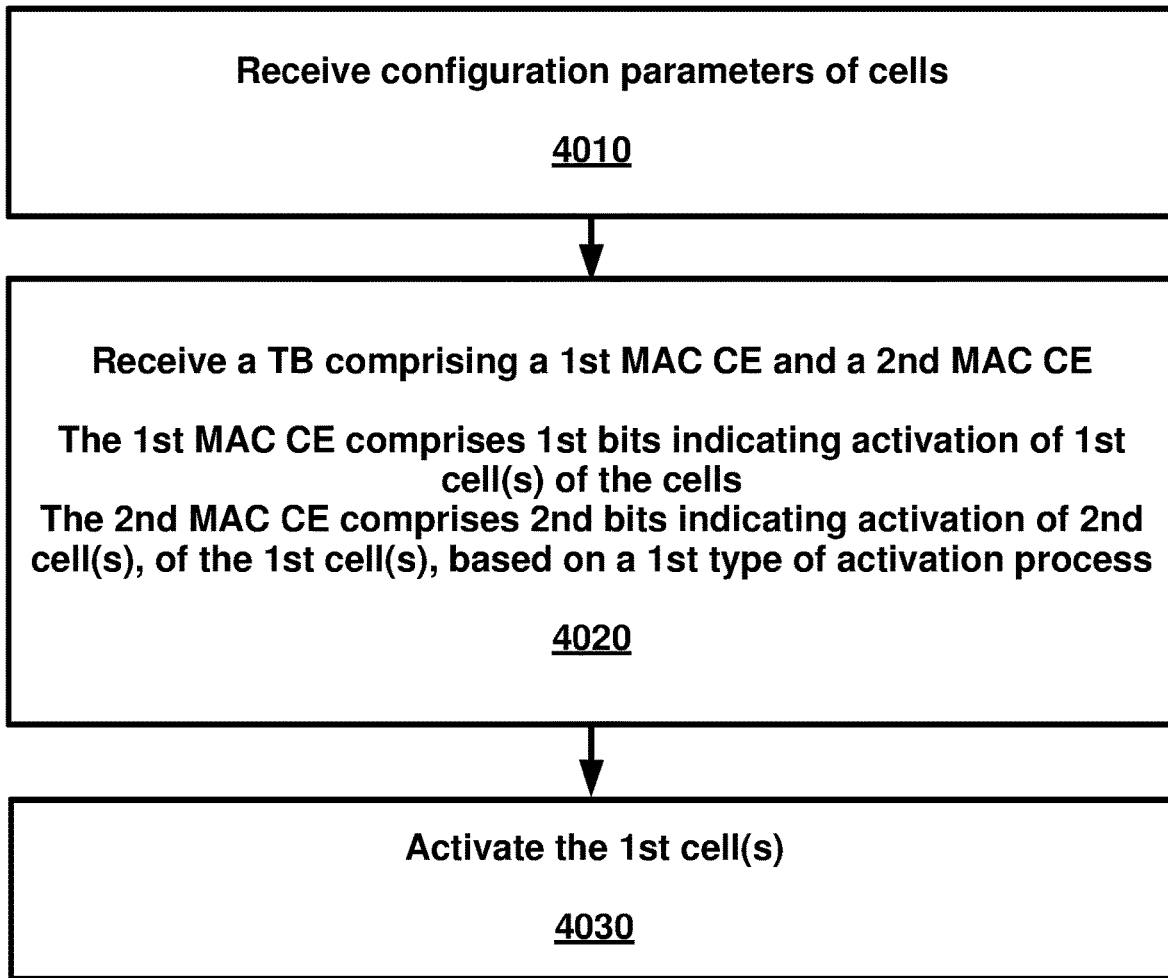
FIG. 40 shows an example flow diagram in accordance with several of various embodiments of the present disclosure.

FIG. 40 shows an example flow diagram in accordance with several of various embodiments of the present disclosure. At 4010, a wireless device may receive configuration parameters of a plurality of cells. At 4020, the wireless device may receive a transport block comprising a first medium access control (MAC) control element (CE) and a second MAC CE. The first MAC CE may comprise a first plurality of bits indicating activation of one or more first cells of the plurality of cells. The second MAC CE may comprise a second plurality of bits indicating activation of one or more second cells, of the one or more first cells, based on a first type of activation process. At 4030, the wireless device may activate the one or more first cells.

In an example embodiment, the first type of activation process may comprise receiving an indication of (e.g., trigger for) transmission of one or more reference signals and using the one or more reference signal in the first type of the activation process.

In an example embodiment, the second MAC CE, received at 4020, may indicate activation/triggering transmission of one or more reference signals associated with the activation of the one or more second cells with the first type of activation process.

In an example embodiment, the wireless device may receive the one or more reference signals in response to receiving the second MAC CE. Activating the one or more second cells, of the one or more first cells, may be based on receiving the one or more reference signals.

In an example embodiment, the first plurality of bits may comprise one or more first bits that have values of one. The one or more first bits may be associated with the one or more first cells. The second plurality of bits may comprise one or more second bits that correspond to the one or more first bits.

One or more third bits of the one or more second bits may have values of one and may be associated with the one or more second cells.

Figure 41:
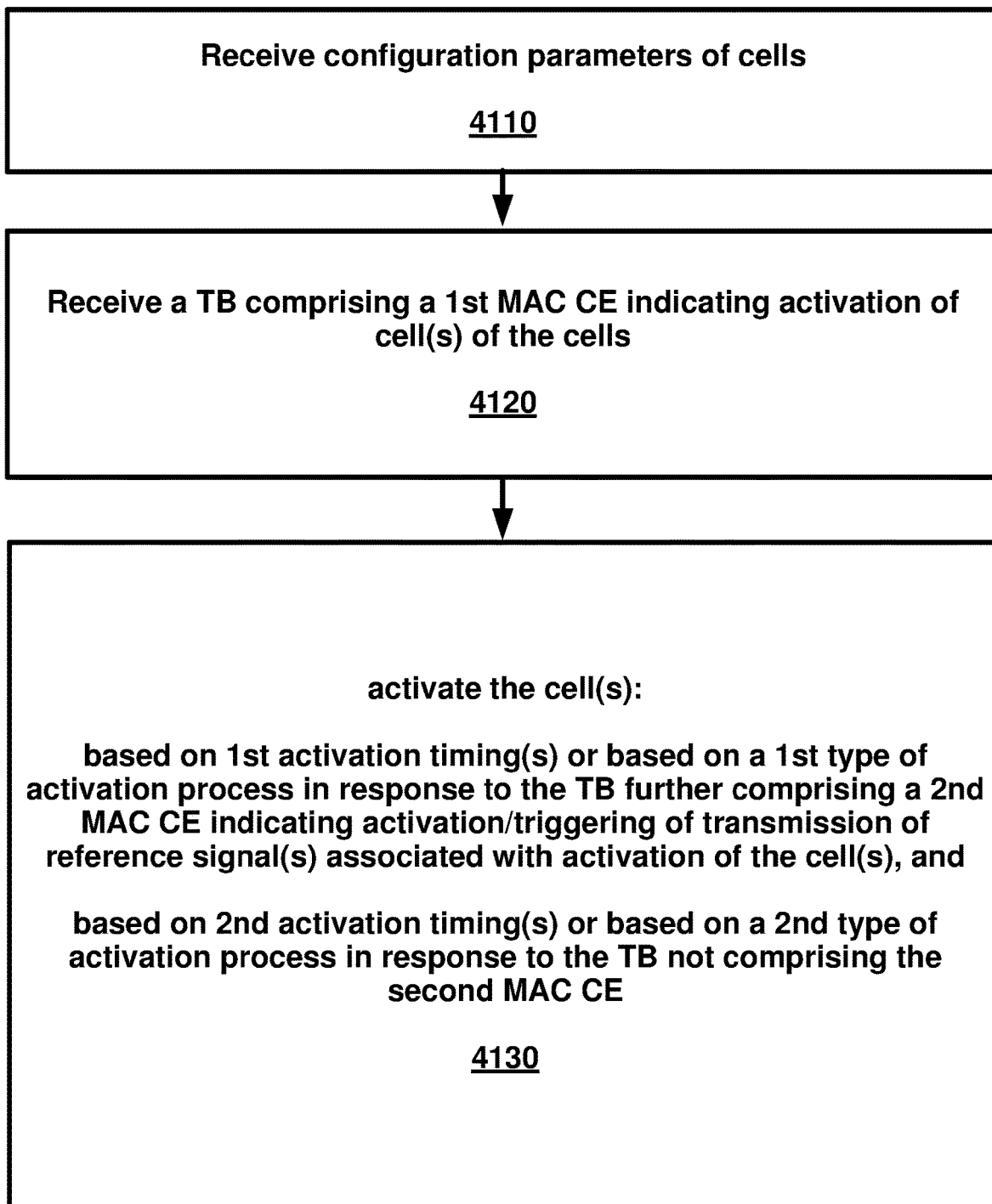
FIG. 41 shows an example flow diagram in accordance with several of various embodiments of the present disclosure.

FIG. 41 shows an example flow diagram in accordance with several of various embodiments of the present disclosure. At 4110, a wireless device may receive configuration parameters of a plurality of cells. At 4120, the wireless device may receive a transport block comprising a first medium access control (MAC) control element (CE) indicating activation of one or more cells of the plurality of cells. At 4130, the wireless device may activate the one or more cells: based on one or more first activation timings or based on a first type of activation process in response to the transport block further comprising a second MAC CE indicating activation/triggering of transmission of one or more reference signals associated with activation of the one or more cells; and based on one or more second activation timings or based on a second type of activation process in response to the transport block not comprising the second MAC CE.

In an example embodiment, the one or more first activation timings may be earlier than the one or more second activation timings.

In an example embodiment, the second MAC CE may be for the first type of activation process for activation of the one or more cells.

In an example embodiment, the first type of activation process may comprise receiving an indication of (e.g., trigger for) transmission of one or more reference signals and using the one or more reference signal in the first type of the activation process. In an example embodiment, the second MAC CE may indicate activation of one or more reference signals. The activation of the one or more cells, using the first activation process, may be based on receiving the one or more references signals.

Figure 42:
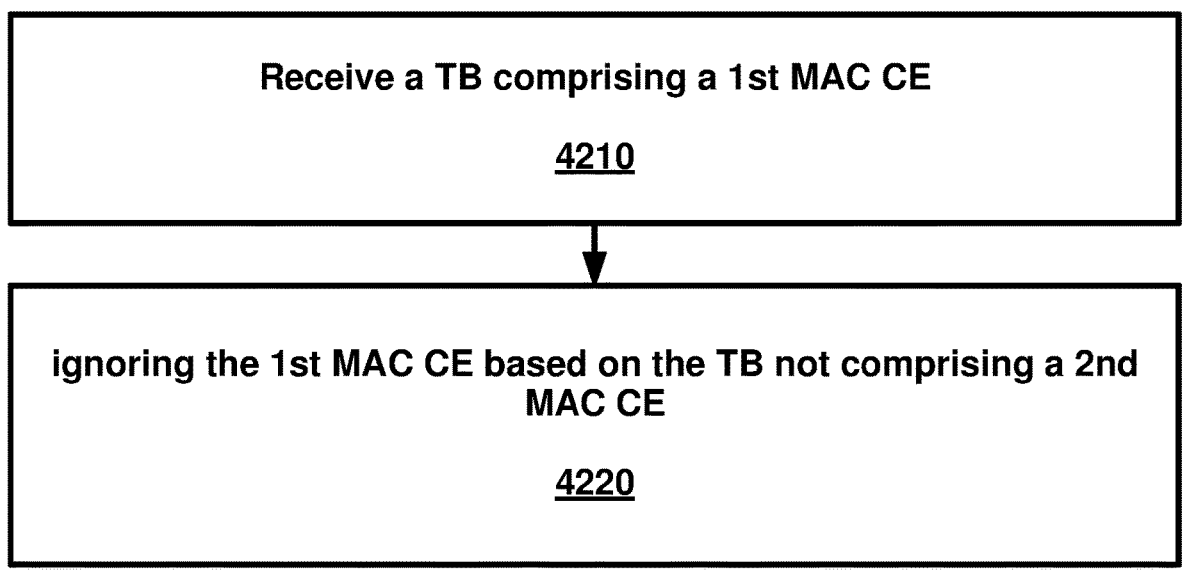
FIG. 42 shows an example flow diagram in accordance with several of various embodiments of the present disclosure.

FIG. 42 shows an example flow diagram in accordance with several of various embodiments of the present disclosure. At 4210, a wireless device may receive a transport block comprising a first medium access control (MAC) control element (CE). At 4220, the wireless device may ignore the first MAC CE based on the transport block not comprising a second MAC CE.

In an example embodiment, the first MAC CE, received at 4210, may be for activation of one or more reference signals used in cell activation. The second MAC CE may be for SCell activation.

Figure 43:
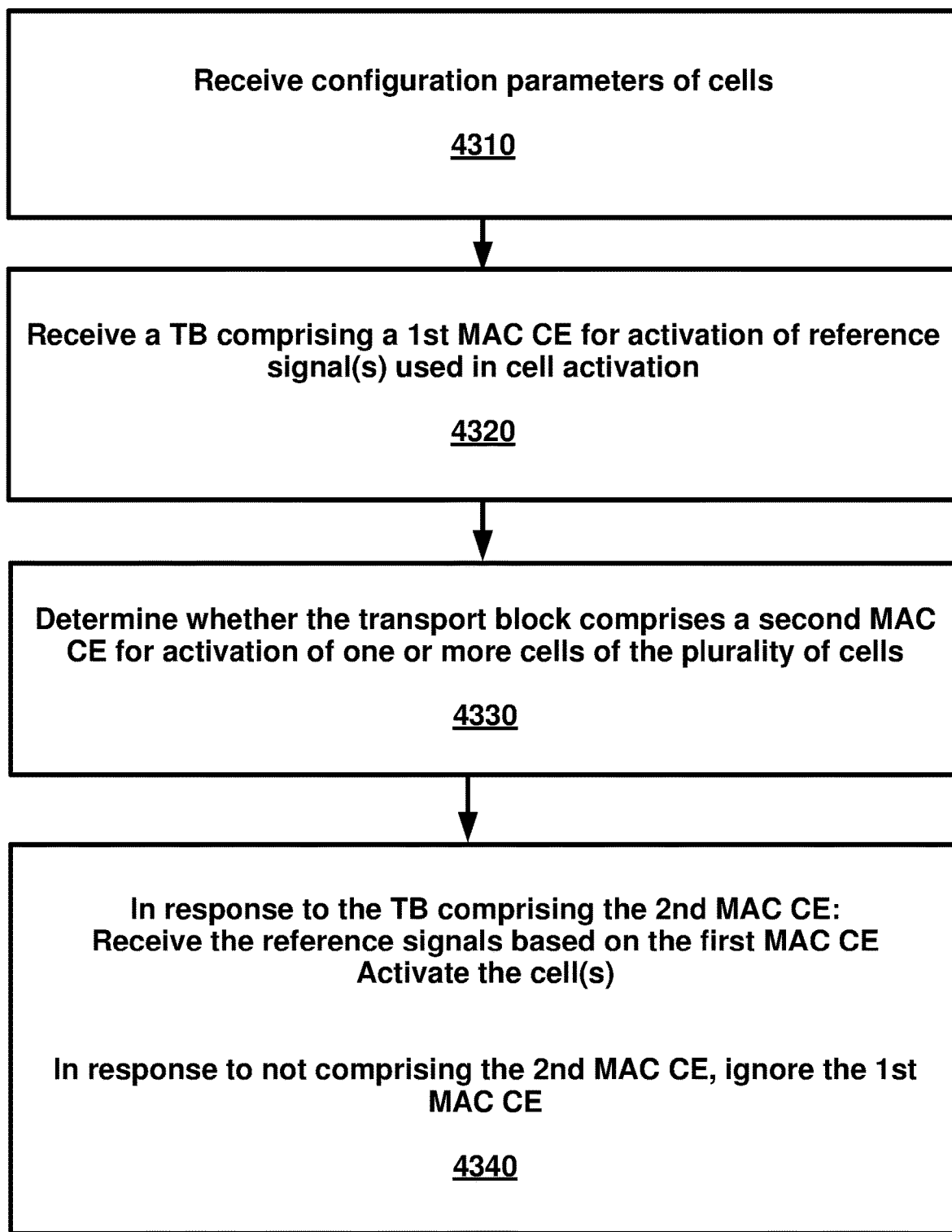
FIG. 43 shows an example flow diagram in accordance with several of various embodiments of the present disclosure.

FIG. 43 shows an example flow diagram in accordance with several of various embodiments of the present disclosure. At 4310, a wireless device may receive configuration parameters of a plurality of cells. At 4320, the wireless device may receive a transport block comprising a first medium access control (MAC) control element (CE) for activation of one or more reference signals used in cell activation. At 4330, the wireless device may determine whether the transport block comprises a second MAC CE for activation of one or more cells of the plurality of cells. At 4340, in response to the transport block comprising the second MAC CE: the wireless device may receive the one or more reference signals based on the first MAC CE; and may activate the one or more cells. In response to the transport block not comprising the second MAC CE, the wireless device may ignore the first MAC CE.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   transmitting, by a wireless device, one or more capability information elements indicating that the wireless device supports a first type of secondary cell activation, wherein the first type of secondary cell activation is based on a reference signal triggered by a secondary cell activation command;
   receiving a first secondary cell activation command indicating:
      activation of a first secondary cell; and
      activation of a first reference signal for the activation of the first secondary cell; and
   activating the first secondary cell based on the first secondary cell activation command.

2. The method of claim 1, wherein the first secondary cell activation command is a medium access control (MAC) control element (CE).

3. The method of claim 2, wherein the MAC CE is associated with a first logical channel identifier indicating that the MAC CE is for secondary cell activation.

4. The method of claim 1, further comprising receiving a reference signal configuration associated with an identifier, wherein the first secondary cell activation command comprises a field with a value indicating the identifier.

5. The method of claim 4, wherein the first secondary cell activation command indicates activation of the first reference signal based on the value of the field.

6. The method of claim 4, further comprising receiving the first reference signal, wherein:
   the reference signal configuration indicates radio resources; and
   the receiving the first reference signal is based on the radio resources.

7. The method of claim 1, further comprising measuring the first reference signal in response to receiving the first secondary cell activation command.

8. A wireless device comprising:
   one or more processors; and
   memory storing instructions that, when executed by the one or more processors, cause the wireless device to:
      transmit one or more capability information elements indicating that the wireless device supports a first type of secondary cell activation, wherein the first type of secondary cell activation is based on a reference signal triggered by a secondary cell activation command;
      receive a first secondary cell activation command indicating:
         activation of a first secondary cell; and
         activation of a first reference signal for the activation of the first secondary cell; and
      activate the first secondary cell based on the first secondary cell activation command.

9. The wireless device of claim 8, wherein the first secondary cell activation command is a medium access control (MAC) control element (CE).

10. The wireless device of claim 9, wherein the MAC CE is associated with a first logical channel identifier indicating that the MAC CE is for secondary cell activation.

11. The wireless device of claim 8, wherein the instructions, when executed by the one or more processors, further cause the wireless device to receive a reference signal configuration associated with an identifier, wherein the first secondary cell activation command comprises a field with a value indicating the identifier.

12. The wireless device of claim 11, wherein the first secondary cell activation command indicates activation of the first reference signal based on the value of the field.

13. The wireless device of claim 11, wherein the instructions, when executed by the one or more processors, further cause the wireless device to receive the first reference signal, wherein:
   the reference signal configuration indicates radio resources; and
   receiving the first reference signal is based on the radio resources.

14. The wireless device of claim 8, wherein the instructions, when executed by the one or more processors, further cause the wireless device to measure the first reference signal in response to receiving the first secondary cell activation command.

15. A system comprising:

a base station; and a wireless device comprising: one or more processors; and memory storing instructions that, when executed by the one or more processors, cause the wireless to: transmit, to the base station, one or more capability information elements indicating that the wireless device supports a first type of secondary cell activation, wherein the first type of secondary cell activation is based on a reference signal triggered by a secondary cell activation command; receive a first secondary cell activation command indicating: activation of a first secondary cell; and activation of a first reference signal for the activation of the first secondary cell; and activate the first secondary cell based on the first secondary cell activation command.

16. The system of claim 15, wherein the first secondary cell activation command is a medium access control (MAC) control element (CE).

17. The system of claim 16, wherein the MAC CE is associated with a first logical channel identifier indicating that the MAC CE is for secondary cell activation.

18. The system of claim 15, wherein the instructions, when executed by the one or more processors, further cause the wireless device to receive a reference signal configuration associated with an identifier, wherein the first secondary cell activation command comprises a field with a value indicating the identifier.

19. The system of claim 18, wherein the first secondary cell activation command indicates activation of the first reference signal based on the value of the field.

20. The system of claim 18, wherein the instructions, when executed by the one or more processors, further cause the wireless device to receive the first reference signal, wherein:

the reference signal configuration indicates radio resources; and receiving the first reference signal is based on the radio resources.

* * * * *